US006487659B1

(12) United States Patent
Kigo et al.

(10) Patent No.: US 6,487,659 B1
(45) Date of Patent: *Nov. 26, 2002

(54) DEVICE AND METHOD FOR CONDITIONAL AUTHENTICATION

(75) Inventors: Kenichiro Kigo, Nakai-machi (JP); Kohji Suzuki, Nakai-machi (JP)

(73) Assignee: Fuji Xerox Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/246,131

(22) Filed: Feb. 8, 1999

(30) Foreign Application Priority Data

Feb. 12, 1998 (JP) ............................................. 10-029932

(51) Int. Cl.[7] ............................................. H04L 9/00
(52) U.S. Cl. ............................................. 713/168
(58) Field of Search ............................... 713/168, 172, 713/176; 380/231, 232, 234; 705/51, 52, 54

(56) References Cited

U.S. PATENT DOCUMENTS 6,073,234 A * 6/2000 Kigo et al. ................... 380/30
6,161,183 A * 12/2000 Saito et al. .................. 380/282

FOREIGN PATENT DOCUMENTS

| JP | A-62-171071 | 7/1987 |
| JP | B2-6-22032 | 3/1994 |
| JP | A-7-131452 | 5/1995 |

* cited by examiner

Primary Examiner—Matthew Smithers
(74) Attorney, Agent, or Firm—Oliff & Berridge, PLC

(57) ABSTRACT

In carrying out various authentication with use of a proof support information, it is intended to impose a limitation on utilization and make high-speed processing possible. Proof data generation control information is provided to a proof data generation device from a proof data generation control information generating device or from a proof data verification device. At the time of authentication, authentication data is provided from the proof data verification device to the proof data generation device, in which a proof data generation unit generates proof data on the basis of the authentication data, user unique identifying information, proof data generation control information, and proof support information (access ticket). However, in the event utilization does not meet conditions included in the proof data generation control information, generation of the proof data is rejected. The proof data is sent to the proof data verification device and is verified thereby. As authentication characteristic information there is used a decryption key in an asymmetric cryptosysytem which utilizes a discrete logarithm problem on a finite group G.

39 Claims, 38 Drawing Sheets

CONFIGURATION OF THE FIRST VERIFICATION DEVICE (DECRYPT IS PERFORMED BY THE VERIFICATION DEVICE AND RANDOMIZATION IS NOT CONDUCTED.)

CONFIGURATION OF THE SECOND VERIFICATION DEVICE (DECRYPT IS PERFORMED BY THE VERIFICATION DEVICE AND RANDOMIZATION IS NOT CONDUCTED.)

CONFIGURATION OF THE THIRD VERIFICATION DEVICE (DECRYPT IS PERFORMED BY THE VERIFICATION DEVICE AND RANDOMIZATION IS CONDUCTED.)

CONFIGURATION OF THE FOURTH VERIFICATION DEVICE (DECRYPT IS PERFORMED BY THE VERIFICATION DEVICE AND RANDOMIZATION IS CONDUCTED.)

FLOWCHART OF EMBODIMENT 1

FLOWCHART OF EMBODIMENT 4

FLOWCHART OF EMBODIMENT 5

FLOWCHART OF EMBODIMENT 6

HOW TO VERIFY THE RESULT OF DECRYPT
(COMPARING THE RESULT OF DECRYPT DIRECTLY)

HOW TO VERIFY THE RESULT OF DECRYPT
(USING A UNIDIRECTIONAL FUNCTION)

HOW TO VERIFY THE RESULT OF DECRYPT
(WITH A DECRYPT VALUE BEING A DECODING KEY OF OTHER DATA)

HOW TO VERIFY THE RESULT OF DECRYPT
(VERIFYING THE REDUNDANCY OF A DECRYPT VALUE)

HOW TO VERIFY THE RESULT OF DECRYPT
(WITH A DECRYPT VALUE BEING A PROGRAM CODE)

HOW TO VERIFY THE RESULT OF DECODING
(WITH A DECRYPT VALUE BEING A KEY FOR DECODING A PROGRAM CODE)

FLOWCHART OF EMBODIMENT 8

FLOWCHART OF EMBODIMENT 9

FLOWCHART OF EMBODIMENT 10

A CONFIGURATION EXAMPLE OF A PROOF
DATA GENERATION DEVICE IN EMBODIMENT 11

FLOWCHART SHOWING THE OPERATION OF THE PROOF DATA GENERATION DEVICE IN EMBODIMENT 11

A CONFIGURATION EXAMPLE OF A PROOF
DATA GENERATION DEVICE IN EMBODIMENT 12

FLOWCHART SHOWING THE OPERATION OF THE
PROOF DATA GENERATION DEVICE IN EMBODIMENT 12

FLOWCHART SHOWING THE OPERATION OF THE
PROOF DATA GENERATION DEVICE IN EMBODIMENT 13

A CONFIGURATION EXAMPLE OF A PROOF
DATA GENERATION DEVICE IN EMBODIMENT 14

FLOWCHART SHOWING THE OPERATION OF THE PROOF DATA GENERATION DEVICE IN EMBODIMENT 14

A CONFIGURATION EXAMPLE OF A PROOF DATA GENERATION DEVICE IN EMBODIMENT 15

FLOWCHART SHOWING THE OPERATION OF THE
PROOF DATA GENERATION DEVICE IN EMBODIMENT 15

A CONFIGURATION EXAMPLE OF A PROOF
DATA GENERATION DEVICE IN EMBODIMENT 16

FLOWCHART SHOWING THE OPERATION OF THE
PROOF DATA GENERATION DEVICE IN EMBODIMENT 16

FLOWCHART OF EMBODIMENT 17

FLOWCHART OF EMBODIMENT 18

FLOWCHART OF EMBODIMENT 19

FLOWCHART OF EMBODIMENT 20

FLOWCHART OF EMBODIMENT 21

DEVICE AND METHOD FOR CONDITIONAL AUTHENTICATION

BACKGROUND OF THE INVENTION

1. Field of the Invention

The present invention relates to a technique for authenticating whether a user has the authority to receive service in connection with restrictions such as the term of utilization. According to this technique, the authentication fails if information on the restrictions has been altered. The present invention is also concerned with a technique for decrypting encrypted messages. Particularly, it is verified that information pieces annexed to messages such as information on the term of utilization and control information have not been altered, and only when such information pieces have not been altered, the messages are decrypted correctly.

2. Description of the Prior Art

According to a conventional method for authenticating whether a user has the authority to receive service, the authentication side issues a physical ticket or membership card in advance and the user presents the ticket or the membership card when the user is to receive the service. In this case, the service offerer checks, on the spot, the information pieces described on the ticket or the like such as the valid term and the type of service and thereby effects checking and authentication of conditions. However, since the ticket itself is a physical existence, drawbacks have heretofore been encountered such as an increase in cost for the distribution of such tickets to users or an increase in the ticket manufacturing cost because of a requirement for taking a certain measure to make ticket forgery difficult. On this regard, by making the ticket electronically operable, it becomes possible to reduce the cost of manufacture and distribution. Related techniques are disclosed in Japanese Published Unexamined Patent Application No. Sho 62-171071 entitled "IC Card for Advance Transaction" and Japanese Published Examined Patent Application No. Hei 6-22032 entitled "Public Services Payment System using Electronic Card." In these techniques, however, electronic information corresponding to a ticket is merely nullified upon receipt of service, making no contribution to the implementation of a more versatile ticket such as a coupon type ticket or a combination of a limitation on the term of utilization with a limitation on the amount of utilization. In addition, the above conventional techniques lack in any protective measure against wiretapping of communication between the card and the host at the time of obtaining a ticket electronically or against illegitimate utilization of a ticket made by replay attack.

Further, as a conventional technique involving an additional function of restricting utilization on encrypted digital information, there is known a technique disclosed in Japanese Published Unexamined Patent Application No. Hei 7-131452 which is directed to "Digital Information Protecting Method and Processing Device Therefor." In the invention disclosed therein, digital information is represented by a set of information identifying number, information itself, utilization conditions information, and authenticator. Further, upon input of digital information into a computer, there is generated a second identifier relating to the information identifying number and the utilization conditions information. Then, in utilizing the digital information, there is made verification using two identifiers as to whether or not the utilization conditions described in the utilization conditions information are satisfied, and only when all of the points to be verified have been verified normally, the digital information is decrypted and converted into a utilizable form. However, according to the method disclosed in the above Hei 7-131452, both information itself and utilization conditions are encrypted using the same encryption key for the assurance of a legitimate combination of the two, so when an attempt is made to change utilization conditions for each user, for example, it is necessary to perform encryption every time communication is made or provide corresponding ciphers beforehand for each communication. Thus, the above method has not been suitable for a large-volume distribution of digital information using CD-ROM or the like or for a broadcast that utilizes a satellite broadcast.

SUMMARY OF THE INVENTION

The present invention has been accomplished in view of the above-mentioned problems. According to what is intended by the present invention, at the time of authenticating whether or not a user has the authority to utilize service, what is corresponding to the conventional ticket is made electronic, and in determining whether or not the electronic information thus obtained is legitimate, it is possible to set flexible conditions such as the valid term and a limitation on the number of times of utilization, or a combination thereof, while ensuring safety; further, in the event the conditions should have been altered, authentication is not effected affirmatively.

According to another object of the present invention, at the time of conditionally decrypting an encrypted digital information, it is possible to set decryption conditions, etc. for utilization of the digital information in a decrypted state, which decryption conditions, etc. are independent of the encrypted digital information itself, and therefore it is easy to allocate different conditions, etc. for each user; further, in the event decryption conditions have been altered, decryption of the digital information is not performed correctly.

In the present invention, for achieving the above-mentioned object, an authentication device includes a proof data generation device in which data is generated for authenticating the authority of a user and verification device for verifying the legitimacy of the generated proof data; the proof data generation device includes a first memory part that stores authentication data generated by the verification device, a second memory part that stores control information for generating the proof data, a third memory part that stores proof support information calculated from authentication characteristic information and the control information which is for generating the proof data, and a proof data generation part that generates proof data on the basis of the information pieces stored in the above memory parts; the verification device includes a verification part that verifies that the proof data generated by the proof data generating part is based on the authentication characteristic information; and the authentication characteristic information is a decryption key used in an asymmetric cryptosysytem which utilizes a discrete logarithmic problem on a finite group G.

According to this construction, first, at the time of determining the legitimacy of an electronic ticket, it is possible to set flexible conditions such as the valid term and a limitation on the number of times of utilization, or a combination thereof, while ensuring safety. In addition, it is possible to make control so that authentication is not performed affirmatively in the event those conditions have been altered. Secondly, in the case of conditionally decrypting an encrypted digital information, it is possible to set decryption conditions, etc. for utilization of the digital information in a decrypted state. Further, the decryption conditions, etc. are independent of the encrypted digital information itself, so that it is easy to allocate different conditions, etc. for each user, and in the event of alteration of the decryption conditions, etc., it is possible to prevent the digital information from being decrypted correctly.

Moreover, by using as the authentication characteristic information an asymmetric cryptosysytem which is defined on an elliptic curve on a finite field, there is attained equivalent safety even with a shorter key length in comparison with the use of an RSA public key cipher for example, and the processing can be done at a high speed.

The present invention can be implemented as a method or as a computer program product.

[Entire Constitution]

An entire constitution in the mode for carrying out the present invention will be described below before making reference to concrete embodiments of the invention.

A description will first be given of the case where the present invention is used for controlling the execution of an application program which is executed on a user's PC (personal computer) or work station.

FIGS. 1 and 2 illustrate device configurations used in the mode for carrying out the invention. FIG. 2 is of the same configuration as FIG. 1 except that a proof data verification device 100 used therein also serves as a proof data generation control information generating device 400 shown in FIG. 1. Therefore, the configuration of FIG. 1 will mainly be described below.

In FIG. 1, an authentication device according to the present invention includes a proof data verification device 100 (hereinafter also referred to simply as "verification device"), a proof data generation device 200 (also simply as "proving device"), an access ticket generation device 300 and a proof data generation control information generating device 400. The proof data verification device 100 includes a proof data memory unit 101, a verification part 102 and an execution part 103. The proof data generation device 200 includes a user unique identifying information memory unit 201, a proof data generation part 202, an access ticket memory unit 203 and a proof data generation control information memory unit 204. The access ticket memory unit 203 holds proof support information (referred to as access ticket). The proof data generation control information memory unit 204 holds information (referred to as proof data generation control information) for controlling the generation of proof data. The access ticket generation device 300 generates an access ticket and transfers it to the proof data generation device 200. The proof data generation control information generating device 400 generates proof data generation control information and transfers it to the proof data generation device 200.

In the configuration of FIG. 1, the proof data generation device 200 can be implemented as a proof program on a computer which the user employs. In this case, if the user can copy and distribute unique identifying information (user unique identifying information) for identifying the user, even users not having a legitimate utilization right are allowed to use the application program. In this point of view, the user identifying information is loaded into the computer so that even the user as a legitimate information holder cannot steal the information, and it is possible also to use proof hardware (e.g. IC card or board) having an anti-tamper characteristic. The use of such portable hardware as IC card is convenient for the user to perform works on plural PCs or work stations.

The proof data verification device 100 is constituted as part of the application program utilized by the user. More specifically, once the user starts the application program on a PC or a work station, the proof data verification device 100 described as a program in the application program is started and makes communication with the proof data generation device 200 to authenticate the user. Only when the communication is terminated correctly, the execution of the application program is made possible.

In order for the user to utilize the above application program with the proof data verification device 100 embedded therein, there are needed proof support information (access ticket) and control information (proof data generation control information) for the generation of proof data, which are issued to the user and correspond to the application program. The proof data generation control information is used for determining whether the utilization of the application program meets the conditions for use which the user is required to satisfy at the time when the proof data generation device 200 generates proof data. As to the proof data generation control information, the user acquires the same information generated by the proof data generation control information generating device 400 as shown in FIG. 1, or it is transmitted together with authentication data to the proof data generation device 200 from the proof data verification device 100 and is registered therein, as shown in FIG. 2. Although the following description follows the configuration shown in FIG. 1, it is also true of the configuration shown in FIG. 2. The user registers the acquired access ticket and control information for the generation of proof data into the proof data generation program installed on the PC or the work station. For example, when the user unique identifying information is sealed in an IC card, the user loads the IC card into the PC or the work station. The access ticket may be placed on the PC or the work station, or it may be put into the IC card.

The proof data generation device 200, which is composed of the program installed on the PC or the work station and the IC card, makes calculation on the basis of the user unique identifying information, the access ticket and the control information for the generation of proof data, and then communicates with the proof data verification device 100 on the basis of the calculation. In the course of this calculation there is used the user identifying information. Leakage of the user identifying information to the outside would give rise to a problem, so it is necessary that at least a part of the program be protected by a protective part such as an IC card.

The case where the authentication by the proof data verification device 100 becomes successful as a result of the communication is limited to the case where the following four are correctly correlated with one another: user unique identifying information, access ticket, proof data generation control information, and unique security characteristic information verified by the proof data verification device 100. If any one of the user unique identifying information, access ticket and proof data generation control information is omitted, the authentication will not be successful.

Each access ticket is issued for a specific user, taking into account conditions for use of an application program allowed to the user. In generating the access ticket, there are used the unique identifying information of the specific user and the proof data generation control information. If the user unique identifying information used at the time of generating the access ticket and the user unique identifying information used by the proof data generation device 200 are not coincident with each other, or if the utilization of the application program does not meet the conditions for use which are based on the proof data generation control information and which should be satisfied by the user, the authentication will not be successful.

The access ticket is generated on the basis of specific unique security characteristic information, and the proof data verification device 100 is configured so as to authenticate the unique security characteristic information. Therefore, also when the characteristic information used in generating the access ticket and the characteristic information to be authenticated by the proof data verification device 100 embedded in the application program do not correspond to each other, the authentication will not be successful.

There may be adopted a configuration wherein the application program is executed on another computer coupled to the user's computer through a network and the results of the execution are transmitted to the user's computer through the network. This configuration is based on what is called a server-client model. In the foregoing execution control for the application program executed on the user's PC or the work station, the communication between the proof data generation device 200 and the proof data verification device 100 is carried out as so-called interprocess communication while, when the server-client model is followed, the communication between the proof data generation device 200 and the proof data verification device 100 is carried out as communication which follows a network protocol such as TCP/IP (Transmission Control Protocol/Internet Protocol).

The present invention is applicable also to the case where an application program is formed on a dedicated device. For example, it is assumed that the whole of the proof data generation device 200 is mounted within an IC card and that the acquired access ticket and proof data generation control information are also registered in the IC card. The dedicated device, on which the proof data verification device 100 is mounted, is provided with a slot for insertion therein of an IC card. The user inserts his or her IC card into the slot to effect authentication.

Such a configuration using the dedicated device is applicable, for example, to an ATM (automatic teller machine) in a bank or a game machine in a game center.

As methods for the user to acquire the access ticket and the proof data generation control information, there are a method wherein a common center, which issues those information pieces, generates and distributes them in compliance with the user's request for issuance and a method wherein the person who has prepared the application program generates, in an each individual manner, the information pieces in question with the aid of an access ticket issuing program and the access ticket generation device 300, as well as a proof data generation control information issuing program and the proof data generation control information generating device 400.

In the above methods, the generation devices are managed by the ticket issuer and the access ticket, etc. are generated and distributed independently of the user environment by a legitimate right holder thereof.

The generated access ticket and proof data generation control information may be distributed to the user through a portable storage medium such as floppy disk. Since the access ticket is sufficiently safe, there maybe adopted a configuration using an electronic mail or the like for distribution through a network.

The safety of the access ticket involves the following two properties.
1) The access ticket is a subscribing type ticket. That is, only the user to whom the access ticket has been issued (to be exact, the person who holds the user unique identifying information used in the generation of the access ticket) can operate the proof data generation device 200 correctly with use of the access ticket. Therefore, even if a third party of malice has acquired the access ticket of another user in an illegitimate manner, it is impossible for the third party to utilize the access ticket unless the third party acquires the unique identifying information of the regular user to whom the access ticket has been issued.
2) The access ticket possesses more strict safety. Even if a third party of malice collects any number of access tickets and conducts an analysis, it is impossible for the third party to forge another access ticket on the basis of the information obtained, nor is it possible for the third party to configure a device which attains authentication in imitation of the operation of the proof data generation device 200.

DETAILED DESCRIPTION OF PREFERRED EMBODIMENTS

More concrete configurations will be described hereunder by way of embodiments of the invention. In each of the embodiments, the relation of the configuration of proof data verification device 100, that of proof data generation device 200 and authenticating operation to the drawings is as shown in Table 1 below.

TABLE 1

Figure 3:
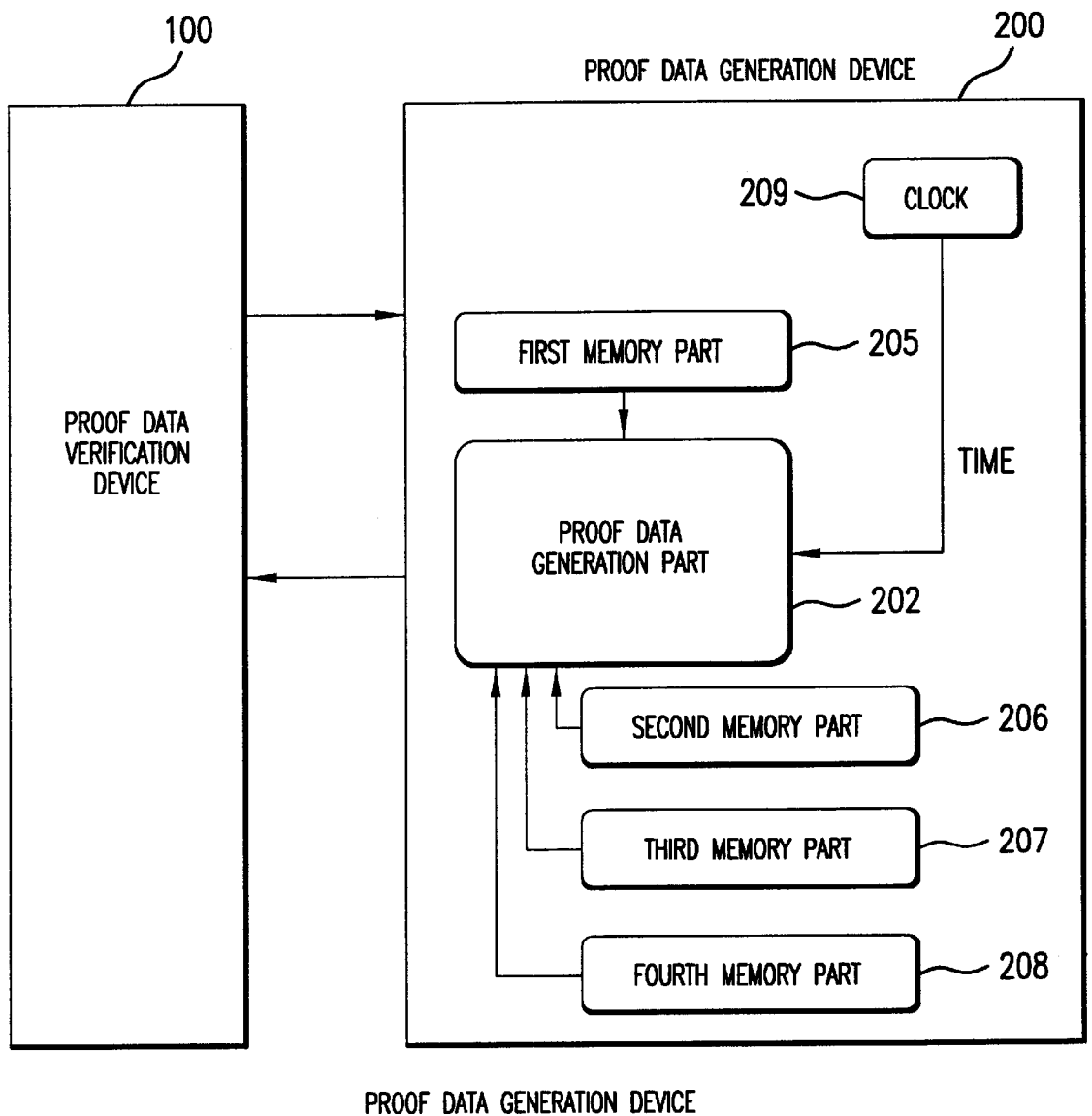
FIG. 3 is a block diagram showing the configuration of a proof data generation device.
Figure 4:
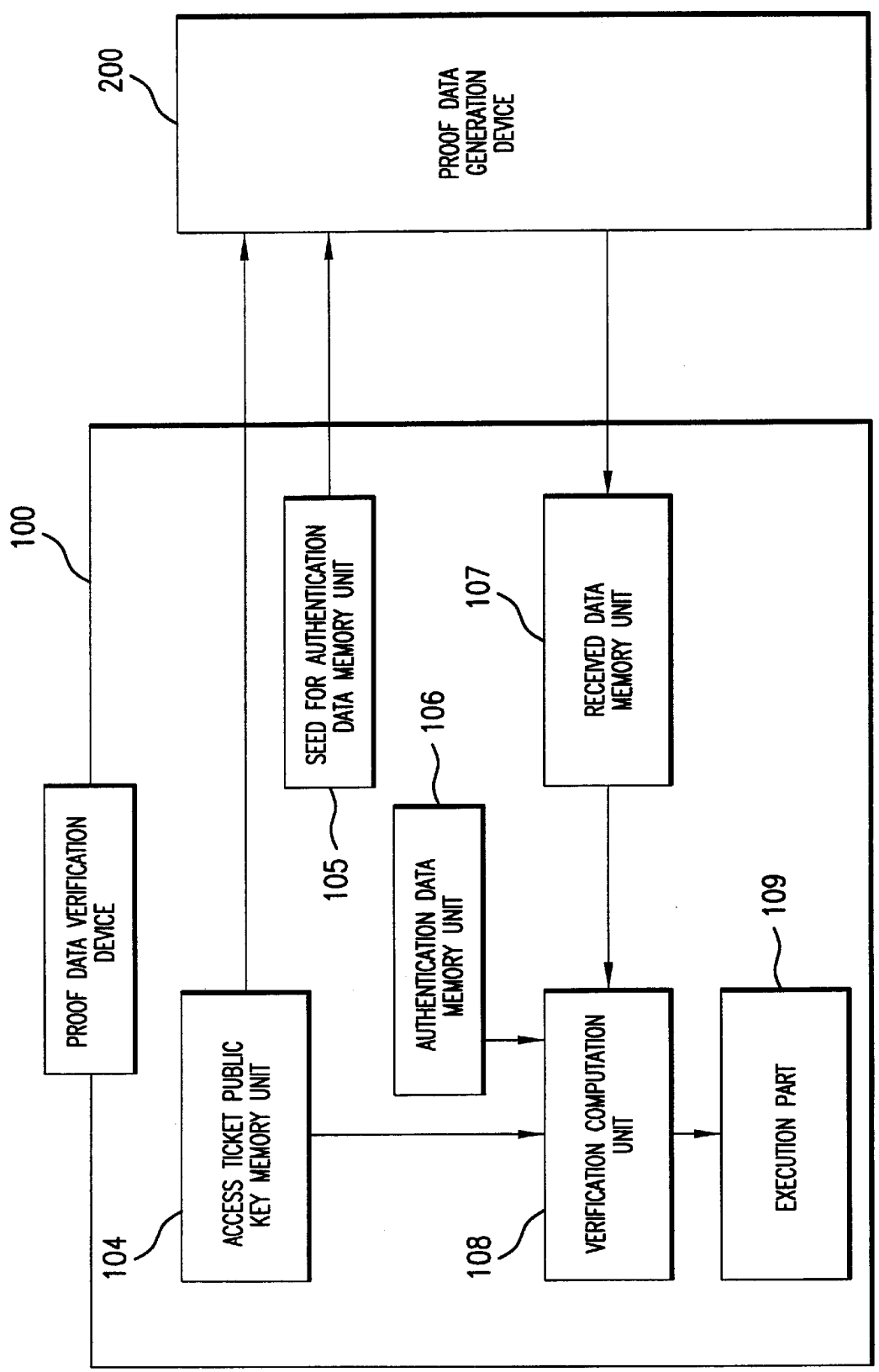
FIG. 4 is a block diagram showing the configuration of a first proof data verification device.
Figure 5:
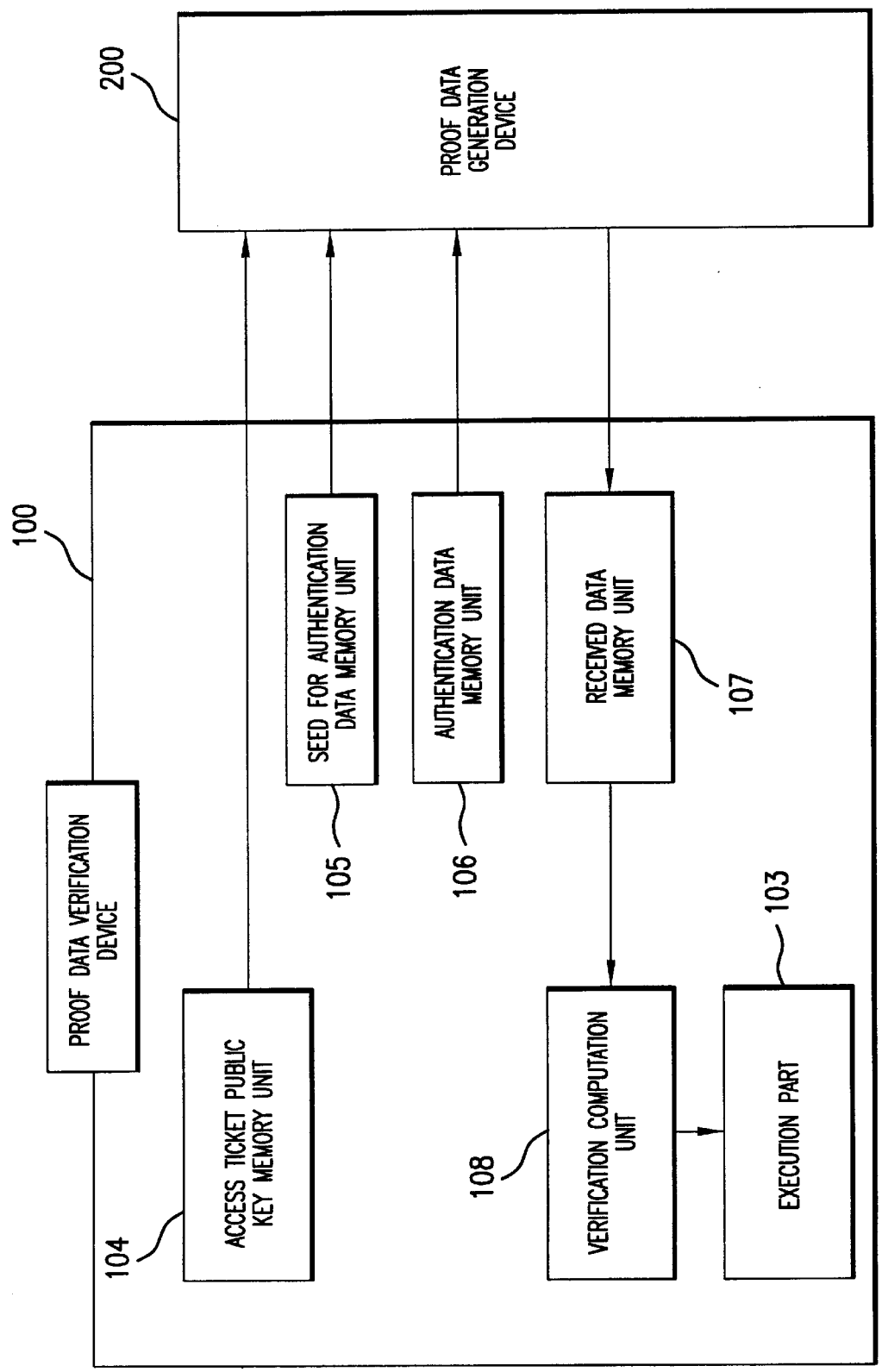
FIG. 5 is a block diagram showing the configuration of a second proof data verification device.
Figure 6:
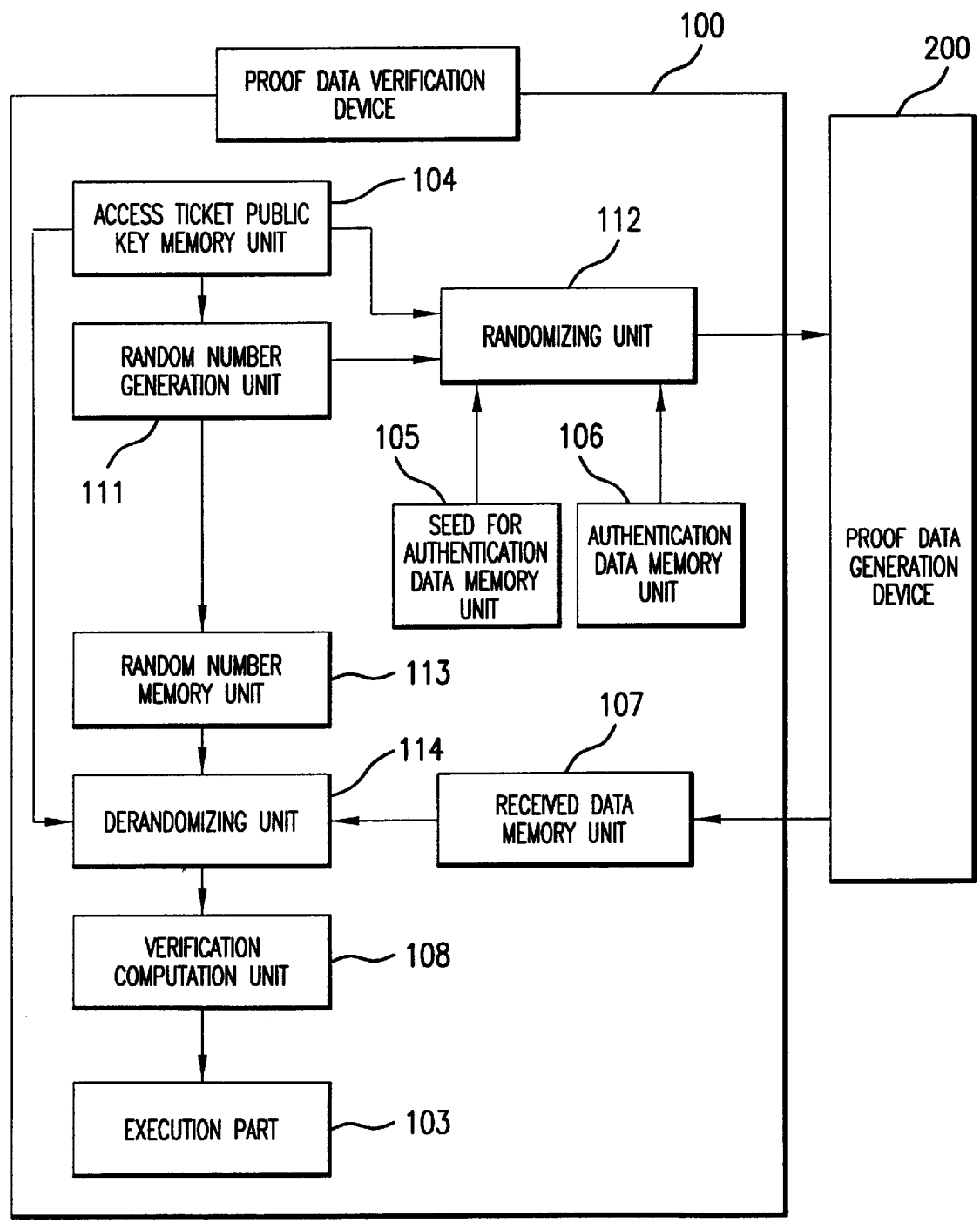
FIG. 6 is a block diagram showing the configuration of a third proof data verification device.
Figure 7:
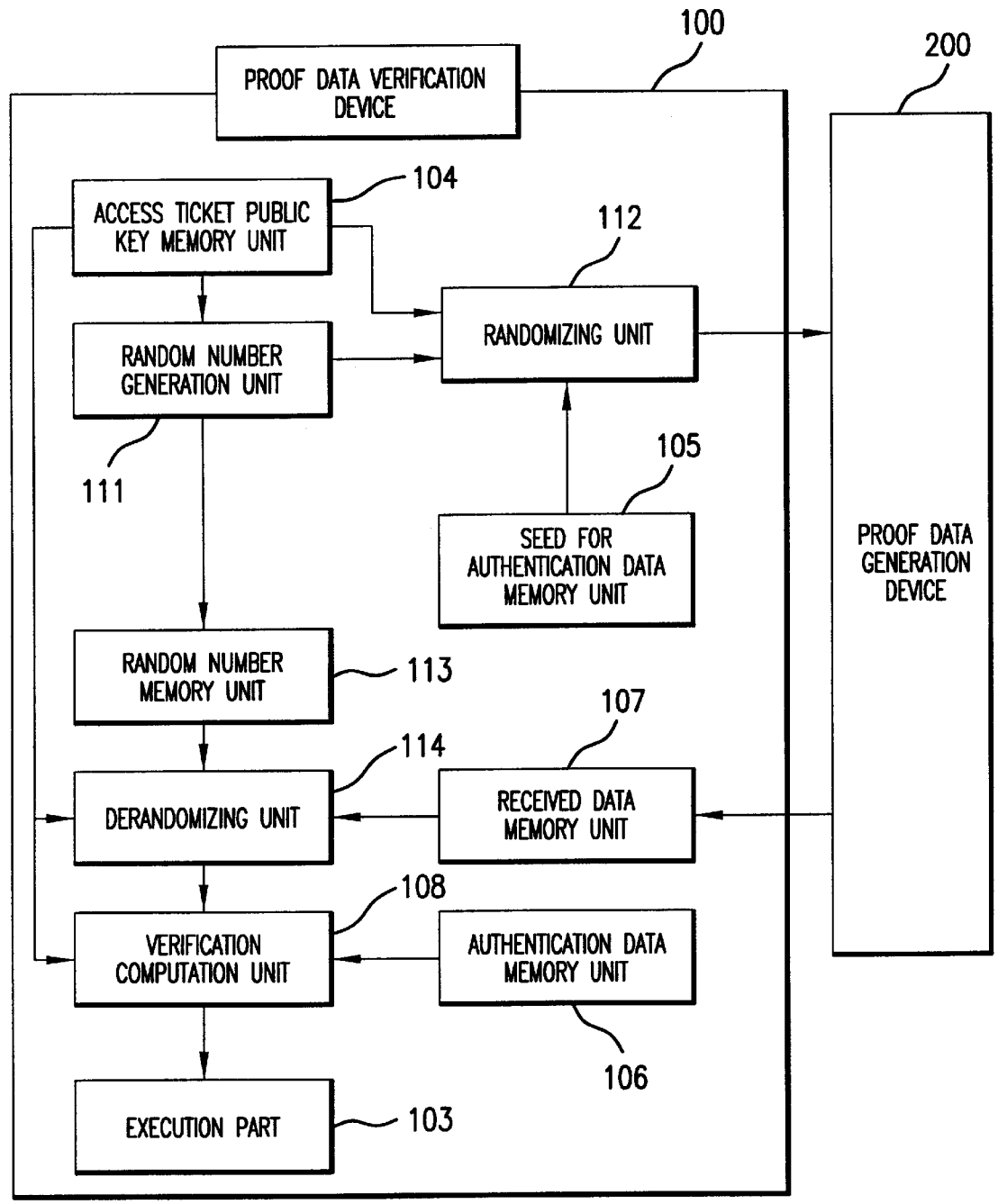
FIG. 7 is a block diagram showing the configuration of a fourth proof data verification device.
Figure 8:
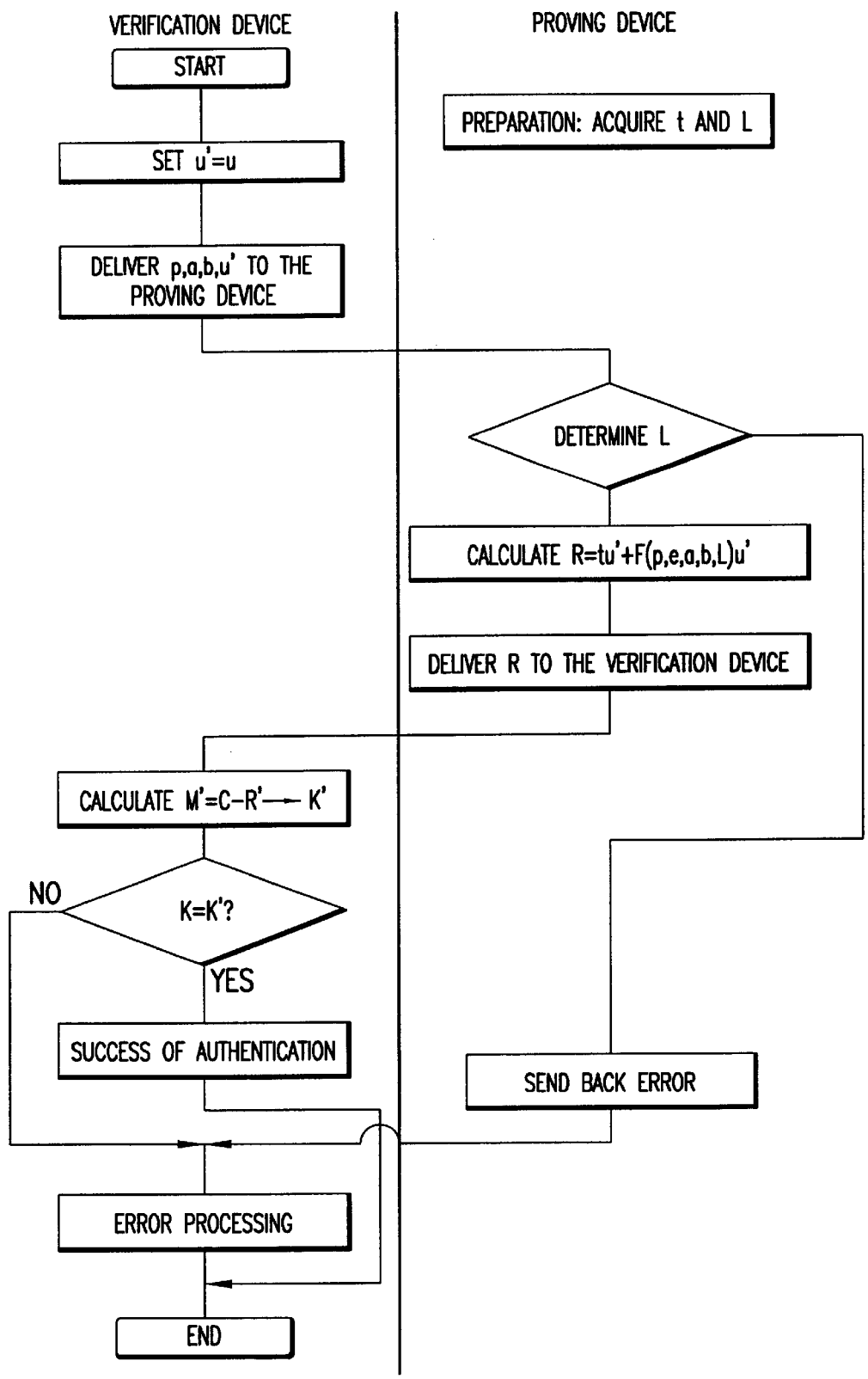
FIG. 8 is a flowchart explaining the operation of Embodiment 1.
Figure 9:
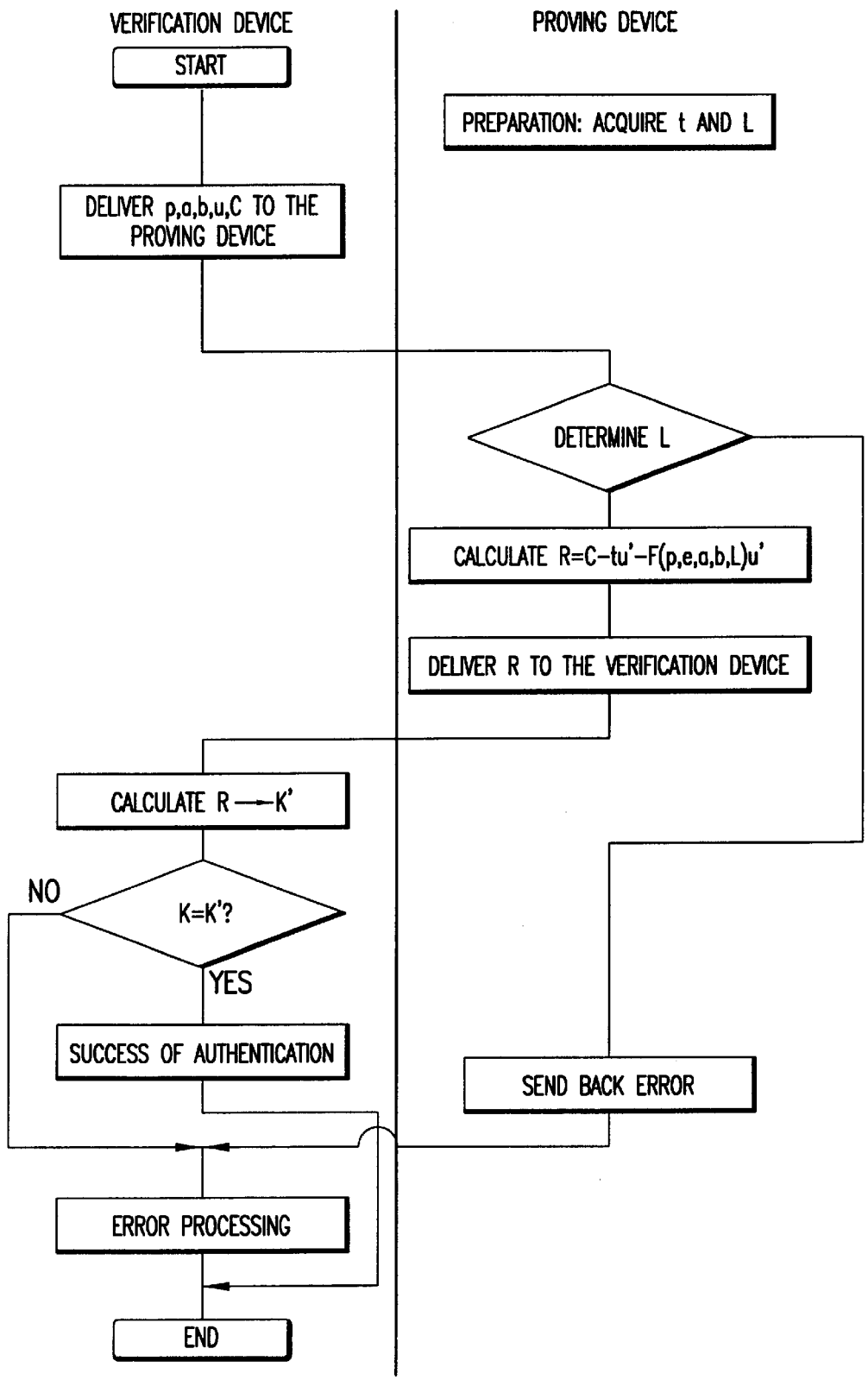
FIG. 9 is a flowchart explaining the operation of Embodiment 2.
Figure 10:
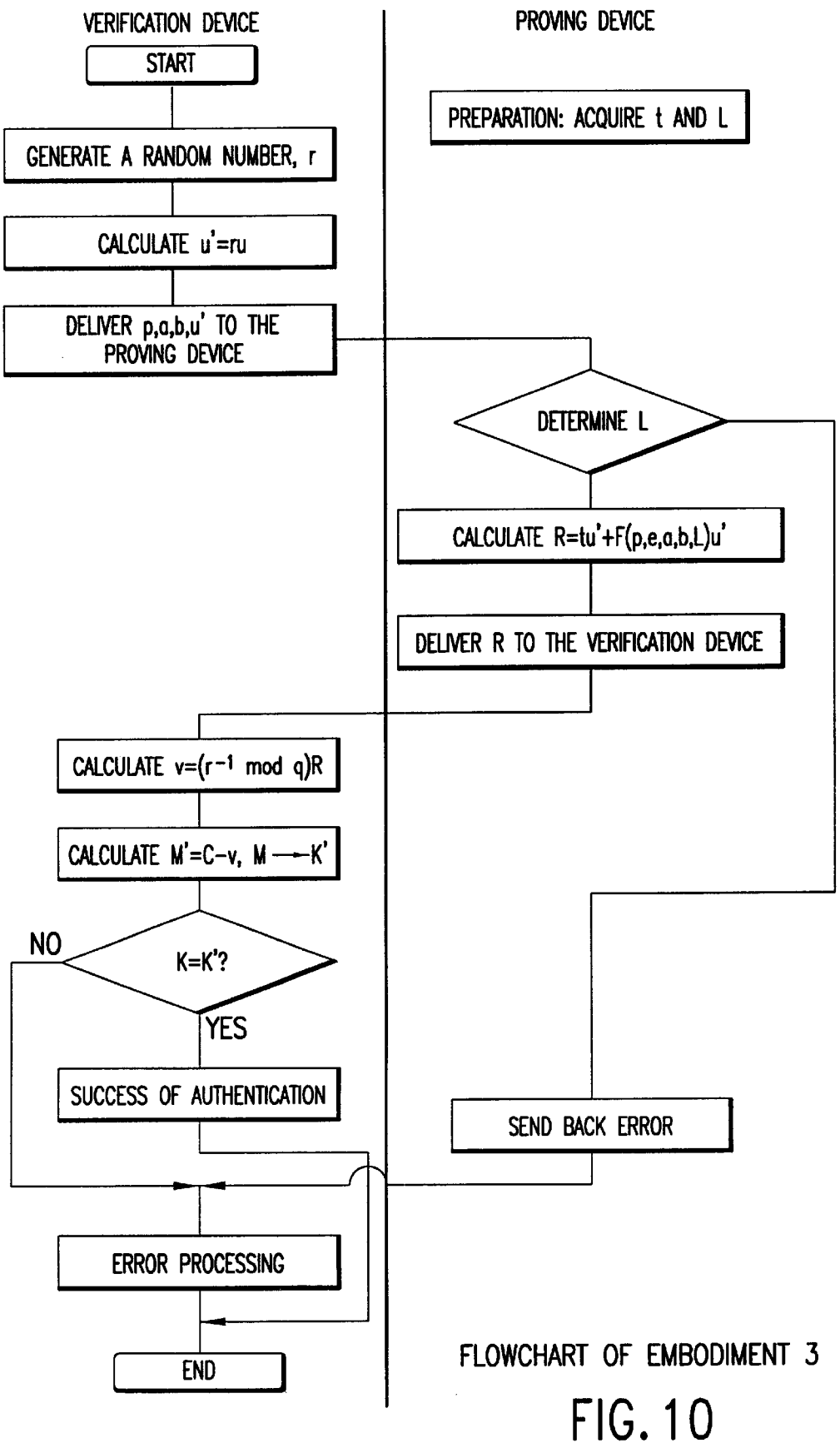
FIG. 10 is a flowchart explaining the operation of Embodiment 3.
Figure 11:
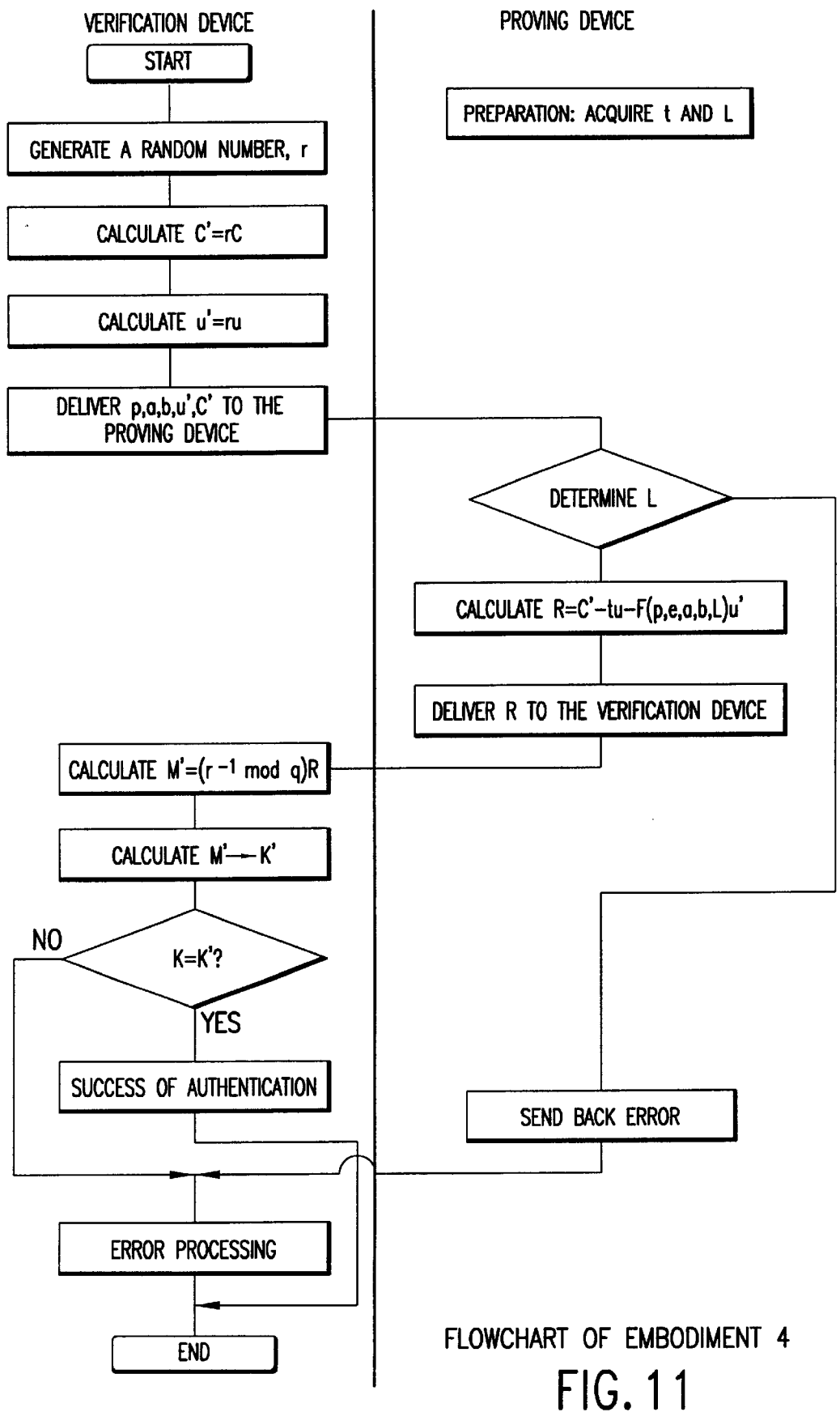
FIG. 11 is a flowchart explaining the operation of Embodiment 4.
Figure 12:
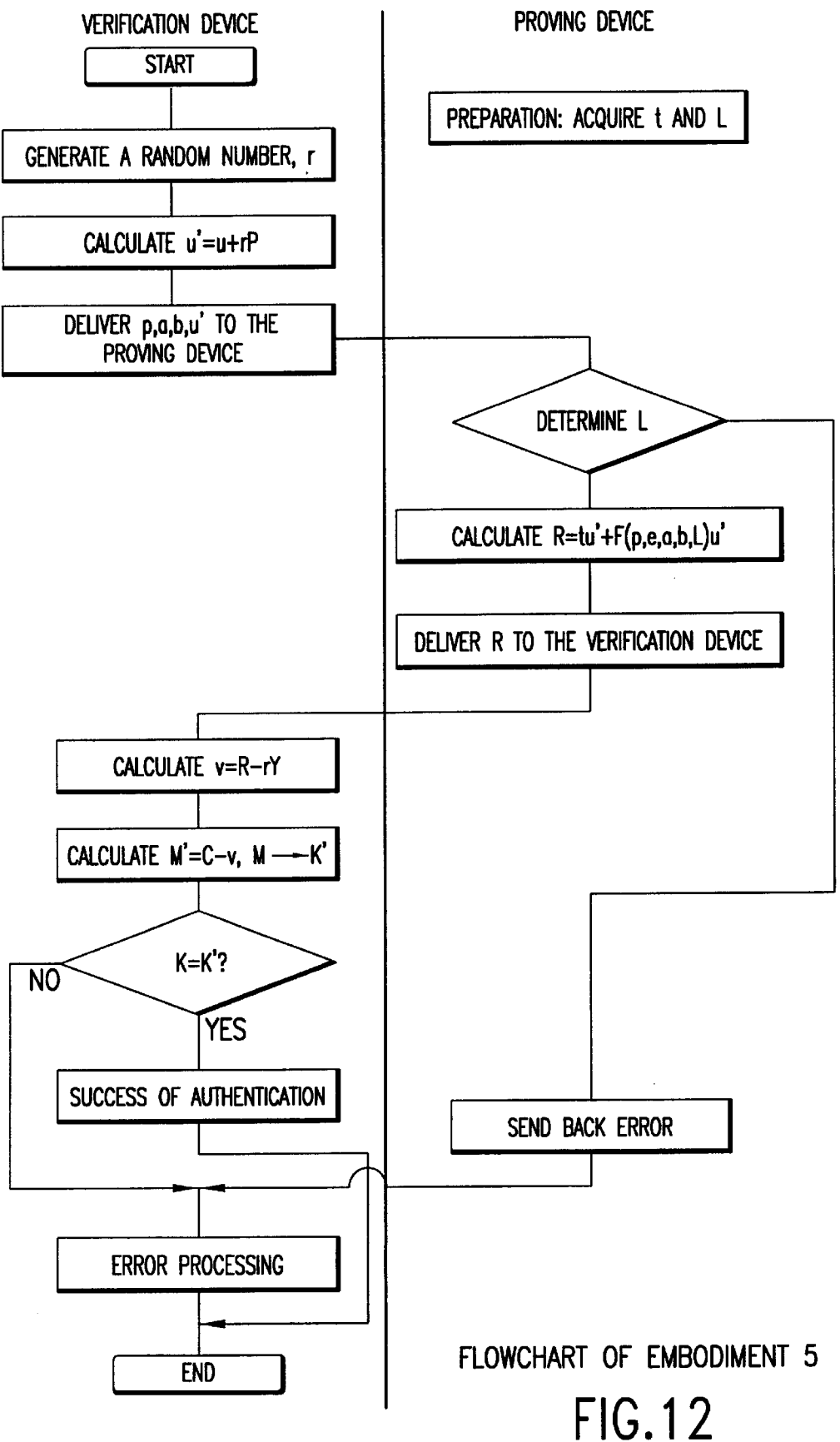
FIG. 12 is a flowchart explaining the operation of Embodiment 5.
Figure 13:
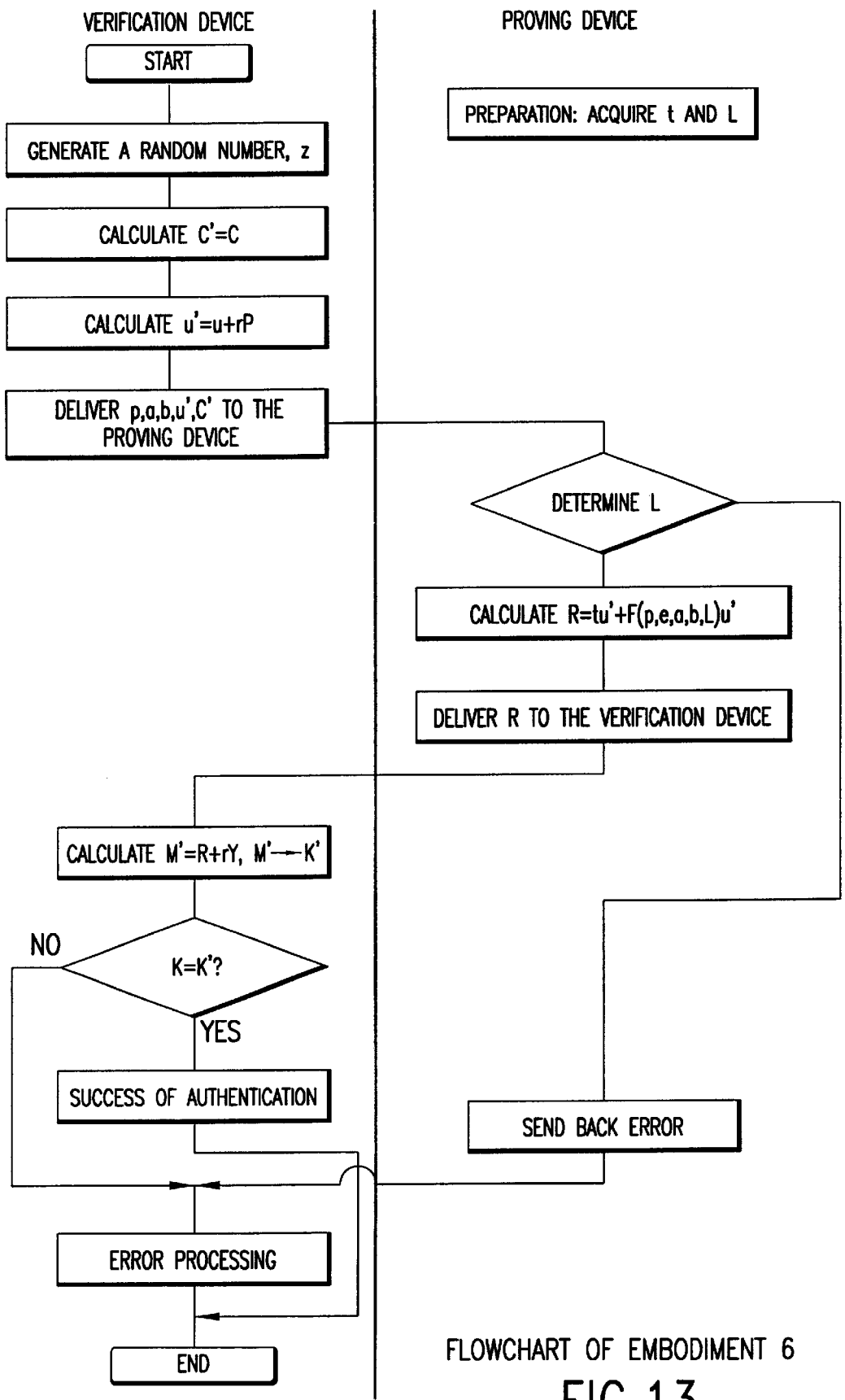
FIG. 13 is a flowchart explaining the operation of Embodiment 6.

| Embodiment | Proof Data Generation Device | Proof Data Verification Device | Authenticating Operation |
|---|---|---|---|
| 1 | FIG. 3 | FIG. 4 | FIG. 8 |
| 2 | FIG. 3 | FIG. 5 | FIG. 9 |
| 3 | FIG. 3 | FIG. 7 | FIG. 10 |
| 4 | FIG. 3 | FIG. 6 | FIG. 11 |
| 5 | FIG. 3 | FIG. 7 | FIG. 12 |
| 6 | FIG. 3 | FIG. 6 | FIG. 13 |

TABLE 1-continued

Figure 20:
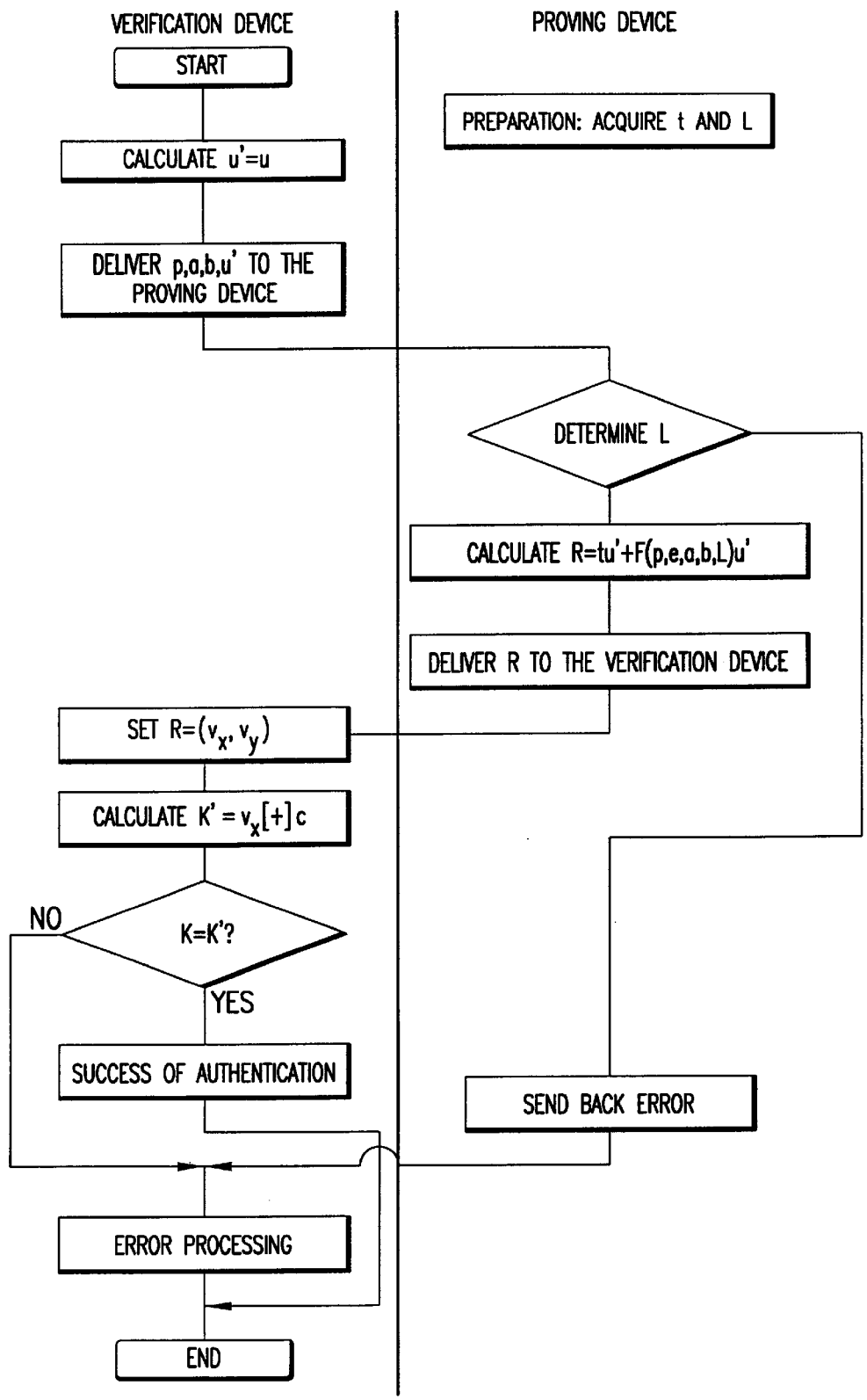
FIG. 20 is a flowchart explaining the operation of Embodiment 7.
Figure 21:
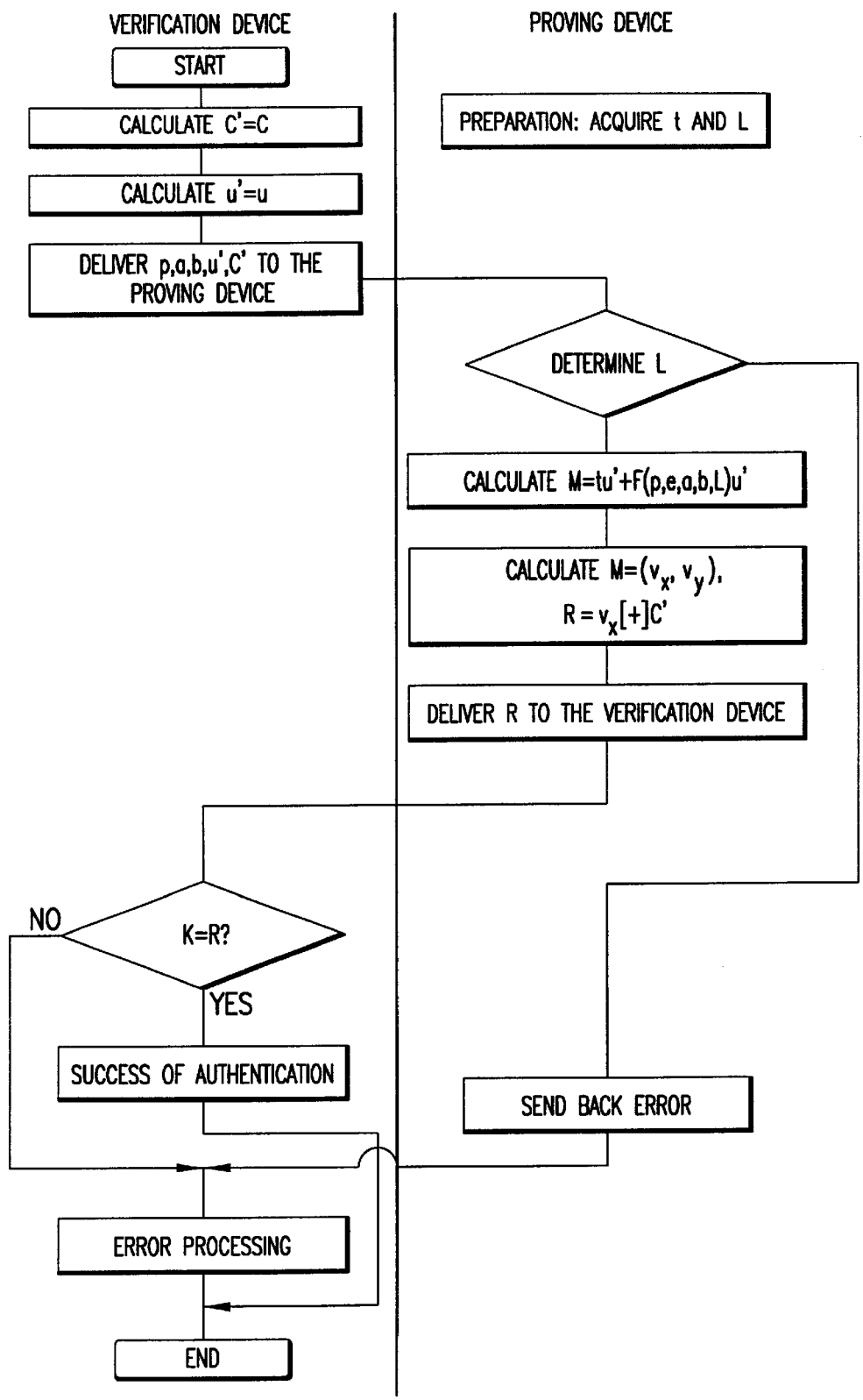
FIG. 21 is a flowchart explaining the operation of Embodiment 8.
Figure 22:
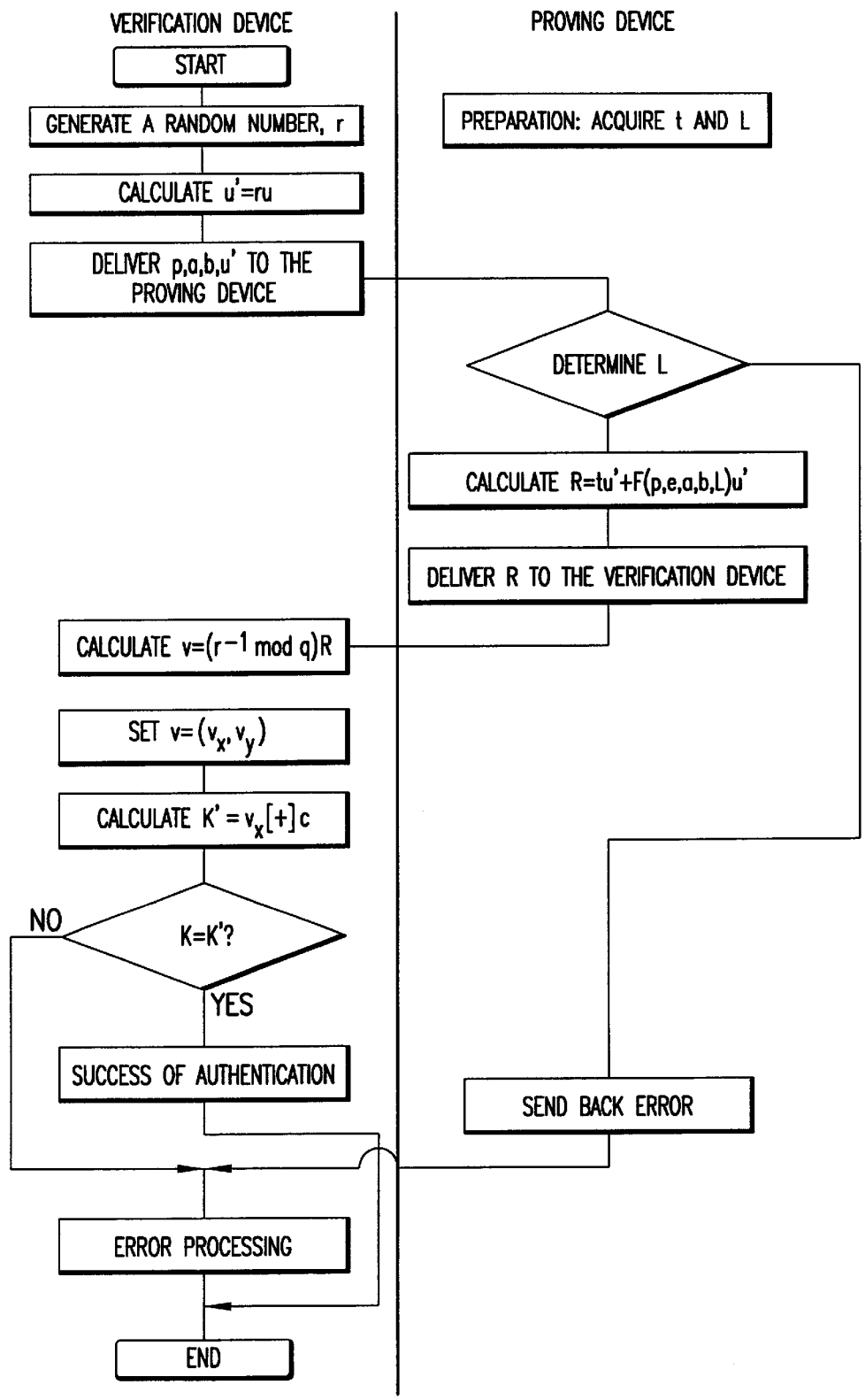
FIG. 22 is a flowchart explaining the operation of Embodiment 9.
Figure 23:
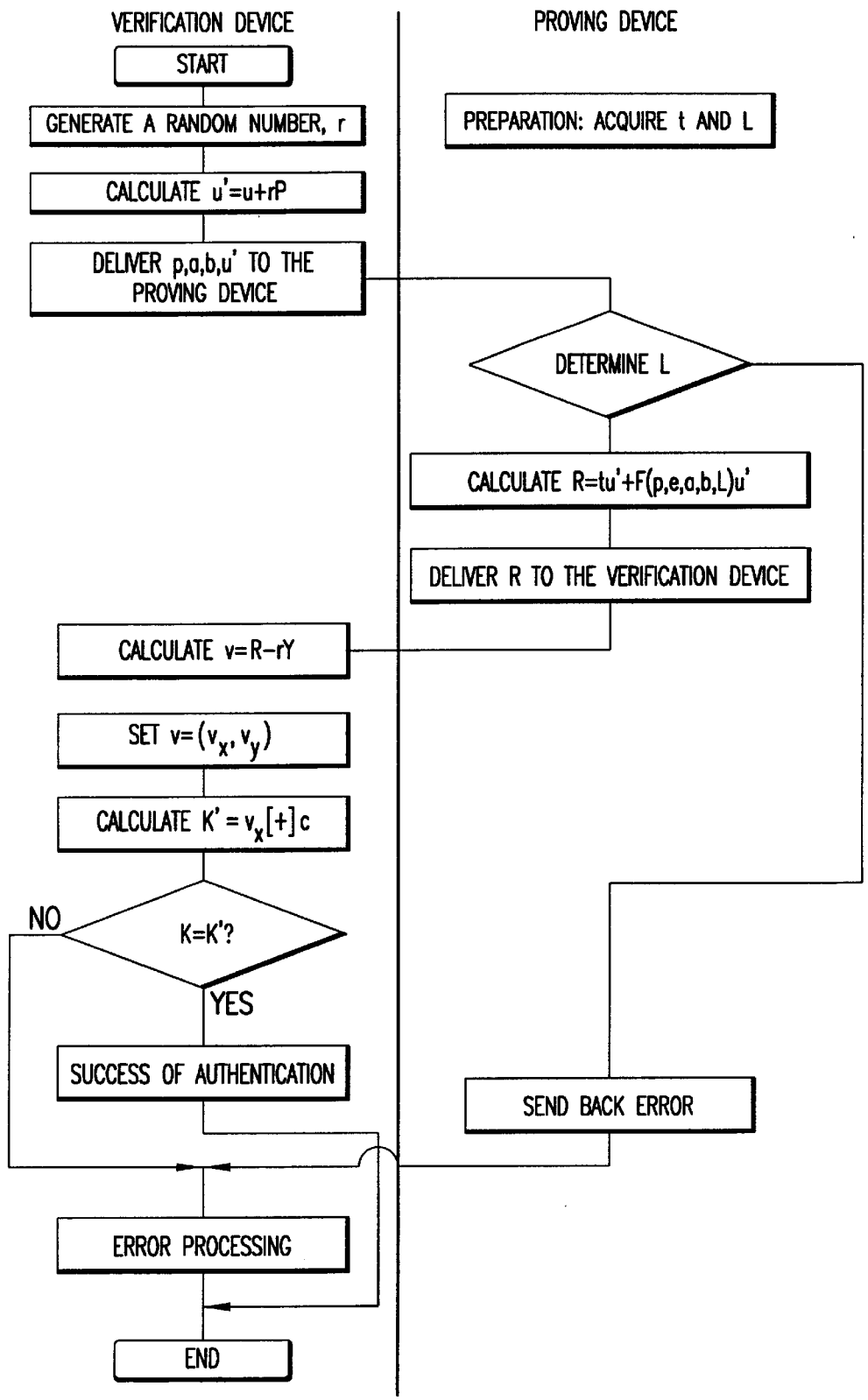
FIG. 23 is a flowchart explaining the operation of Embodiment 10.
Figure 24:
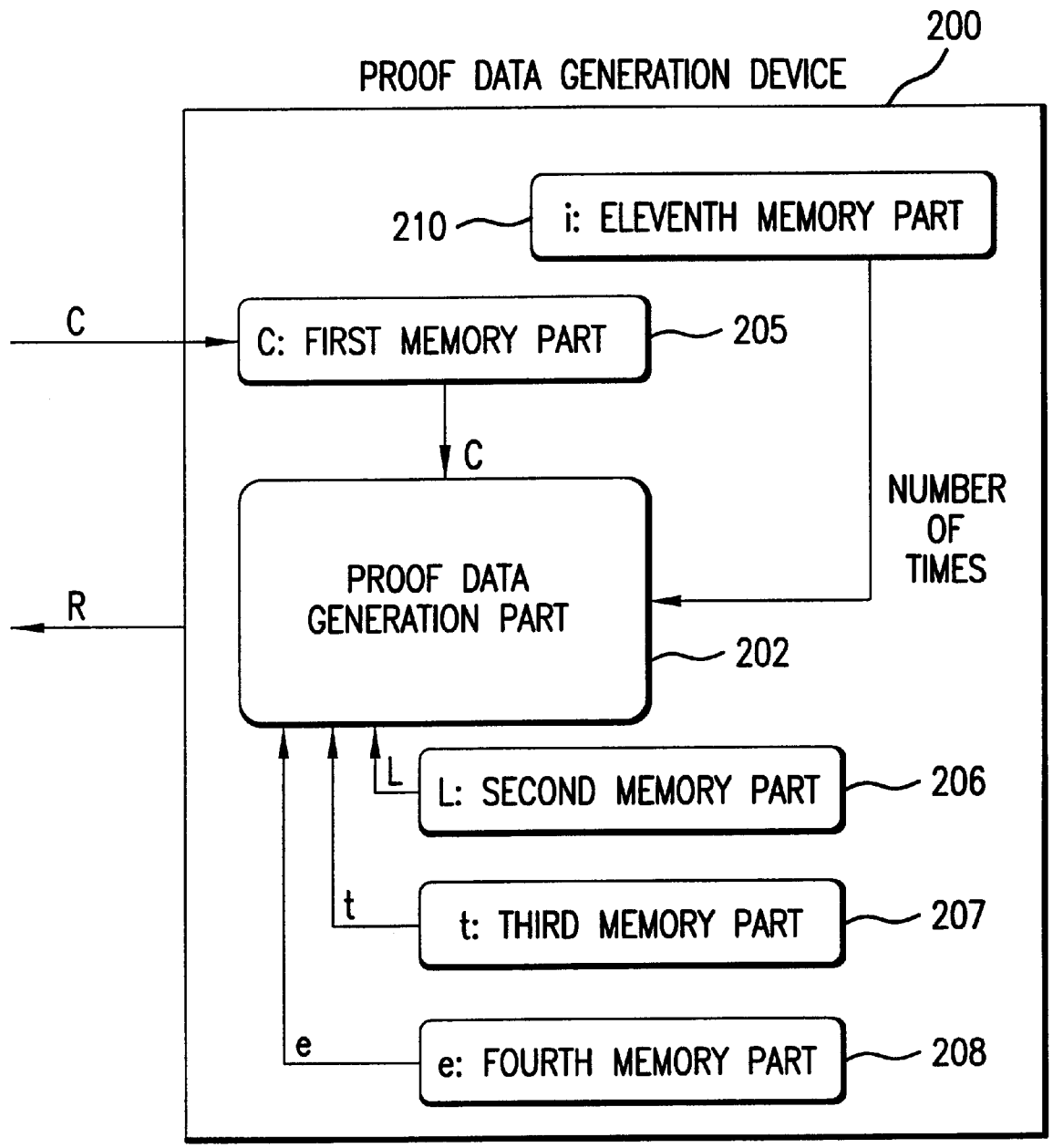
FIG. 24 is a block diagram showing a configuration example of a proof data generation device used in Embodiment 11.
Figure 25:
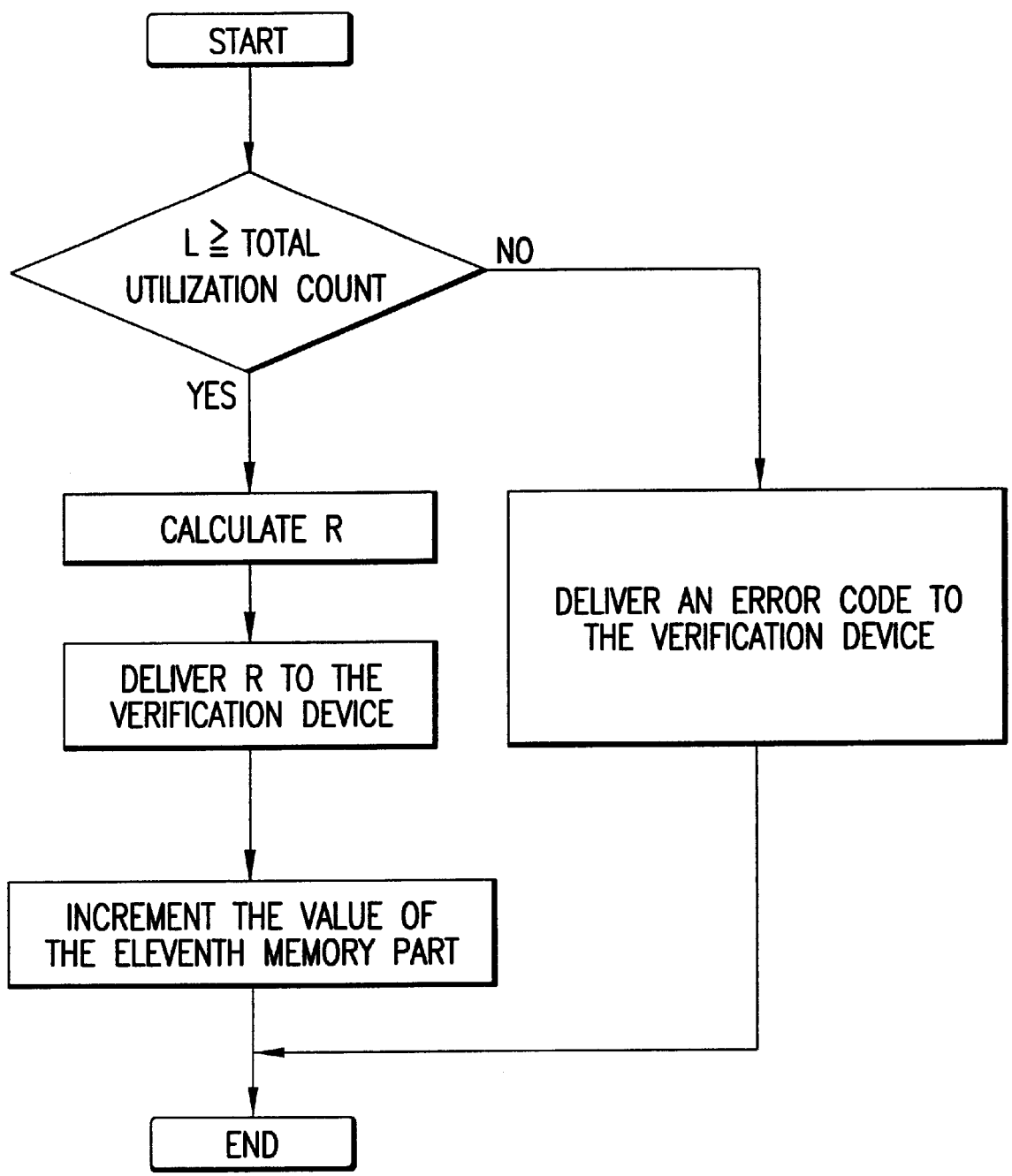
FIG. 25 is a flowchart showing the operation of the proof data generation device used in Embodiment 11.
Figure 26:
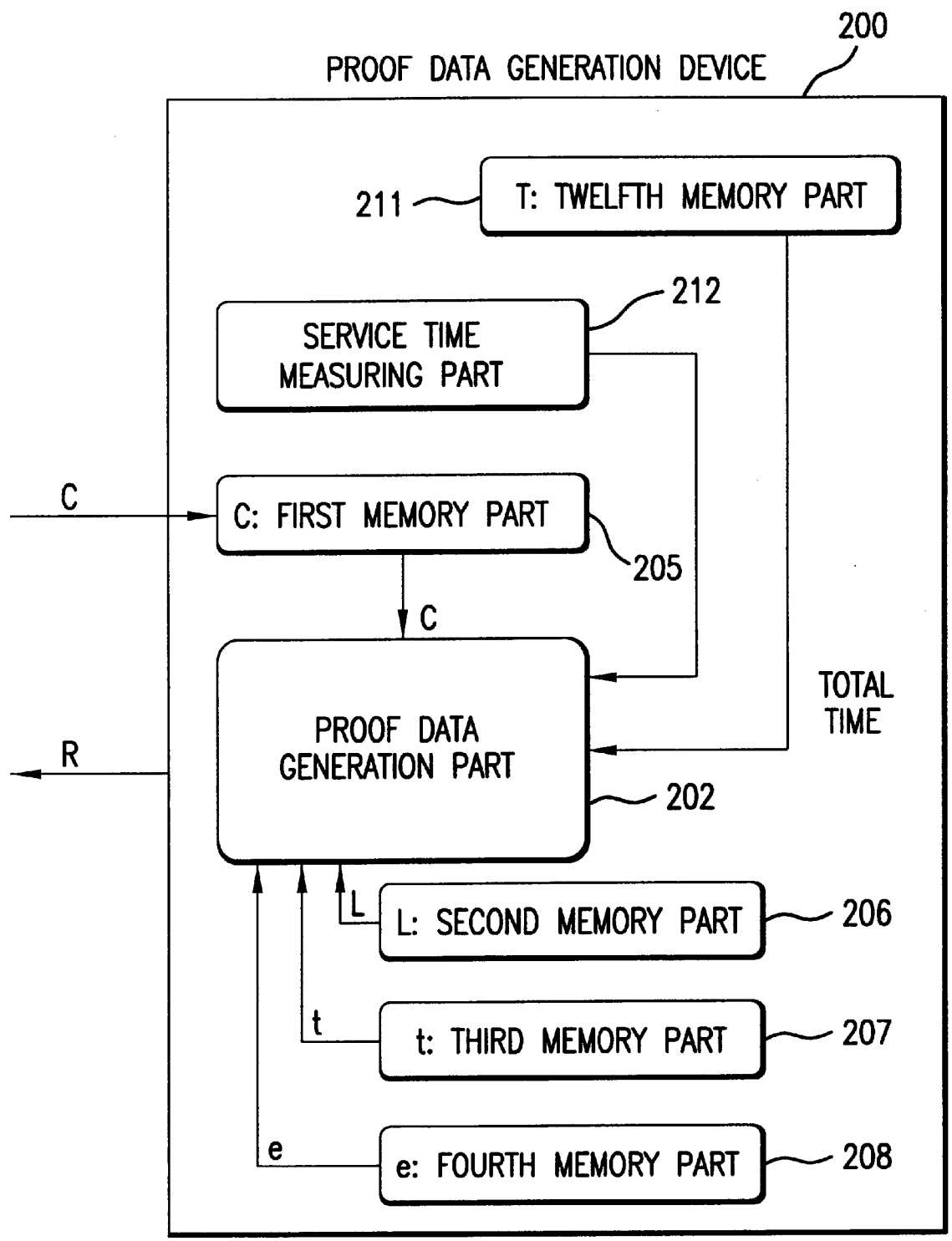
FIG. 26 is a block diagram showing a configuration example of a proof data generation device used in Embodiment 12.
Figure 27:
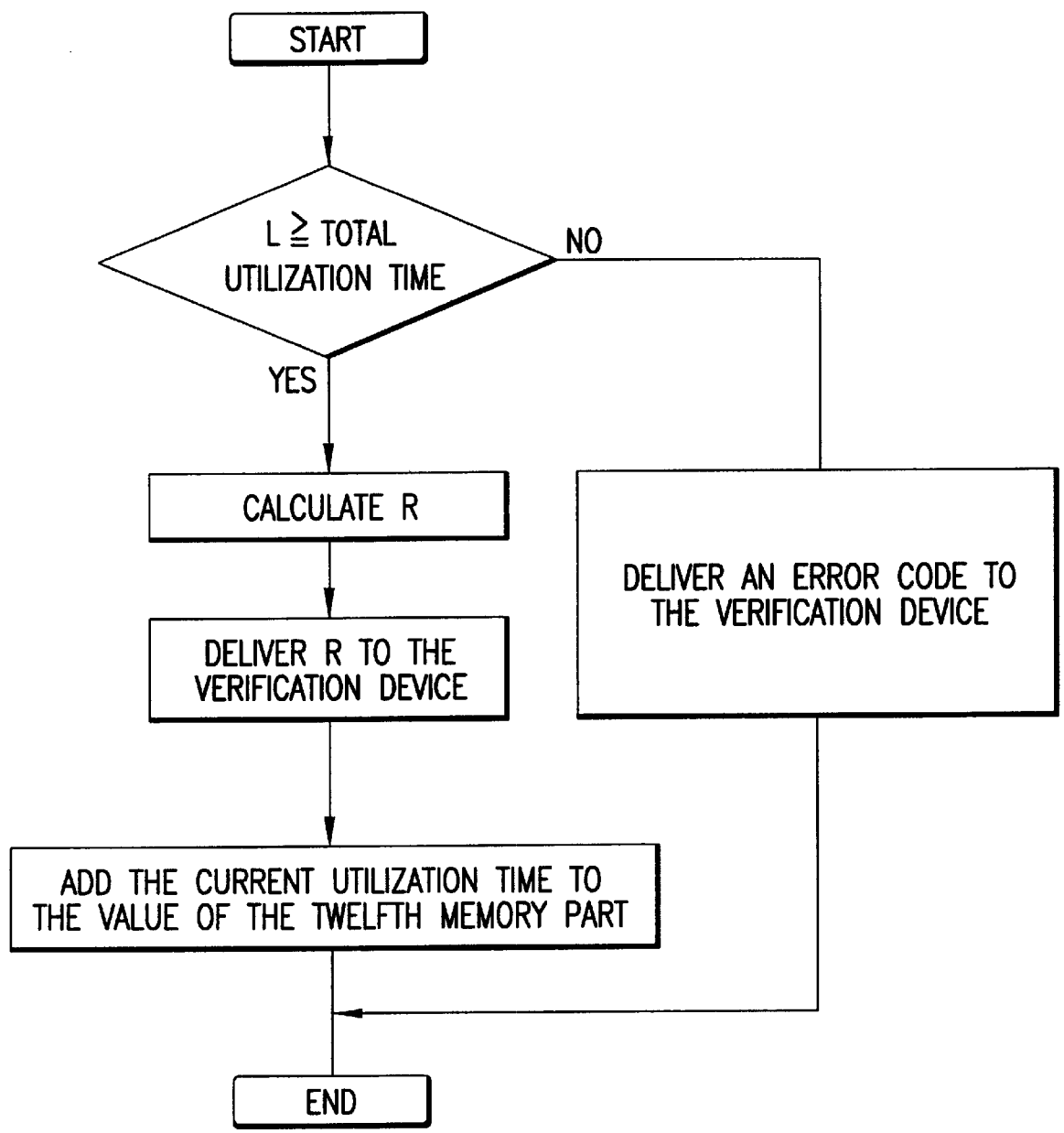
FIG. 27 is a flowchart showing the operation of the proof data generation device used in Embodiment 12.
Figure 28:
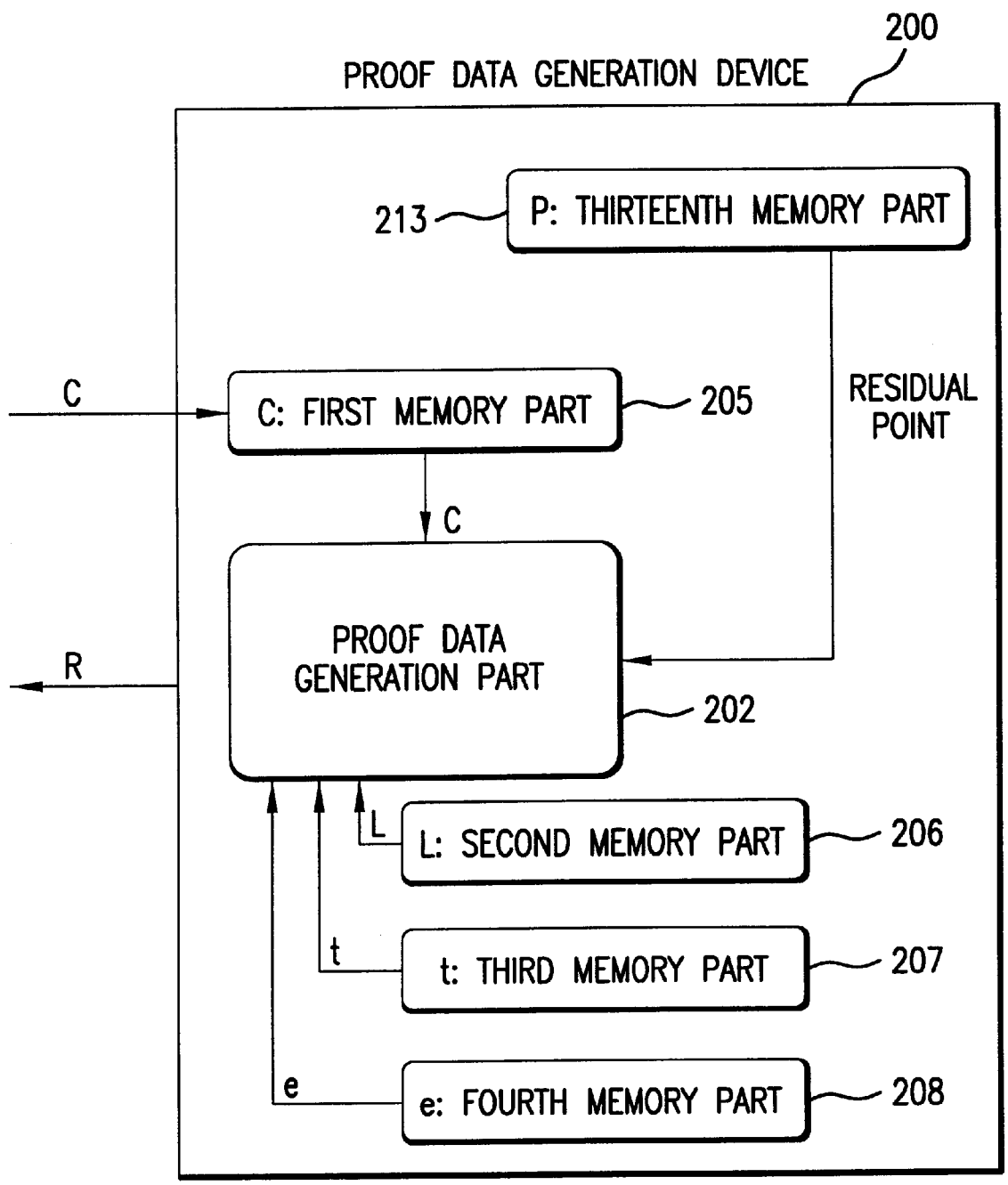
FIG. 28 is a block diagram showing a configuration example of a proof data generation device used in Embodiment 13.
Figure 29:
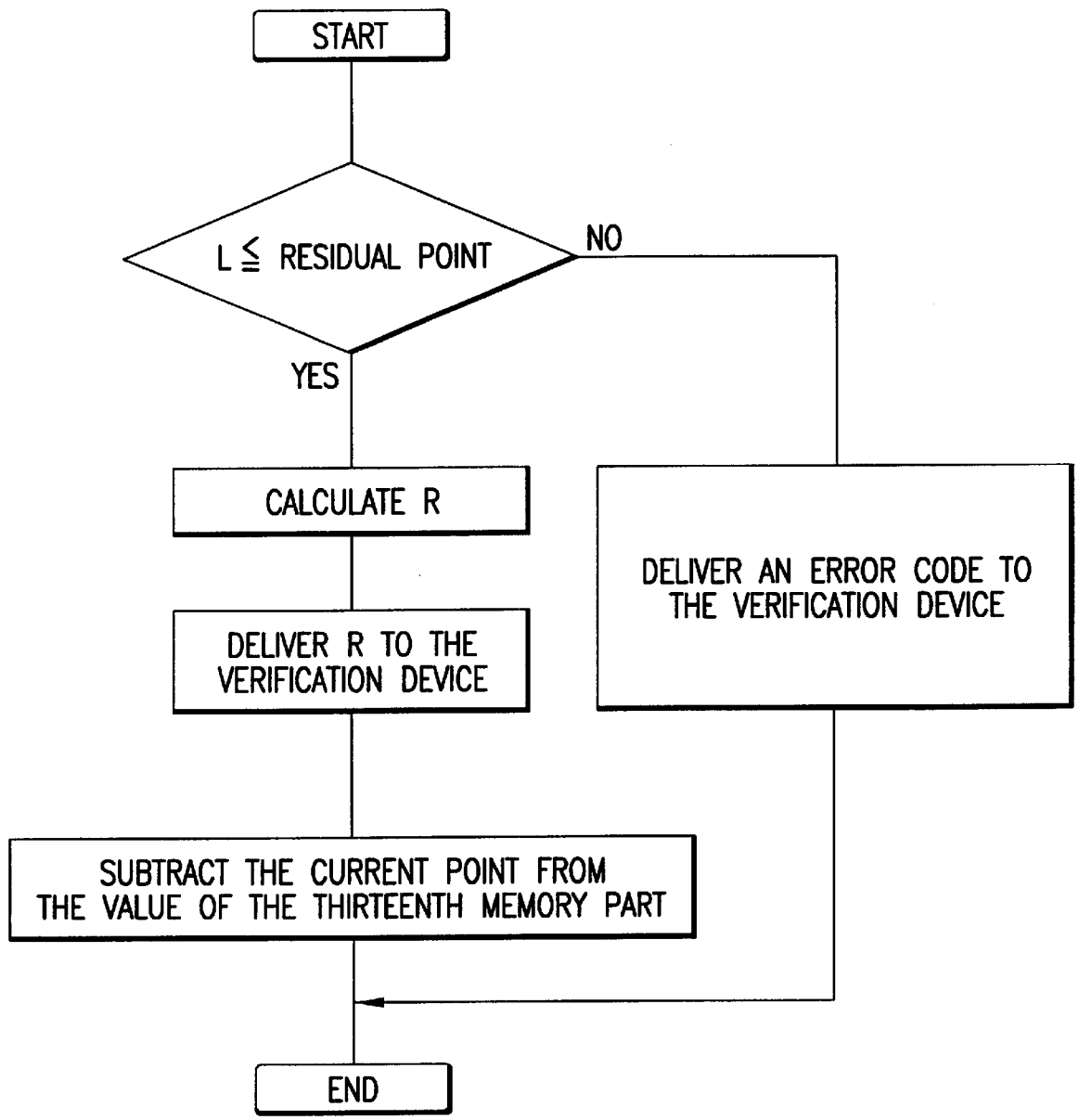
FIG. 29 is a flowchart showing the operation of the proof data generation device used in Embodiment 13.
Figure 30:
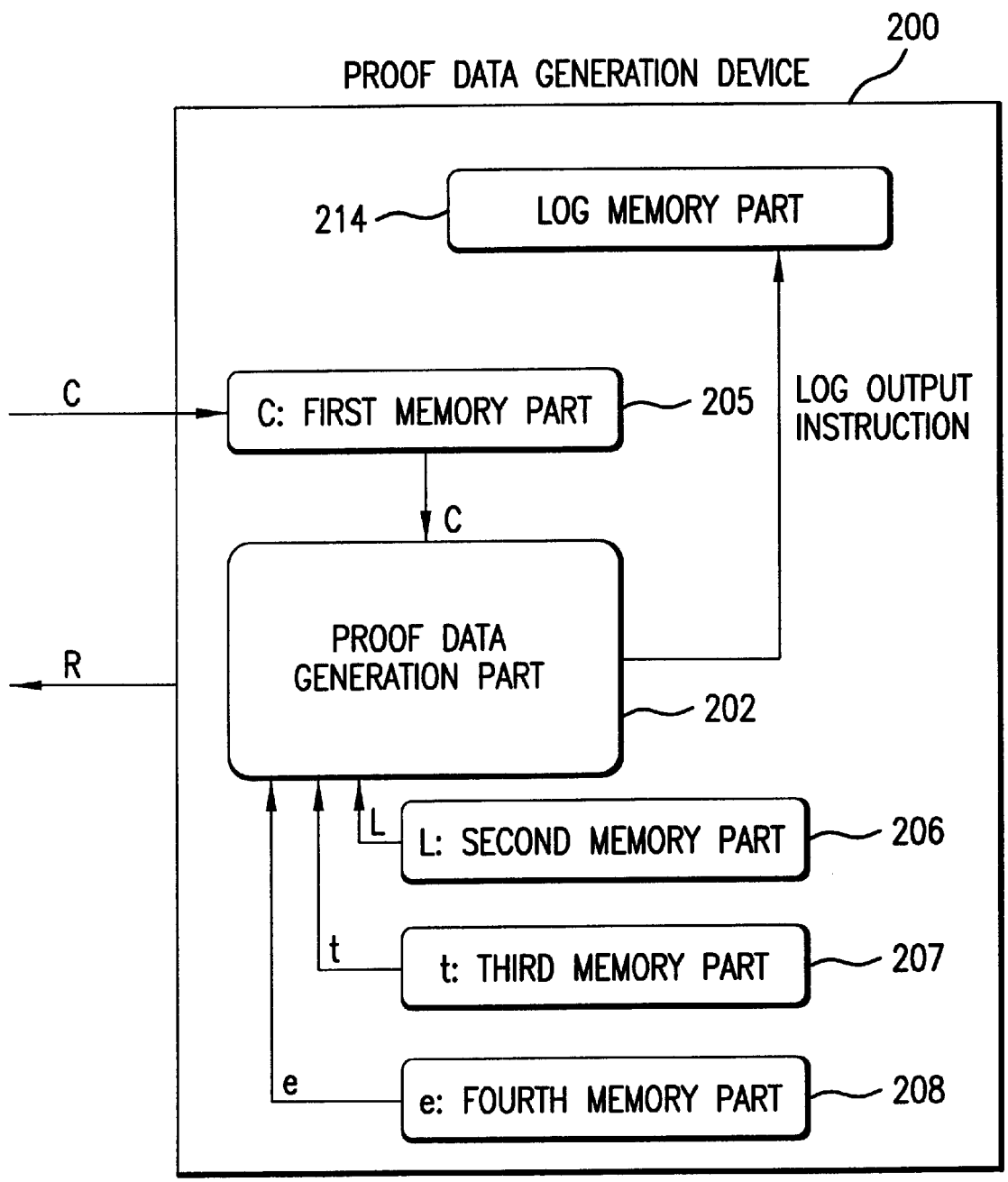
FIG. 30 is a block diagram showing a configuration example of a proof data generation device used in Embodiment 14.
Figure 31:
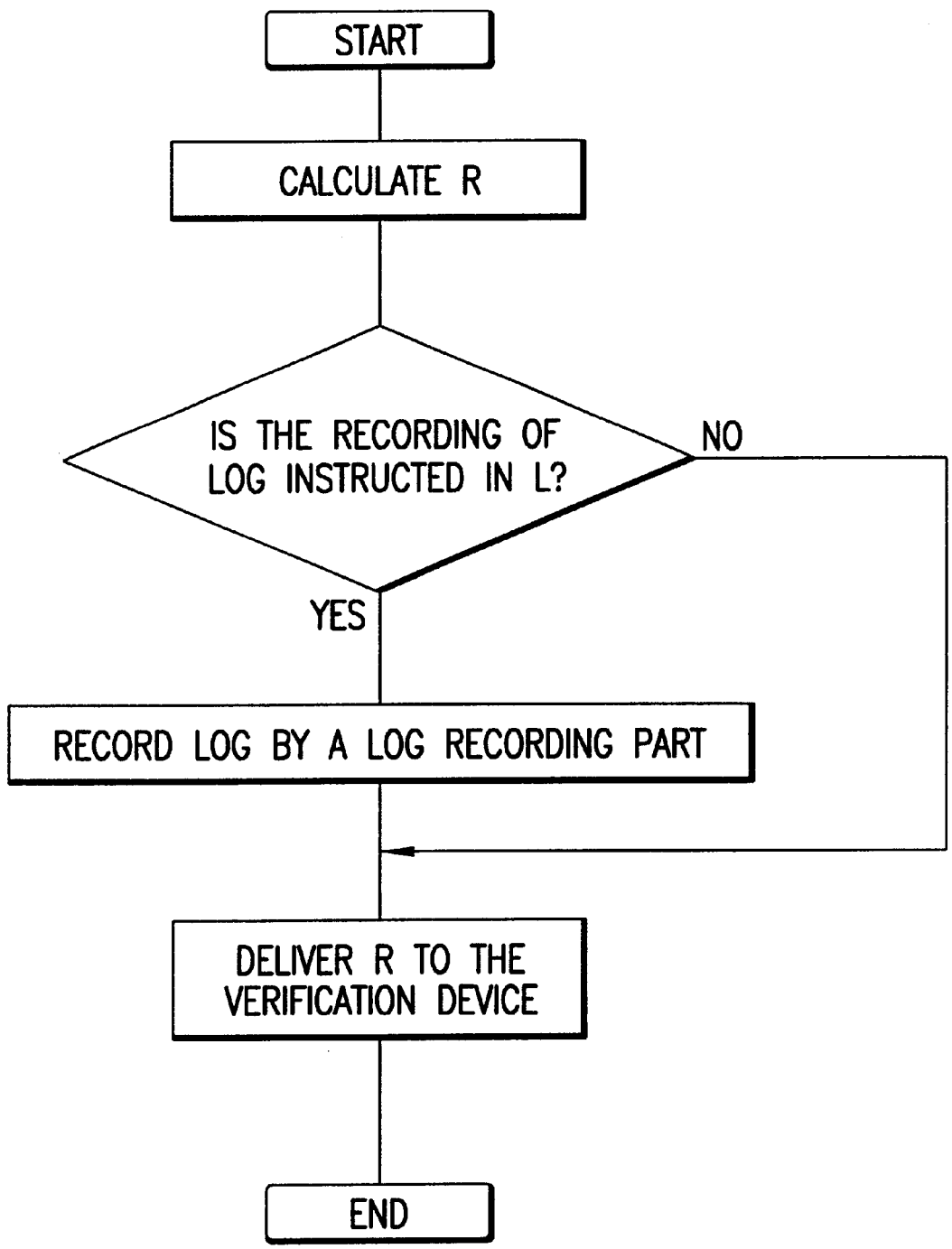
FIG. 31 is a flowchart showing the operation of the proof data generation device used in Embodiment 14.
Figure 32:
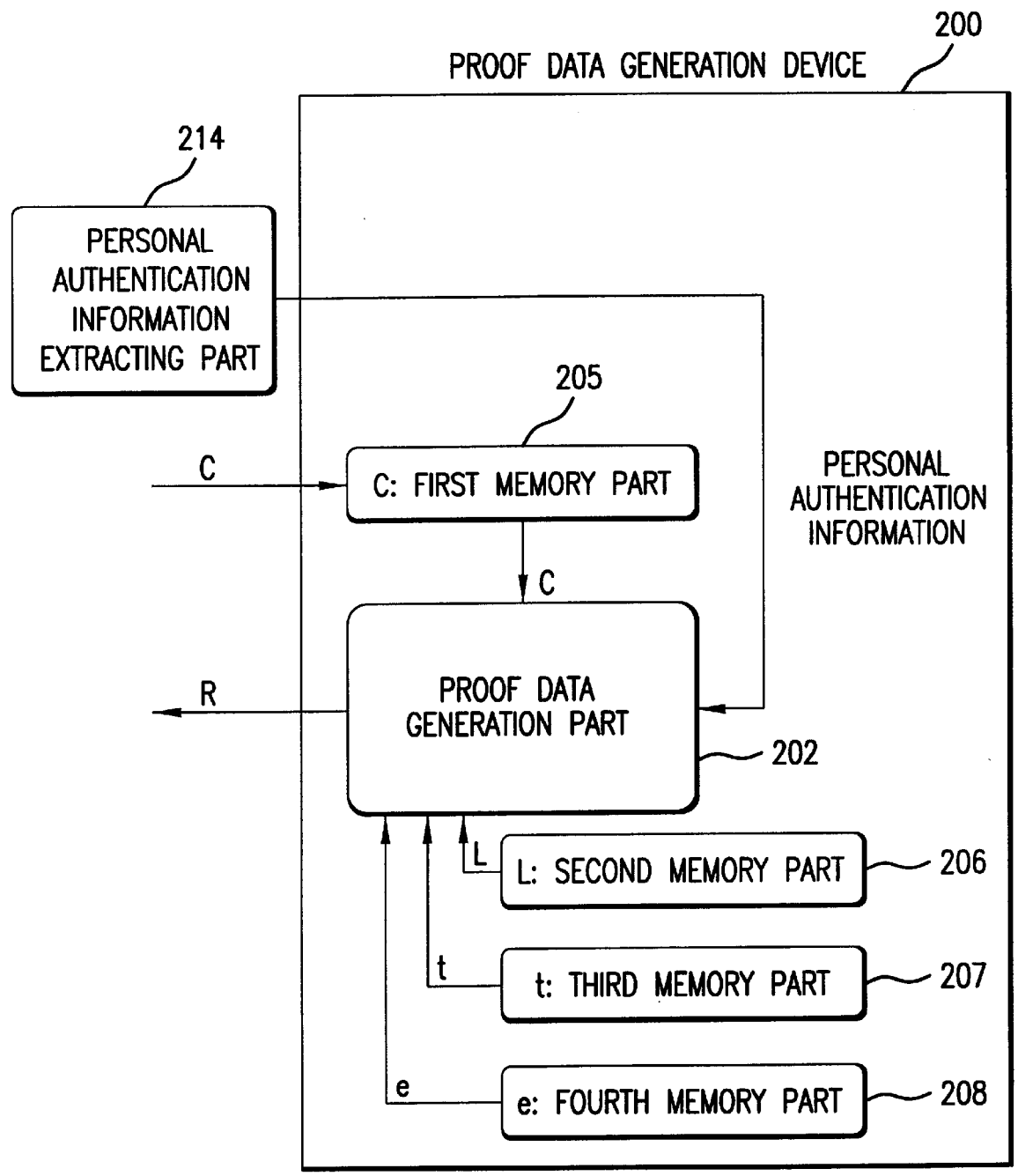
FIG. 32 is a block diagram showing a configuration example of a proof data generation device used in Embodiment 15.
Figure 33:
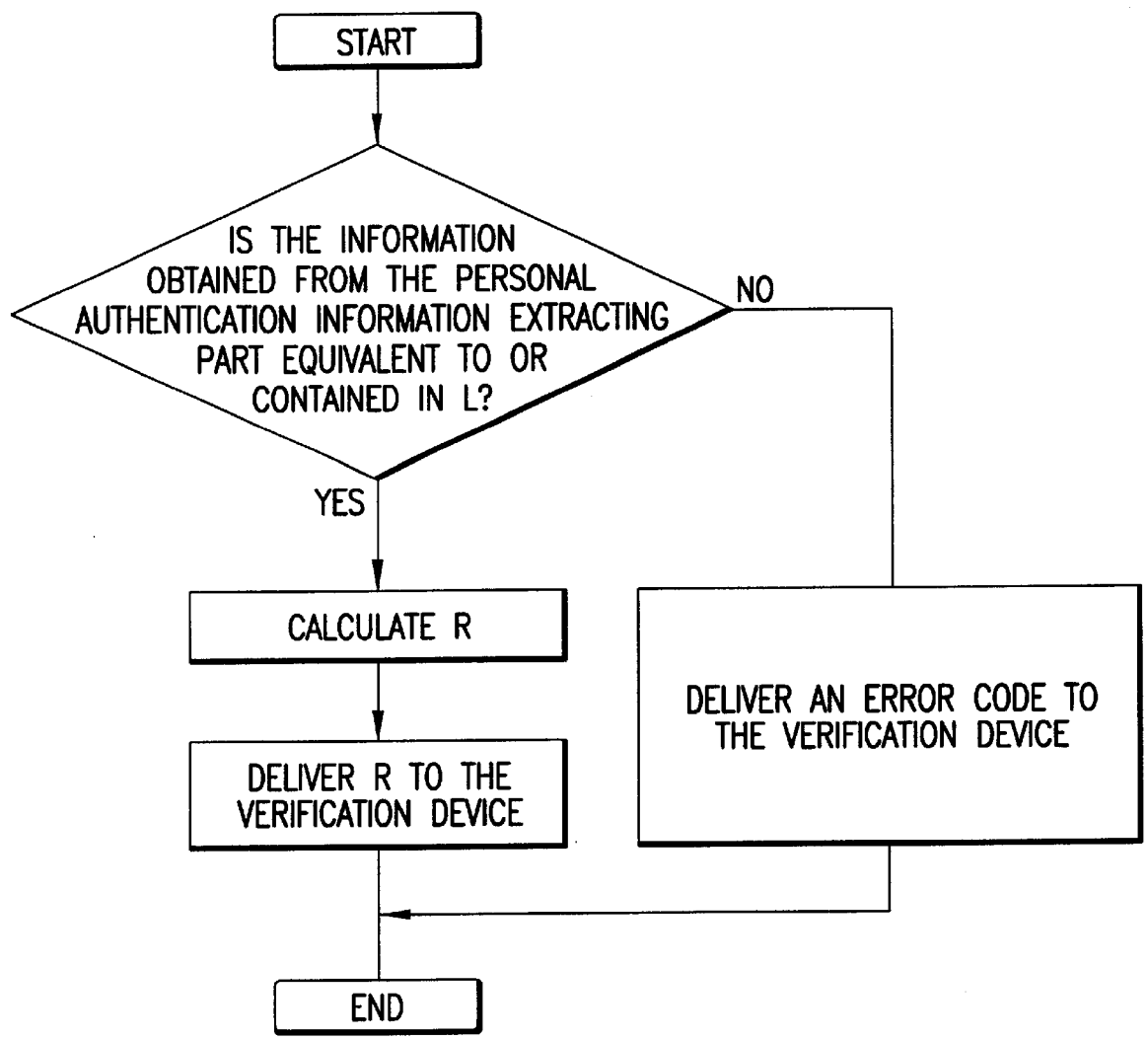
FIG. 33 is a flowchart showing the operation of the proof data generation device used in Embodiment 15.
Figure 34:
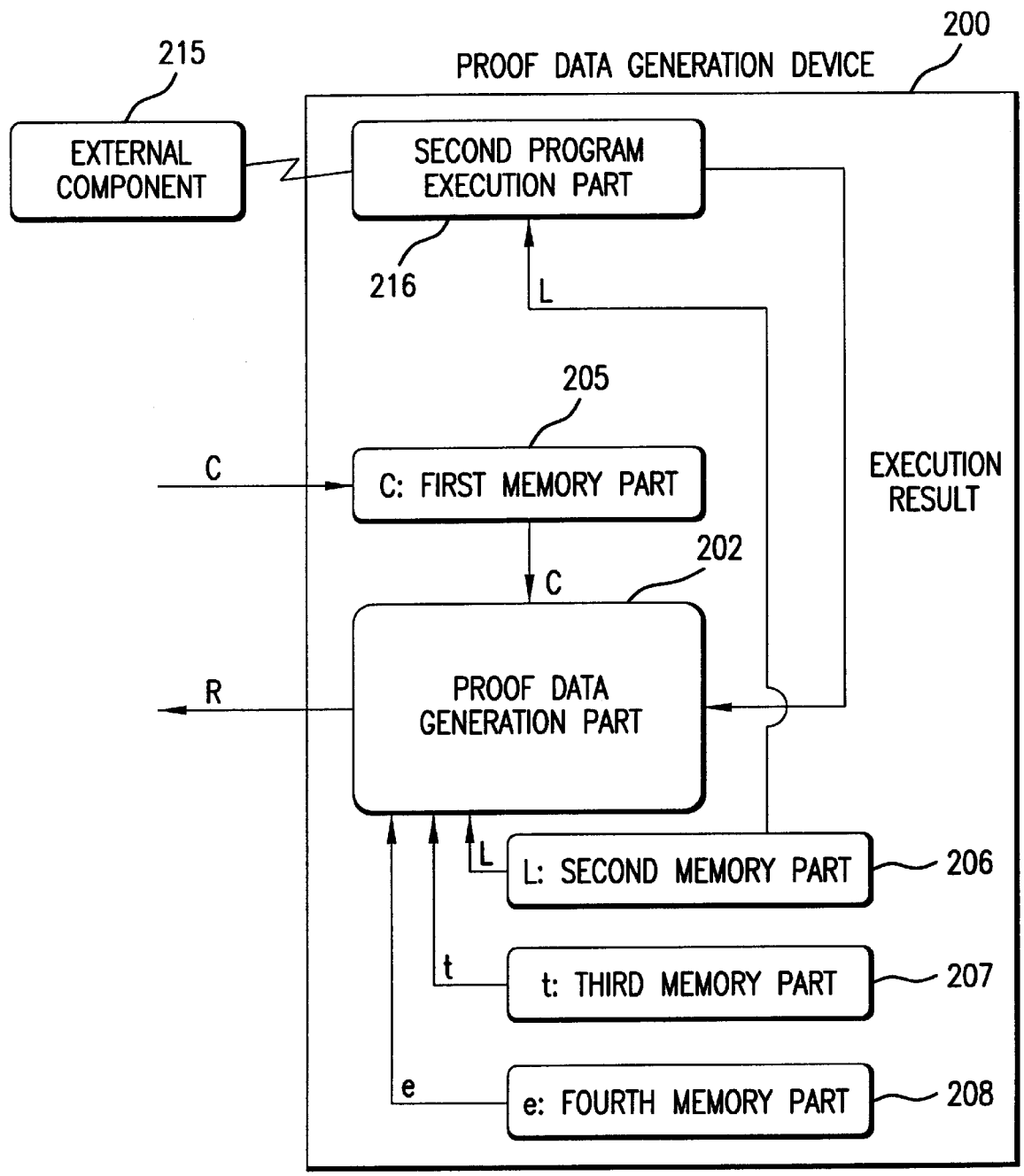
FIG. 34 is a block diagram showing a configuration example of a proof data generation device used in Embodiment 16.
Figure 35:
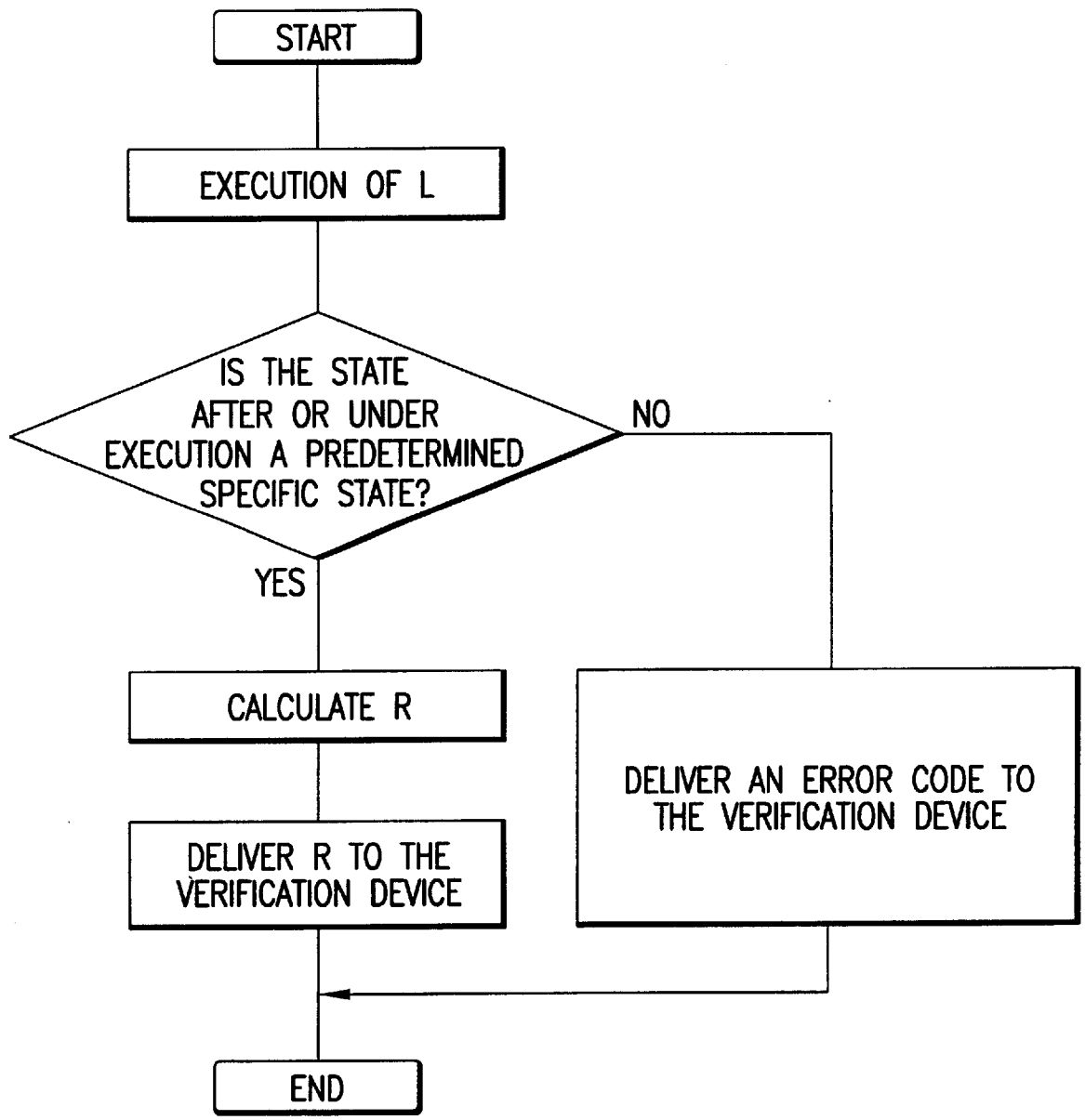
FIG. 35 is a flowchart showing the operation of the proof data generation device used in Embodiment 16.
Figure 36:
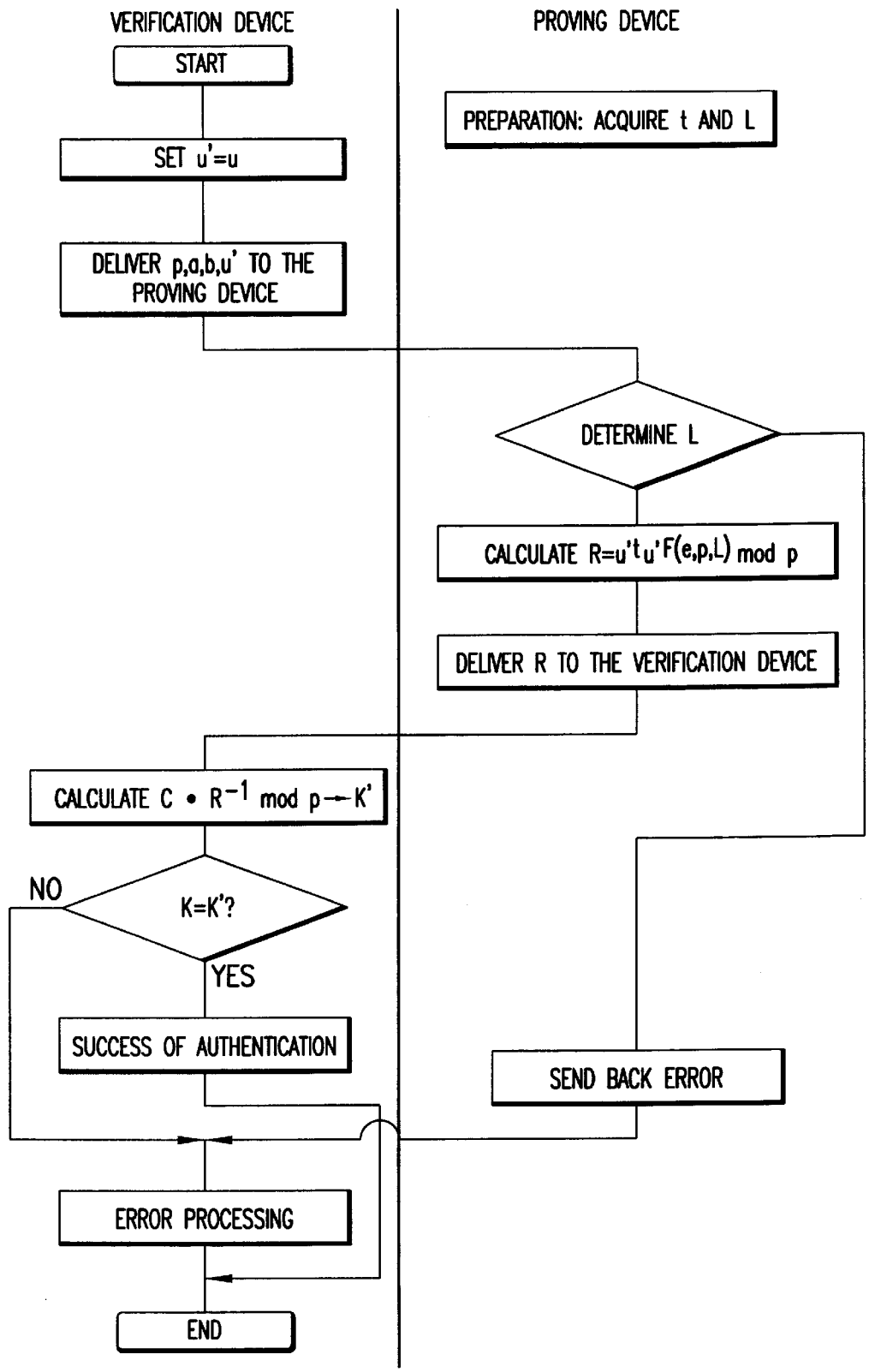
FIG. 36 is a flowchart explaining the operation of Embodiment 17.
Figure 37:
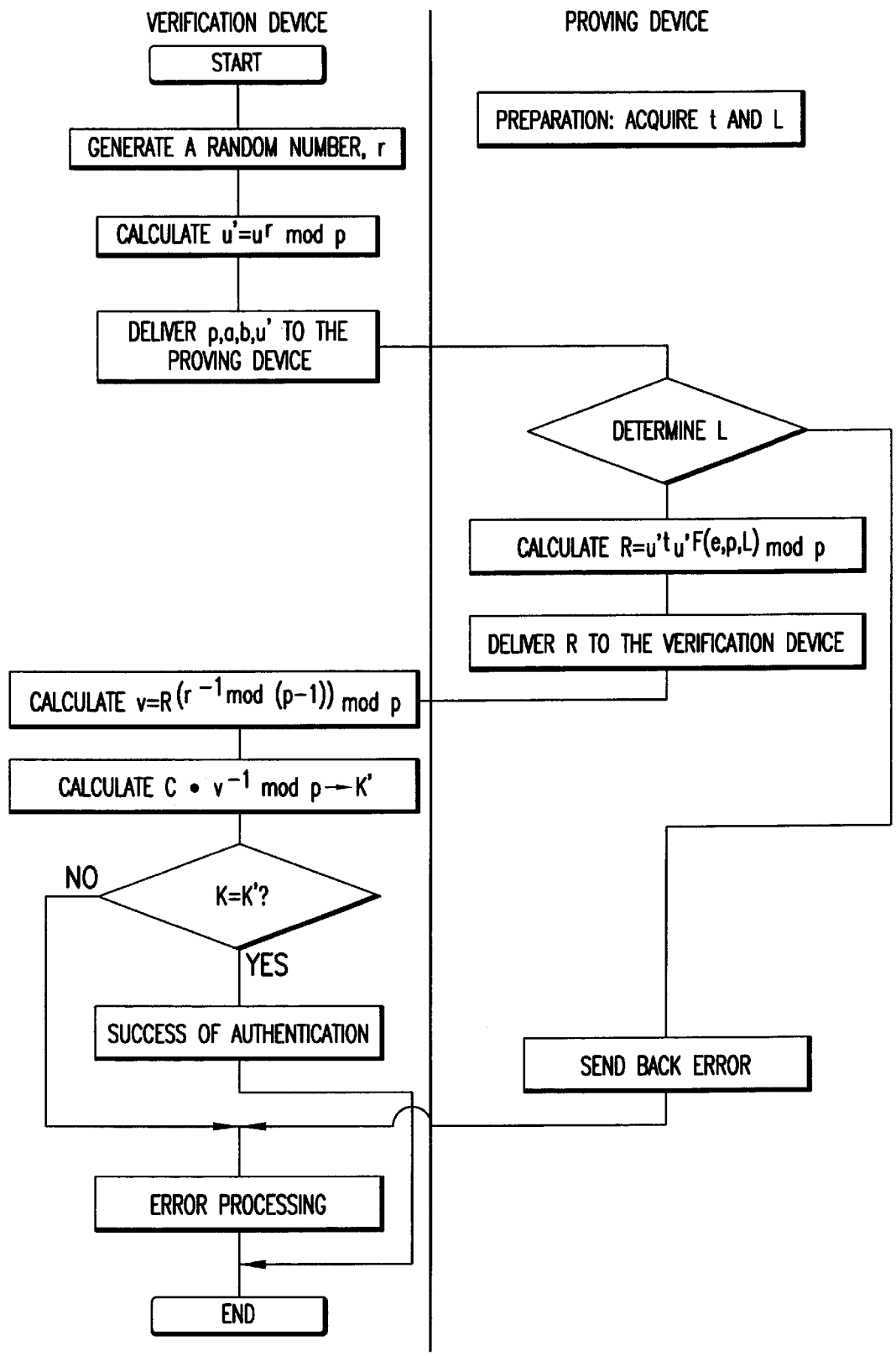
FIG. 37 is a flowchart explaining the operation of Embodiment 18.
Figure 38:
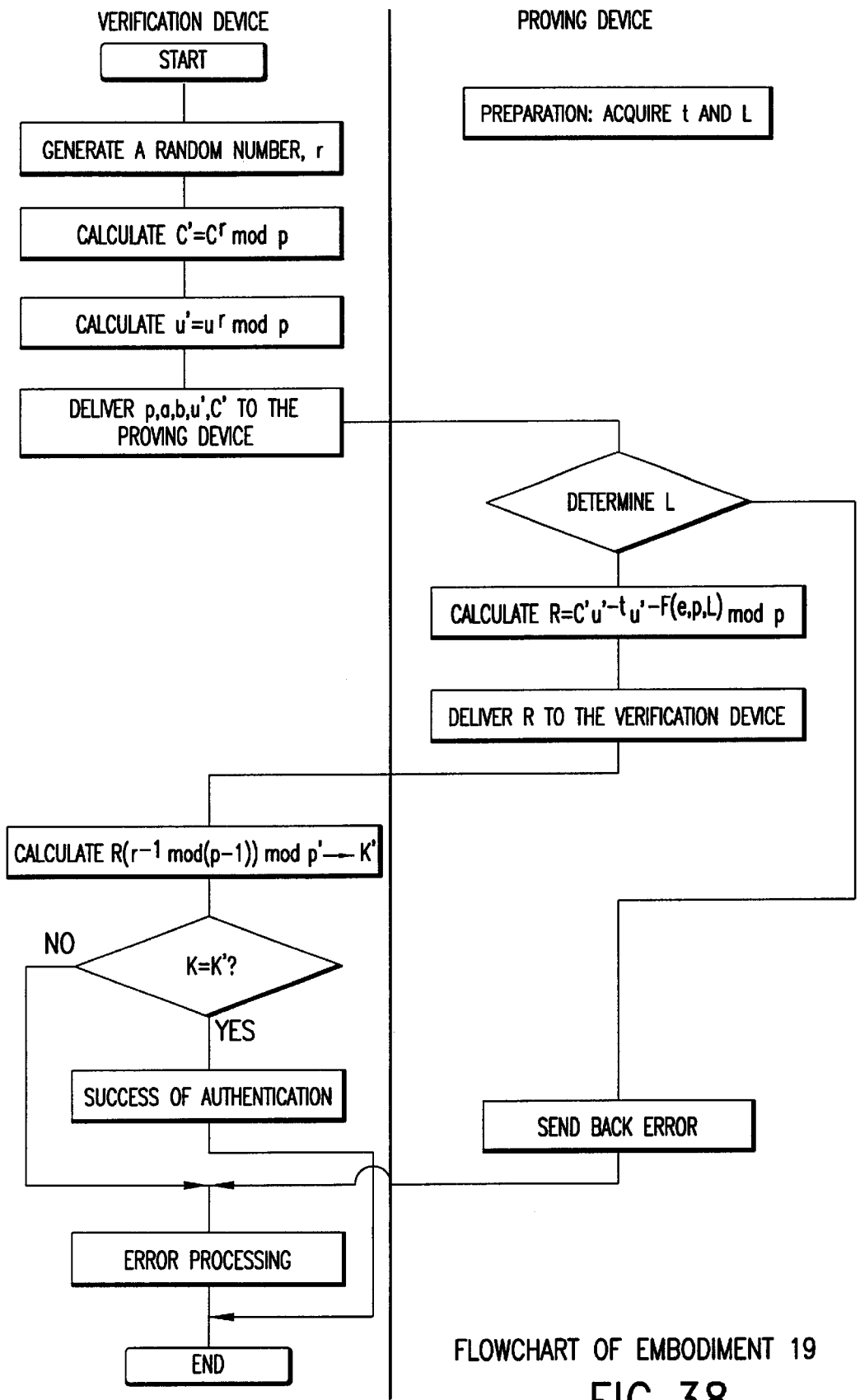
FIG. 38 is a flowchart explaining the operation of Embodiment 19.
Figure 39:
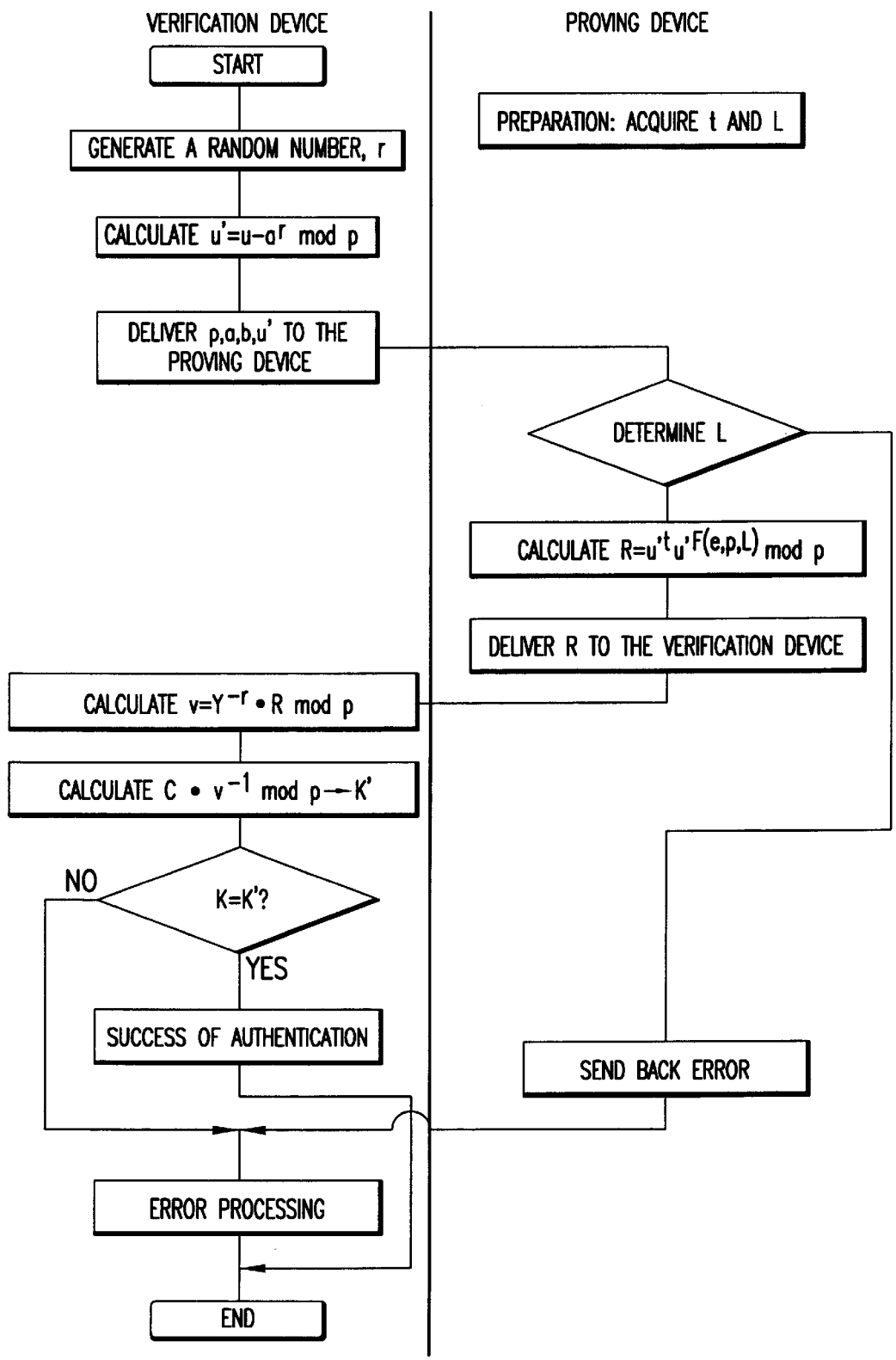
FIG. 39 is a flowchart explaining the operation of Embodiment 20.
Figure 40:
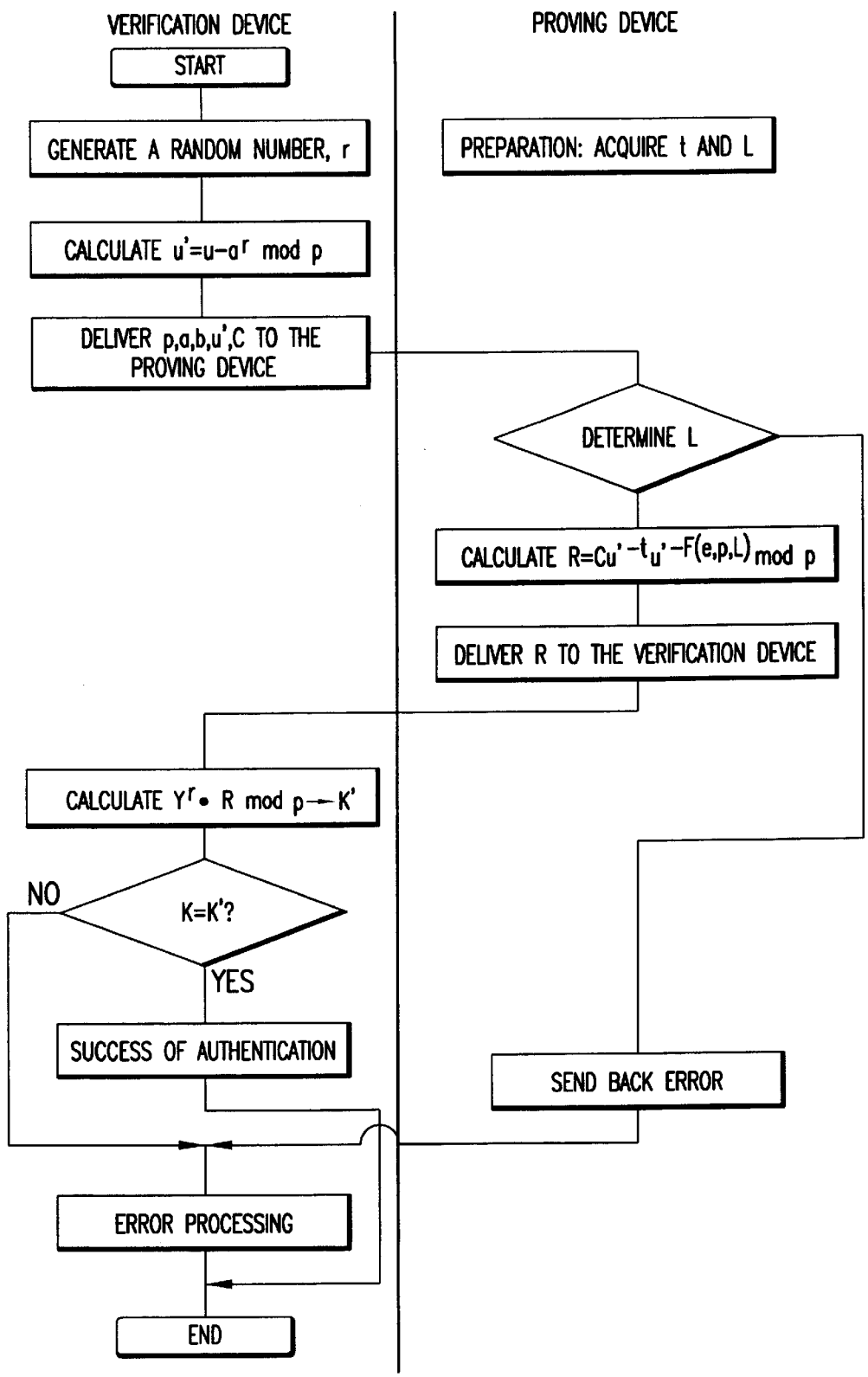
FIG. 40 is a flowchart explaining the operation of Embodiment 21.

| Embodiment | Proof Data Generation Device | Proof Data Verification Device | Authenticating Operation |
|---|---|---|---|
| 7 | FIG. 3 | FIG. 4 | FIG. 20 |
| 8 | FIG. 3 | FIG. 5 | FIG. 21 |
| 9 | FIG. 3 | FIG. 7 | FIG. 22 |
| 10 | FIG. 3 | FIG. 7 | FIG. 23 |
| 11 | FIG. 24 | any (FIGS. 4~7) | FIG. 25 |
| 12 | FIG. 26 | any | FIG. 27 |
| 13 | FIG. 28 | any | FIG. 29 |
| 14 | FIG. 30 | any | FIG. 31 |
| 15 | FIG. 32 | any | FIG. 33 |
| 16 | FIG. 34 | any | FIG. 35 |
| 17 | FIG. 3 | FIG. 4 | FIG. 36 |
| 18 | FIG. 3 | FIG. 7 | FIG. 37 |
| 19 | FIG. 3 | FIG. 6 | FIG. 38 |
| 20 | FIG. 3 | FIG. 7 | FIG. 39 |
| 21 | FIG. 3 | FIG. 6 | FIG. 40 |

Embodiment 1

(FIGS. 3, 4 and 8)

In this embodiment, randomization is not performed and decryption is conducted on a proof data verification device 100 side.

In this embodiment, a consideration is given to the case where a limitation on the period of utilization is made in accordance with proof data generation control information.

An elliptic curve on a finite field having p elements (p is a value obtained by exponentiating a prime number larger than 3), E: $y^2 = x^3 + ax + b$ (provided $4a^3 + 27b^2 \neq 0$), is selected and one point on E is assumed to be P.

Further, unique security characteristic information is assumed to be X and point Y is generated in accordance with the following expression (1—):

[Expression 1]

$$Y = XP \qquad (1\text{—})$$

Next, for identifying a user, user unique identifying information, e, which is different for each user, and proof data generation control information which defines the conditions for authenticating user's access right is assumed to be L. An access ticket, t, is generated in accordance with the following expression (1-2):

[Expression 2]

$$t = X - F(p, e, a, b, L) \qquad (1\text{-}2)$$

X is designated an access ticket private key and Y is designated an access ticket public key.

The function F, which is a function of which function value collision is unlikely, can be determined, for example, like the following expression (1-3) or (1-4) using a one-way hash function:

[Expression 3]

$$F(x, y) = h(x|y) \qquad (1\text{-}3)$$

$$F(x, y, z, w) = h(x|y|z|w) \qquad (1\text{-}4)$$

where "x|y" represents a bit connection of x and y.

On the other hand, the hash function means a function having the property that it is extremely difficult to calculate different x and y values which satisfy h(x)=h(y). As examples of hash function there are known MD2, MD4 and MD5 defined by RSA Data Security Inc., as well as SHS (Secure Hash Standard) defined by the U.S. Federal Government.

Points u and C on E are determined as follows.

Point u represents a number obtained by multiplying the foregoing P by a suitable random number, z. That is, it satisfies the following expression (1-5):
[Expression 4]

$$u=zP \qquad (1\text{-}5)$$

In the following description, encrypted data K will be designated verification data and data R which a proof data generation device 200 generates for proof will be designated proof data. Further, data which the proof data generation device 200 receives from the proof data verification device 100 for the purpose of generating proof data, and data which the proof data verification device 100 uses for the verification of a decrypted value, will be designated authentication data.

The verification data K is made corresponding to point M on E. Point C is the sum of a number and point M which number is obtained by multiplying the access ticket public key Y by the foregoing random number, z, and it satisfies the following expression (1-6):
[Expression 5]

$$C=M+zY \qquad (1\text{-}6)$$

For making the data K corresponding to point M there may be adopted, for example, such a method as described on page 231 of "Cipher—Zero Knowledge Proof—Number Theory" (prepared under the supervision of Information Processing Society of Japan, edited by Okamoto and Ota), published by KYORITSU SHUPPAN CO. LTD.

If the proof data verification device 100 is constituted so as to hold only C which is the result of encryption proof data K instead of holding the data K in the proof data verification device 100, it is possible to eliminate the fear of leakage of the proof data K from the proof data verification device 100.

In this embodiment, the configuration of the proof data generation device 200 is shown in FIG. 3 and that of the proof data verification device 100 is shown in FIG. 4. Likewise, the operations of the devices 200 and 100 are shown in FIG. 8.

Figure 1:
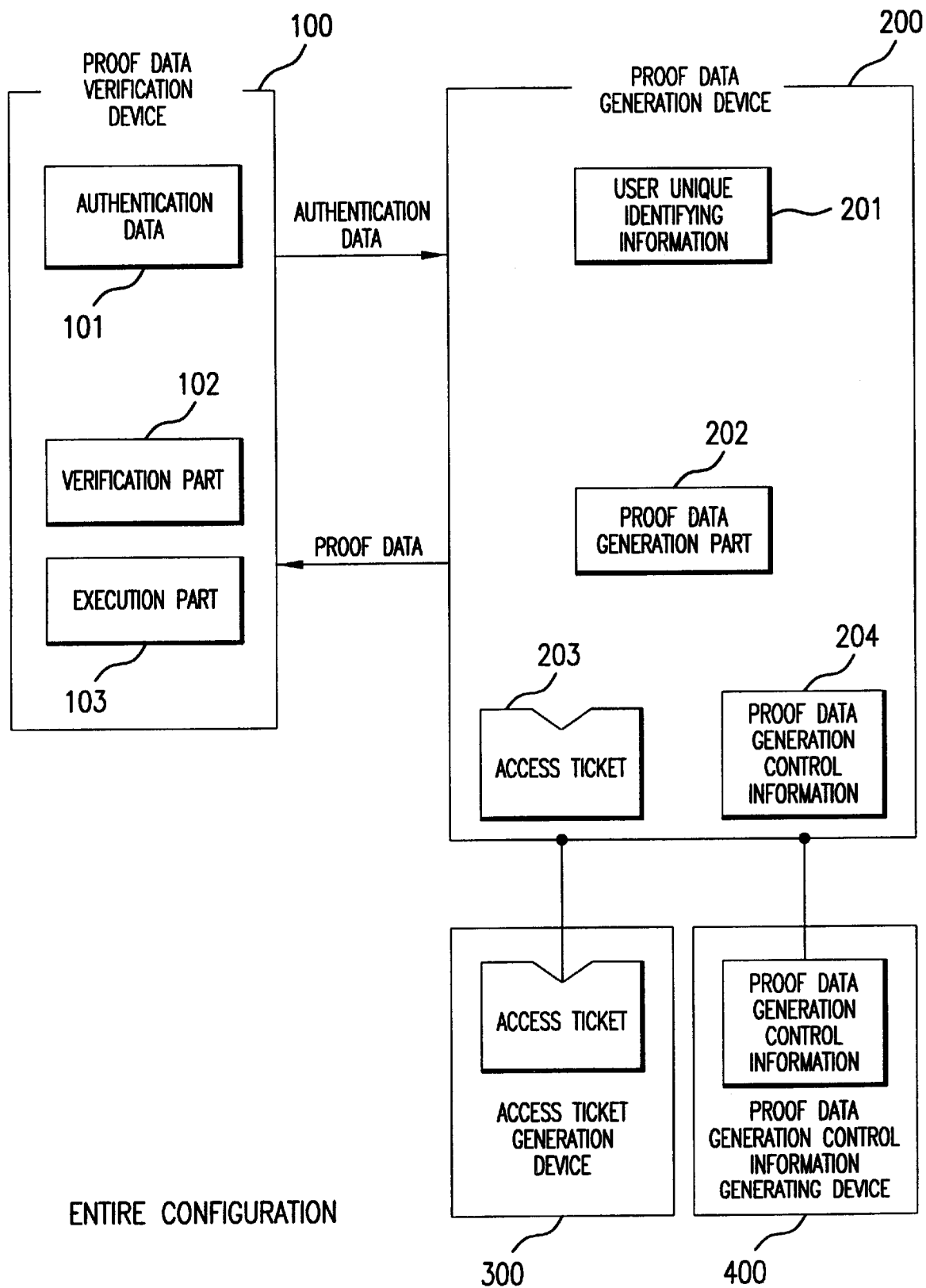
FIG. 1 is a block diagram showing an entire configuration of the present invention.
Figure 2:
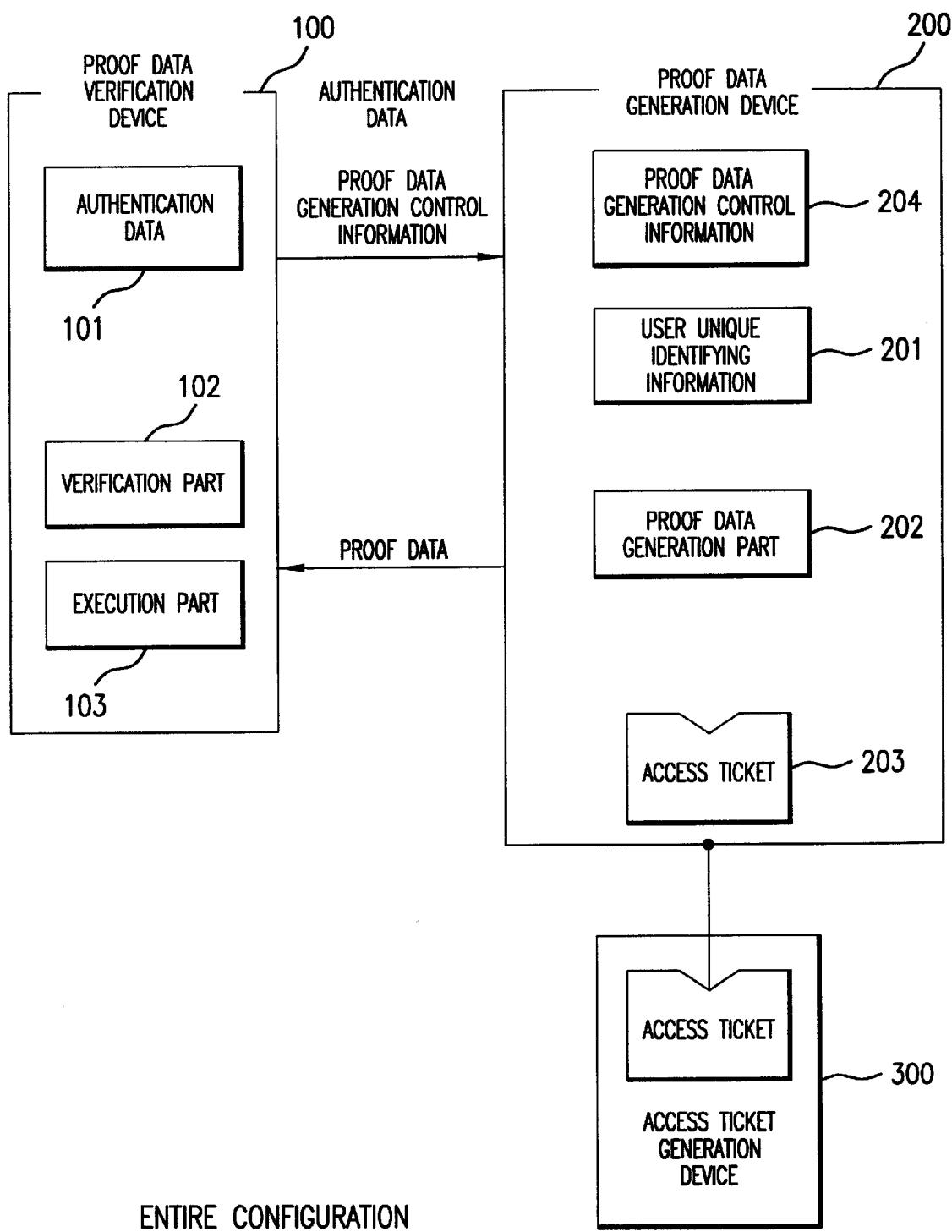
FIG. 2 is a block diagram showing another entire configuration of the present invention.

In FIG. 3, the proof data generation device 200 includes a proof data generation part 202, a first memory part 205, a second memory part 206, a third memory part 207, a fourth memory part 208 and a clock 209. The first memory part 205 is for the storage of proof data. The second memory part 206 is for the storage of proof data generation control information (corresponding to the proof data generation control information memory unit 204 shown in FIG. 1). The third memory part 207 is for the storage of access ticket (corresponding to the access ticket memory unit 203 shown in FIG. 1). The fourth memory part 208 is for the storage of user unique identifying information (corresponding to the user unique identifying information memory unit 201 shown in FIG. 1).

In FIG. 4, the proof data verification device 100 includes an execution part 103, an access ticket public key memory unit 104, a seed for authentication data memory unit 105, an authentication data memory unit 106, a received data memory unit 107, and a verification computation unit 108.

The operation of this embodiment will be described below.

1. When a user accesses digital contents which require authentication by the device for authenticating user's access right to resources, the proof data verification device 100 is started.

In the case where the proof data verification device 100 is configured as part of an application program adapted for operation on the user's PC or work station, the application program is started by the conventional method wherein the user employs an indicating device such as keyboard or mouse. When execution of the application program reaches the program which constitutes the proof data verification device 100, the operation of the device 100 is started.

In the case where the proof data verification device 100 is configured on another PC or work station (called server) connected through a network, the user starts a communication program on his or her PC or work station. The communication program requests the server to open communication in accordance with a predetermined procedure, whereby the proof data verification device 100 on the server is started. Suppose the user's communication program follows a procedure called TCP/IP at the time of communication with the server, then by making the proof data verification device 100 correspond to a specific port of the server in advance and by setting so that the user's communication program designates the port and makes a TCP connection request to the server, it becomes possible for a demon (inetd) on the server to turn ON the proof data verification device 100 in compliance with the TCP connection request. Such an implementing method is widely adopted in such a network as Internet.

It is also possible to configure the proof data verification device 100 as a device for a exclusive purpose. For example, it is possible to configure the proof data verification device 100 as a program printed to ROM in an IC card reader-writer and configure the proof data generation device 200 as a program installed in a microcontroller of an IC card. In this case, when the user inserts the IC card into the reader-writer, the operation of the proof data verification device 100 is started.

2. Point u on E is stored as seed for authentication data in the seed for authentication data memory unit 105 and point C on E is stored as authentication data in the authentication data memory unit 106. The proof data verification device 100 stores authentication data, u', and parameters p, a, and b, which are stored in the access ticket public key memory unit 104 and which define the elliptic curve E, into the first memory unit 205 in the proof data generation device 200. In this embodiment, the authentication data, u', corresponds to the seed for authentication data, u.
[Expression 6]

$$u'=u \qquad (1\text{-}7)$$

3. The proof data generation part 202 checks to see whether utilization-term time in the proof data generation control information has passed the time indicated on the clock 209 in the proof data generation device 200. If the answer is affirmative, an error code is sent back to the proof data verification device 100.

4. Subsequently, the proof data generation part 202 acquires the access ticket, t, stored in the third memory part 207 (access ticket memory part) and executes calculation of the following expression (1-8) to obtain S:
[Expression 7]

$$S=tu' \qquad (1\text{-}8)$$

5. Then, the proof data generation part 202 acquires the unique identifying information, e, of the user stored in the fourth memory part 208 (user unique identifying information memory part) and executes calculation of the following expression (1-9):
[Expression 8]

$$F(p, e, a, b, L) \qquad (1\text{-}9)$$

6. Then, using data generated by an exponent generation part, the proof data generation part 202 executes calculation of the following expression (1-10) to obtain S':

[Expression 9]

$$S'=F(p, e, a, b, L)u' \quad (1\text{-}10)$$

7. Then, the proof data generation part 202 obtains S' and S from the first and second computation units and executes calculation of the following expression (1-11) to obtain R:

[Expression 10]

$$R=S+S' \quad (1\text{-}11)$$

8. The proof data generation device 200 sends R back to the received data memory unit 107 in the proof data verification device 100.
9. The verification computation unit 8 (the verification part 102 in FIG. 1) in the proof data verification device 100 fetches authentication data C from the authentication data memory unit 106 and executes calculation of the following expression (1-12):

[Expression 11]

$$M'=C-R \quad (1\text{-}12)$$

10. The verification computation unit 108 calculates data K' corresponding to point M'. For making point M' correspond to data K' it is possible to use, for example, the method described on page 231 of the foregoing "Cipher—Zero Knowledge Proof—Number Theory" (prepared under the supervision of Information Processing Society of Japan, edited by Okamoto and Ota), published by KYORITSU SHUPPAN CO. LTD.

Only when the combination of access ticket, t, with user unique identifying information, e, used in the proof data generation device 200 is correct, the K' obtained by calculation and the verification data K coincide with each other and thus verification is effected correctly.

Examples will be given below about the method for verifying that K and K' are the same in the proof data verification device 100.

Figure 14:
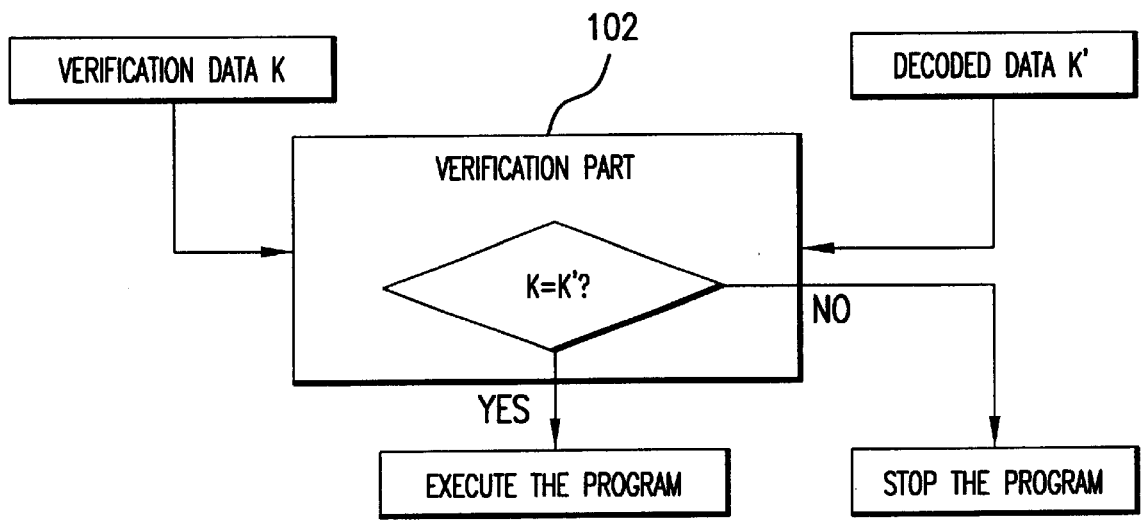
FIG. 14 is a diagram showing how to verify the result of decryption (in the case of directly comparing the results of decryption)

[1]Configuration Example of Direct Comparison Between Verification Data and the Result of Decryption In a configuration example shown in FIG. 14, the verification part 102 (verification computation unit 108) stores verification data K in advance. A comparison portion in the verification part 102 makes direct comparison between the verification data K and data K' obtained by decrypting authentication data and executes the normal processing only when there exists the relationship of K'=K while, if such a relationship does not exist, the comparison portion executes error processing such as stop of processing.

This configuration example is disadvantageous in that the verification data K itself to be verified appears in the device. For example, in the case where the proof data verification device 100 is configured as a program which operates on the user's PC or work station, it is not always impossible, though it may be difficult, to analyze the program and steal K. If the value of K is known to users, it becomes possible to configure a device which imitates the operation of the proof data generation device 200 and hence it becomes possible to make illegitimate access by pretension.

[2]Configuration Example Using a One-way Function

Figure 15:
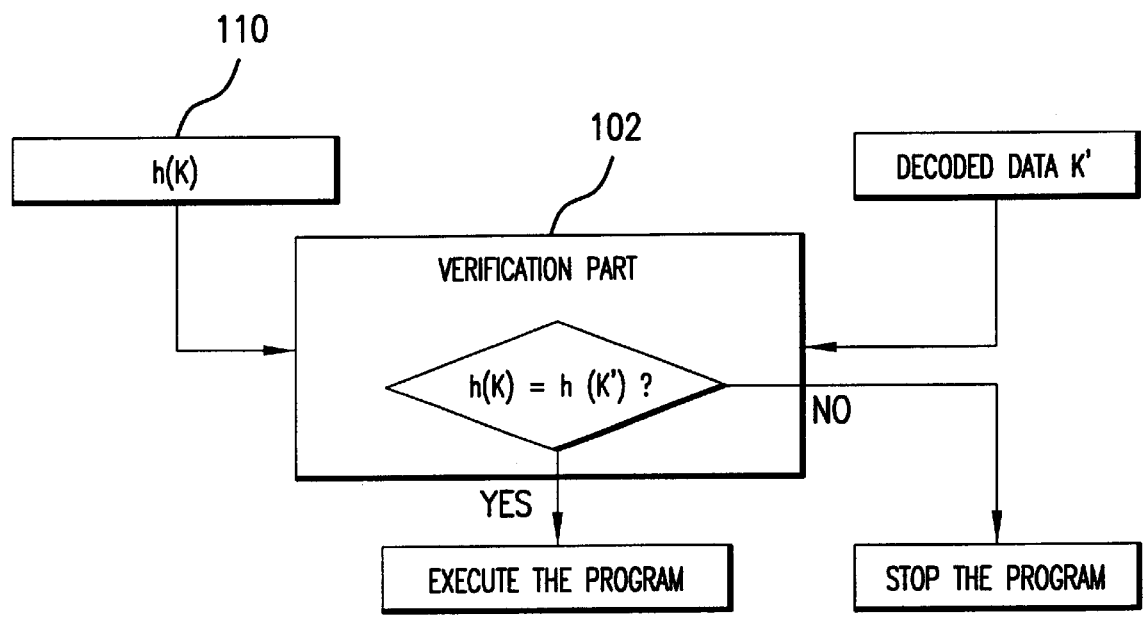
FIG. 15 is a diagram showing how to verify the result of decryption (in the case of using a one-way function)

In a configuration example shown in FIG. 15, in order to remedy the above-mentioned drawback, data h(K) obtained by applying the foregoing one-way hash function, h, to K, instead of the verification data K itself, is used as the verification data stored in the verification part 102. In view of the properties of the one-way hash function, it is very difficult to calculate the value of x which satisfies y=h(x) from the data, y, stored in the proof data memory unit 110.

The verification part 102 has a transformation portion which sends back the result obtained by applying the one-way hash function to input data. The comparison part compares an output h(K'), in which data K' decrypted from authentication data is obtained as an input of the hash function, with the stored data (=h(K)).

It can be that this example is safer than the above example [1]because the verification data K does not appear in a program and also because it is extremely difficult to calculate K from the h(K) stored in the proof data memory unit 110.

However, the comparison portion is configured as a conditional sentence in a program, and in the case where the proof data verification device 100 is configured as a program easy to be analyzed and altered, it is possible to alter the program so as to skip the conditional sentence. In this point, the example in question still possesses a weak point.

Figure 16:
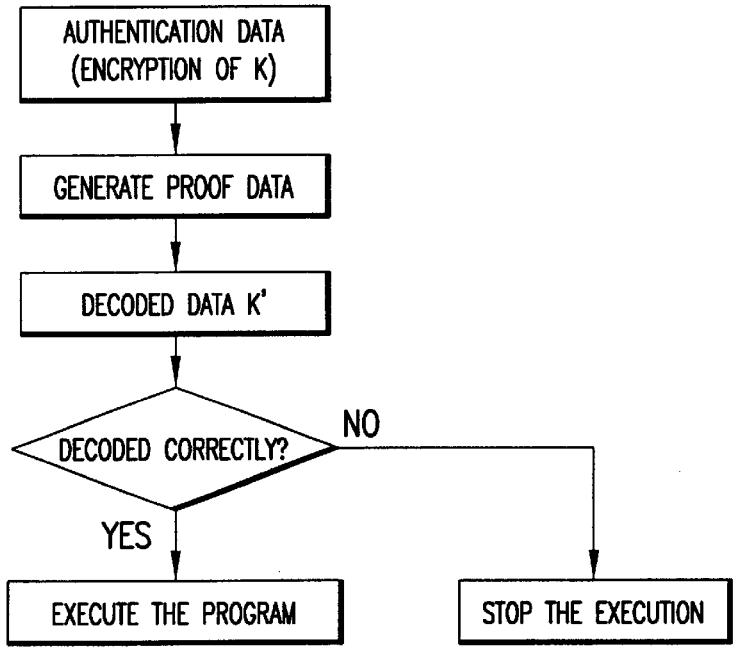
FIG. 16 is a diagram showing how to verify the result of decryption (in the case where a decrypted value is a decryption key of other data)

[3]Configuration Example Wherein a Decrypted Value is a Decryption Key for Decrypting Specific Data In a configuration example shown in FIG. 16, data stored for verification is encrypted data, and data K' obtained by decrypting authentication data is a key for decrypting the encrypted data.

The verification part 102 effects decrypting by using the value of data K' as a decryption key for the cipher which has been used for encrypting the data stored for verification. As a result, only when the encrypted data can be decrypted, the execution of program is permitted.

Also in this configuration, there is attained high safety because the decryption key itself does not appear in the proof data verification device 100.

Figure 17:
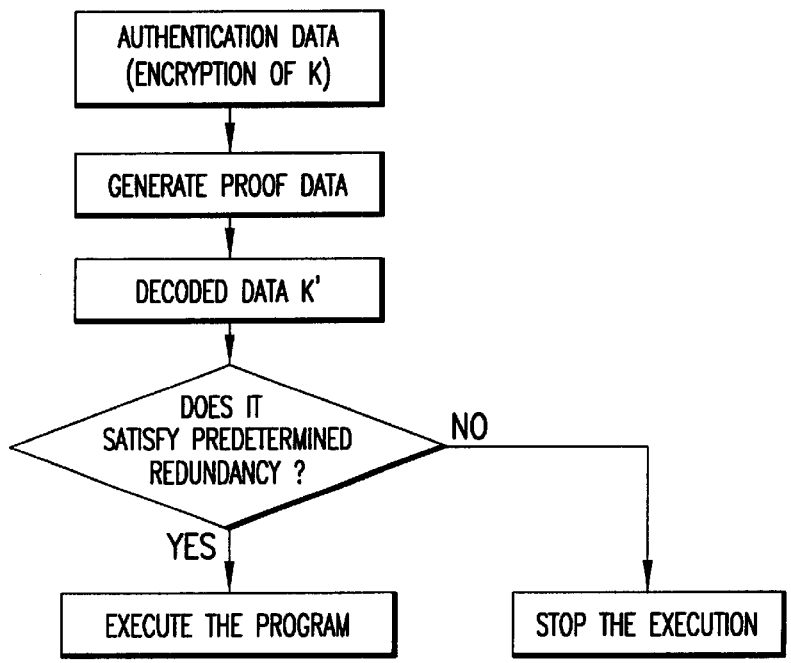
FIG. 17 is a diagram showing how to verify the result of decryption (in the case of verifying the redundancy of a decrypted value)

[4]Configuration Example for Confirming That a Decrypted Value Satisfies Specific Redundancy In a configuration example shown in FIG. 17, the proof data verification device 100 has a redundancy verification part, and the verification part 102 sends the value of data K' obtained by decrypting authentication data to the redundancy verification part. Only when the redundancy verification part has confirmed that the data satisfies specific redundancy, the execution of program is permitted.

Examples of redundancy include a case where decrypted data is repetition of a specific pattern, a case where data at a specific position satisfies specific conditions, and a case where data is significant as a specific language.

[5]Configuration Example of Encrypting a Program Code Itself

Figure 18:
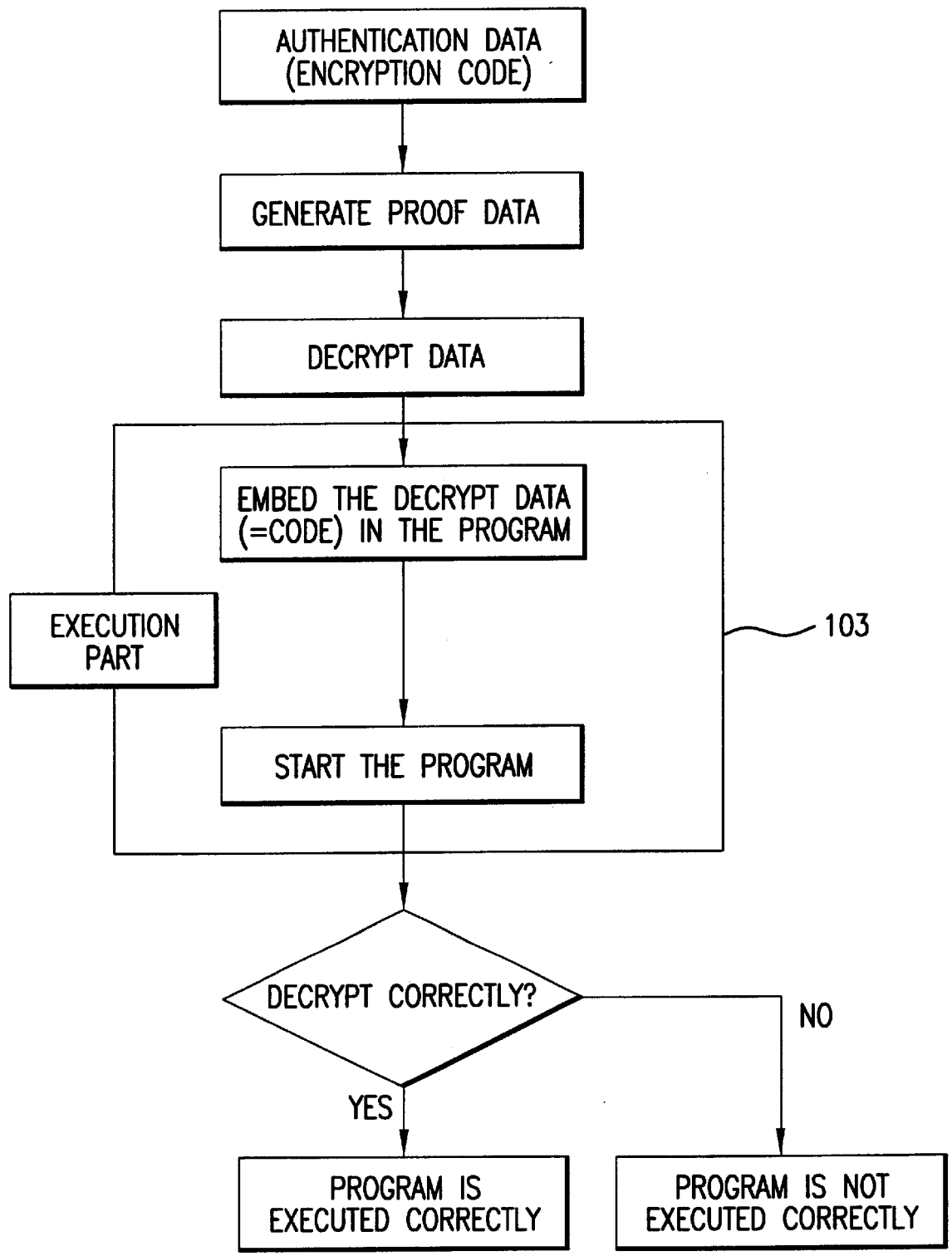
FIG. 18 is a diagram showing a configuration example of a proof data generation unit.

In a configuration example shown in FIG. 18, part or all of a program code held by the proof data authentication device 100 is encrypted and the thus-encrypted data is held as authentication data in the proof data memory unit 106. That is, data K' obtained by decrypting authentication data serves as part or all of the program code.

The execution part 103 embeds the data K' in a predetermined position in the program and thereafter executes the embedded program. Only when the proof data generation device 200 has sent back correct data, that is, only when K' is correctly decrypted data of code, the execution of program is permitted.

The execution part 103 may generate a file with decrypted code embedded in the original program and thereafter starts operation of that file. From the standpoint of safety, however, it is desirable that, with a program developed on memory, the decrypted code be embedded in the program on memory, followed by start of operation.

In this configuration example, since part or all of the code essential to the execution of program is encrypted, it is possible to prevent illegitimate execution even in a less safe case where the execution part 103 is configured as an application program which runs on the user's PC or work station.

[6] Configuration Example Wherein a Decrypted Value is a Program Decryption Key

Figure 19:
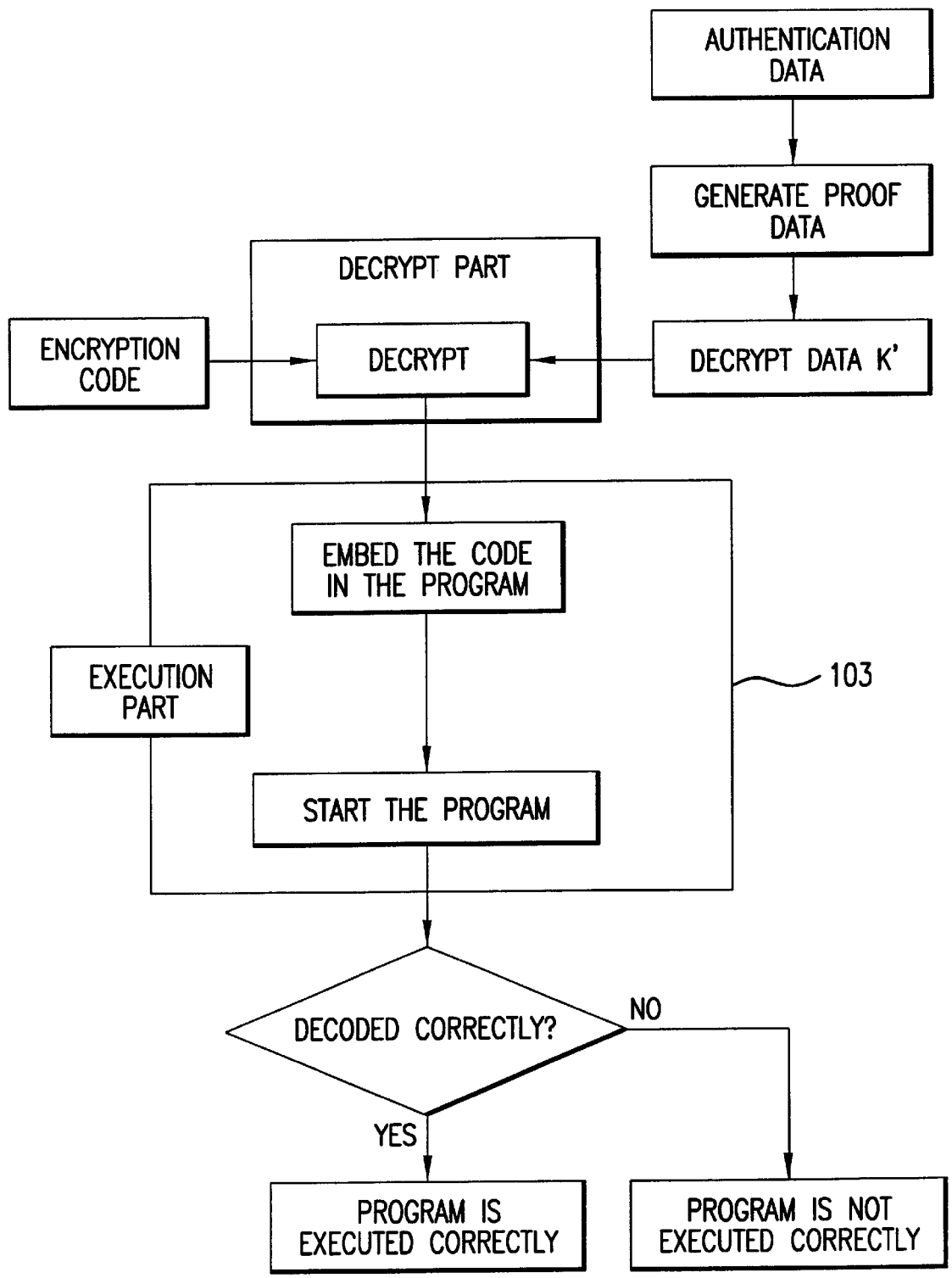
FIG. 19 is a diagram showing how to verify the result of decryption (in the case where a decrypted value is a program code)

In a configuration example shown in FIG. 19, the proof data verification device 100 holds data obtained by encrypting part or all of a program code, and data K' obtained by decrypting authentication data serves as a decryption key necessary for decrypting the encrypted program code. According to this configuration, it becomes possible to keep data K' in a certain size irrespective of the size of the code to be encrypted, thus permitting reduction of overhead in communication.

Using data K', the verification part 102 decrypts the stored program code which has been encrypted, then embeds the decrypted code in a predetermined position of the program and thereafter executes the embedded program. Only when the proof data generation device 200 sends back correct data, that is, only when the code is correctly decrypted using K', the execution of the program is permitted.

Although in this embodiment the elliptic curve E is set at $y^2=x^3+ax+b$, there may be adopted any of the following configurations.

The elliptic curve E on a finite field of characteristic 2 is assumed to be $y^2+cy \equiv x^3+ax+b \bmod p$ ($b \neq 0$), and as parameters which define the elliptic curve, those referred to above in this embodiment plus c are sent to the proof data generation device 200, which in turn calculates F(p, e, a, b, c, L) using user unique identifying information and proof data generation control information.

The elliptic curve E on a finite field of characteristic 2 is assumed to be $y^2+xy \equiv x^3+ax+b \bmod p$ ($a \neq 0$).

The elliptic curve E on a finite field of characteristic 3 is assumed to be $y^2+x^3+ax^2+bx+c \bmod p$, and as parameters which define the elliptic curve, those referred to above in this embodiment plus c are sent to the proof data generation device 200, which in turn calculates F(p, e, a, b, c, L) using user unique identifying information and proof data generation control information and then calculates S' on the basis of the calculation result obtained.

These configurations are also applicable to all of the following embodiments.

Embodiment 2
(FIGS. 3, 5 and 9)

In this embodiment, randomization is not performed and decryption is conducted on the proof data generation device 200 side.

This Embodiment 2 is different from Embodiment 1 in that decryption is performed on the proof data generation device 200 side.

In Embodiment 2, the method for setting an elliptic curve on a finite field, an cryptographic configuration of on the elliptic curve E, how to generate access ticket, t, a seed for authentication data, u, and authentication data C, how to utilize proof data generation control information, and the respective properties to be satisfied, are the same as in Embodiment 1. Also as to the method for making a point on the elliptic curve corresponding to data, there may be adopted the same method as in Embodiment 1.

The configuration of the proof data generation device 200 and that of the proof data verification device 100 both used in this embodiment are shown in FIGS. 3 and 5, respectively. Further, the operations of both devices 200 and 100 are shown in FIG. 9. In FIG. 5, the portions common to FIG. 4 are indicated by the same reference numerals as in FIG. 4.

In this configuration, authentication data C, in addition to authentication data, u, is also sent from the proof data verification device 100 to the proof data generation device 200.

The operation of this embodiment will be described below.

1. The proof data verification device 100 is started upon access thereto made by a user.
2. Point, u, on E is stored as seed for authentication data in seed for authentication data memory part 105 and point C on E is stored as authentication data in an authentication data memory unit 106.

The proof data verification device 100 stores authentication data u and C, as well as parameters p, a and b which are stored in an access ticket public key memory unit 104 and which define the elliptic curve E, into the first memory unit 205 in the proof data generation device 200.

3. The proof data generation part 202 checks to see whether the utilization-term time in the proof data generation control information has passed the time indicated by he clock 209 in the proof data generation device 200. If the answer is affirmative, an error code is sent back to the proof data verification device 100.
4. Subsequently, the proof data generation part 202 acquires the access ticket, t, stored in the third memory part 207 (the access ticket memory unit 203 in FIG. 1) and executes the following expression (2-1) to obtain S:

[Expression 12]

$$S=tu \qquad (2\text{-}1)$$

5. Then, the proof data generation part 202 acquires the unique identifying information, e, of the user stored in the fourth memory part 208 (the user unique identifying information memory unit 201 in FIG. 1) and executes calculation of the following expression (2—):

[Expression 13]

$$F(p, e, a, b, L) \qquad (2\text{---})$$

6. Then, using data generated by the exponent generation part, the proof data generation part 202 executes calculation of the following expression (2-3) to obtain S':

[Expression 14]

$$S'=F(p, e, a, b, L)u \qquad (2\text{-}3)$$

7. Then, the proof data generation device 202 acquires S' and S from the first and second computation units and executes calculation of the following expression 2-4 to obtain R:

[Expression 15]

$$R=C-S-S' \qquad (2\text{-}4)$$

8. The proof data generation device 200 sends R back to the received data memory unit 107 in the proof data verification device 100.
9. A verification computation unit 108 (the verification part 102 in FIG. 1) calculates data K' which corresponds to point R. Only when the combination of access ticket, t, with user unique identifying information, e, used in the proof data generation device 200 is correct, then the K' obtained as a result of the calculation and verification data K coincide with each other, and verification is effected correctly.

For comparison between K' and verification data K, there may be adopted the same method as in Embodiment 1.

Embodiment 3
(FIGS. 3, 7 and 10)

Embodiment 3 is also a modification of the configuration of Embodiment 1. In this embodiment, there is used Pohlig-Hellman cryptography and decryption is performed on the proof data verification device 100 side.

In this embodiment, the method for setting an elliptic curve on a finite field, a cryptographic configuration on the elliptic curve E, how to generate access ticket, t, seed for authentication data, u, and authentication data C, how to utilize proof data generation control information, and the respective properties to be satisfied, are the same as in Embodiment 1. Also as to the method for making a point on the elliptic curve correspond to data, there may be adopted the same method as in Embodiment 1.

In this embodiment, the order of point P is assumed to be q.

The configuration of the proof data generation device 200 and that of the proof data verification device 100 both used in this embodiment are shown in FIGS. 3 and 7, respectively. Further, the operations of both devices 200 and 100 are shown in FIG. 10.

The proof data generation device 200 used in this embodiment is the same as in Embodiments 1 and 2.

In FIG. 7, the proof data verification device 100 comprises an execution part 103, an access ticket public key memory unit 104, a seed for authentication data memory unit 105, an authentication data memory unit 106, a received data memory unit 107, a verification computation unit 108, a random number generation unit 111, a randomizing unit 112, a random number memory unit 113 and a derandomizing unit 114.

The operation of this embodiment will be described below.

1. The proof data verification device 100 is started upon access thereto made by a user.
2. Point u on E is stored as seed for authentication data in the seed for authentication data memory unit 105 and point C on E is stored as authentication data in the authentication data memory unit 106.

The proof data verification device 100 stores authentication data u' as well as parameters p, a and b which are stored in the access ticket public key memory unit 104 and which define the elliptic curve E, into the first memory unit 205 in the proof data generation device 200.

In the proof data verification device 100, a random number, r, is generated by the random number generation unit 111 so as to become mutually prime with respect to the order q of point p which is held in the access ticket public key memory unit 104, and stores it in the random number memory unit 113.

The authentication data u' is generated in the following manner. The randomizing unit 112 acquires the data, u, stored in the seed for authentication data memory unit 105 and executes calculation of the following expression (3-1):

[Expression 16]

$$u'=ru \qquad (3\text{-}1)$$

By such a configuration wherein the authentication data is randomized and is then derandomized at the time of verifying the proof data which the proof data generation device 200 sends back to the proof data verification device, it is possible to prevent what is called replay attack. This is also true in the embodiments which follow.

3. The proof data generation part 202 checks to see whether the utilization-term time in the proof data generation control information has passed the time indicated by the clock 209 in the proof data generation device 200. If the answer is affirmative, an error code is sent back to the proof data verification device 100.
4. Subsequently, the proof data generation part 202 acquires the access ticket, t, stored in the third memory part 207 (the access ticket memory unit 203 in FIG. 1) and executes calculation of the following expression (3-2) to obtain S:

[Expression 17]

$$S=tu' \qquad (3\text{-}2)$$

5. Then, the proof data generation part 202 acquires the user unique identifying information, e, stored in the fourth memory part 208 (the user unique identifying information memory unit 201 in FIG. 1) and executes calculation of the following expression (3—):

[Expression 18]

$$F(p, e, a, b, L) \qquad (3\text{-}3)$$

6. Next, using data generated by the exponent generation part, the proof data generation part 202 executes calculation of the following expression (3-4) to obtain S':

[Expression 19]

$$S'=F(p, e, a, b, L)u' \qquad (3\text{-}4)$$

7. Then, the proof data generation part 202 acquires S' and S from the first and second computation units and executes calculation of the following expression (3-5) to obtain R:

[Expression 20]

$$R=S+S' \qquad (3\text{-}5)$$

8. The proof data generation device 200 sends R back to the received data memory unit 107 in the proof data verification device 100.
9. The derandomizing unit 114 in the proof data verification device 100 fetches the previously generated random number, r, from the random number memory unit 113 and first executes calculation of the following expression (3-6):

[Expression 21]

$$v=(r^{-1} \bmod q)R \qquad (3\text{-}6)$$

Then, using the value of v thus obtained and C stored in the authentication data memory unit 106, the derandomizing unit 114 executes calculation of the following expression (3-7):

[Expression 22]

$$M'=C-v \qquad (3\text{-}7)$$

10. The verification computation unit 108 (verification part 102) calculates data K' corresponding to point M'. Only when the combination of access ticket, t, with user unique identifying information, e, used in the proof data generation device 200 is correct, the data K' obtained by calculation and the verification data K coincide with each other and verification if effected correctly.

For comparison between K' and verification data K there may be used the same method as that used in Embodiment 1.

Embodiment 4

(FIG. 3, 6 and 11)

In this Embodiment 4, which is a modification of the configuration of Embodiment 2, there is used Pohlig-Hellman cryptography and decryption is performed on the proof data generation device 200 side.

In this embodiment, the method for setting an elliptic curve on a finite field, a cryptographic configuration on the elliptic curve E, how to generate access ticket, t, seed for authentication data, u, and authentication data C, how to utilize proof data generation control information, and the respective properties to be satisfied, are the same as in Embodiment 1.

Also as to the method for making a point on the elliptic curve correspond to data, there may be adopted the same method as in Embodiment 1.

In this embodiment, the order of point p is assumed to be q.

The configuration of the proof data generation device 200 and that of the proof data verification device 100 both used in this embodiment are shown in FIGS. 3 and 6, respectively. The operations of both devices 200 and 100 are shown in FIG. 11.

The operation of this embodiment will be described below.

1. The proof data verification device 100 is started upon access thereto made by a user.
2. Point u on E is stored as seed for authentication data in the seed for authentication data memory unit 105 and point C on E is stored as authentication data in the authentication data memory unit 106.

The proof data verification device 100 stores authentication data u' and C', as well as parameters p, a and b which are stored in the access ticket public key memory unit 104 and which define the elliptic curve E, into the first memory unit 205 in the proof data generation device 200.

In the proof data verification device 100, a random number, r, is generated by the random number generation unit 111 so as to become mutually prime with respect to the order q of point P which is held in the access ticket public key memory unit 104, and stores it in the random number memory unit 113.

The authentication data u' is generated in the following manner. The randomizing unit 112 acquires the data, u, stored in the seed for authentication data memory unit 105 and executes calculation of the following expression (4-1):
[Expression 23]

$$u'=ru \qquad (4\text{-}1)$$

The authentication data C' is generated in the following manner. The randomizing unit 112 acquires the data C stored in the authentication data memory unit 106 and executes calculation of the following expression (4-2):
[Expression 24]

$$C'=rC \qquad (4\text{-}2)$$

3. The proof data generation part 202 checks to see whether the utilization-term time in the proof data generation control information has passed the time indicated by the clock 209 in the proof data generation device 200. If the answer is affirmative, an error code is sent back to the proof data verification device 100.

4. Subsequently, the proof data generation part 202 acquires the access ticket, t, stored in the third memory part 207 (access ticket memory unit 203) and executes calculation of the following expression (4-3) to obtain S:
[Expression 25]

$$S=tu' \qquad (4\text{-}3)$$

5. Then, the proof data generation part 202 acquires the user unique identifying information, e, stored in the fourth memory unit 208 (user unique identifying information memory unit 201) and execute calculation of the following expression (4-4):
[Expression 26]

$$F(p, e, a, b, L) \qquad (4\text{-}4)$$

6. Next, using data generated by the exponent generation part, the proof data generation part 202 executes calculation of the following expression (4-5) to obtain S':
[Expression 27]

$$S'=F(p, e, a, b, L)u' \qquad (4\text{-}5)$$

7. Then, the proof data generation part 202 obtains S' and S from the first and second computation units and executes calculation of the following expression (4-6) to obtain R:
[Expression 28]

$$R=C'-S-S' \qquad (4\text{-}6)$$

8. The proof data generation device 200 sends R back to the received data memory unit 107 in the proof data verification device 100.

9. The derandomizing unit 114 in the proof data verification device 100 fetches the previously generated random number, r, from the random number memory unit 113, further fetches the order q of point P from the access ticket public key memory unit 104, and executes calculation of the following expression (4-7):
[Expression 29]

$$M'=(r^{-1} \bmod q)R \qquad (4\text{-}7)$$

10. The verification unit calculates data K' corresponding to point M'. Only when the combination of access ticket, t, with user unique identifying information, e, used in the proof data generation device 200 is correct, the data K' obtained by calculation and the verification data K coincide with each other and verification is effected correctly.

For comparison between K' and verification data there may be adopted the same method as in Embodiment 1.

Embodiment 5

(FIGS. 3, 7 and 12)

In this embodiment, which is a modification of the configuration of Embodiment 1, an ElGamal cipher is used and decryption is performed on the proof data verification device 100 side.

In this embodiment, the method for setting an elliptic curve on a finite field, a cryptographic configuration on the elliptic curve E, how to generate access ticket, t, seed for authentication data, u, and authentication data C, how to utilize proof data generation control information, and the respective properties to be satisfied, are the same as in Embodiment 1.

Also as to the method for making a point on the elliptic curve corresponding to data, there may be used the same method as in Embodiment 1.

The configuration of the proof data generation device 200 and that of the proof data verification device 100 both used in this embodiment are shown in FIGS. 3 and 7, respectively. Further, the operations of both devices 200 and 100 are shown in FIG. 12.

The operation of this embodiment will be described below.

1. The proof data verification device 100 is started upon access thereto made by a user.
2. Point u on E is stored as seed for authentication data in the seed for authentication data memory unit 105 and point C on E is stored as authentication data in the authentication data memory unit 106.

The authentication data verification device 100 stores authentication data, u', as well as parameters p, a and b which are stored in the access ticket public key memory 104 and which define the elliptic curve E, into the first memory unit 205 in the proof data generation device 200.

In the proof data verification device 100, a random number, r, is generated by the random number generation unit 111 and is stored in the random number memory unit 113.

The authentication data, u', is generated in the following manner. The randomizing unit 112 acquires the data, u, stored in the seed for authentication data memory unit 105 and executes calculation of the following expression (5-1):
[Expression 30]

$$u'=u+rP \quad (5\text{-}1)$$

3. The proof data generation unit 202 checks to see whether the utilization-term time has passed the time indicated by the clock 209 in the proof data generation device 200. If the answer is affirmative, an error code is sent back to the proof data verification device 100.
4. Subsequently, the proof data generation part 202 acquires the access ticket, t, stored in the third memory part 207 (access ticket memory unit 203) and executes calculation of the following expression (5-2) to obtain S:
[Expression 31]

$$S=tu' \quad (5\text{-}2)$$

5. Then, the proof data generation part 202 acquires the user unique identifying information, e, stored in the fourth memory part 208 (user unique identifying information memory unit 201) and executes calculation of the following expression (5-3):
[Expression 32]

$$F(p, e, a, b, L) \quad (5\text{-}3)$$

6. Next, using data generated by the exponent generation part, the proof data generation part 202 executes calculation of the following expression (5-4) to obtain S':
[Expression 33]

$$S'=F(p, e, a, b, L)u' \quad (5\text{-}4)$$

7. Then, the proof data generation part 202 obtains S' and S from the first and second computation units and executes calculation of the following expression (5—5) to obtain R:
[Expression 34]

$$R=S+S' \quad (5\text{—}5)$$

8. The proof data generation device 200 sends R back to the received data memory unit 107 in the proof data verification device 100.
9. The derandomizing unit 114 in the proof data verification device 100 acquires the previously generated random number, r, from the random number memory unit 113 and first executes calculation of the following expression (5-6):
[Expression 35]

$$v=R-rY \quad (5\text{-}6)$$

Next, the derandomizing unit 114 fetches C from the authentication data memory unit 106 and executes calculation of the following expression (5-7) using the above value of v:
[Expression 36]

$$M'=C-v \quad (5\text{-}7)$$

10. The verification computation unit 108 (verification part 3) calculates data K' corresponding to point M'. Only when the combination of access ticket, t, with user unique identifying information, e, used in the proof data generation device 200 is correct, the data K' obtained by calculation and the verification data K coincide with each other and verification is effected correctly.

For comparison between K' and verification data K, there may be adopted the same method as in Embodiment 1.

Embodiment 6
(FIGS. 3, 6 and 13)

In this embodiment, which is a modification of the configuration of Embodiment 2, an ElGamal cipher is used and decryption is performed on the proof data generation device 200 side.

In this embodiment, the method for setting an elliptic curve on a finite field, a cryptographic configuration on the elliptic curve E, how to generate access ticket, t, seed for authentication data, u, and authentication data C, how to utilize proof data generation control information, and the respective properties to be satisfied, are the same as in Embodiment 1.

Also as to the method for making a point on the elliptic curve correspond to data, there may be adopted the same method as in Embodiment 1.

In this embodiment, the configuration of the proof data generation device 200 is shown in FIG. 3 and that of the proof data verification device 100 is shown in FIG. 6. Further, the operations of both devices 200 and 100 are shown in FIG. 13.

The operation of this embodiment will be described below.

1. The proof data verification device 100 is started upon access thereto made by a user.
2. Point u on E is stored as seed for authentication data in the seed for authentication data memory unit 105 and point C on E is stored as authentication data in the authentication data memory unit 106.

The authentication data verification device 100 stores authentication data, u' and C', as well as parameters p, a and b which are stored in the access ticket public key memory unit 104 and which define the elliptic curve E, into the first memory unit 205 in the proof data generation device 200, provided C' is equal to C.

In the proof data verification device 100, a random number, r, is generated by the random number generation unit 111 and is stored in the random number memory unit 113.

The authentication data u' is generated in the following manner. The randomizing unit 112 acquires the data, u, stored in the seed for authentication data memory unit 105 and executes calculation of the following expression (6-1):
[Expression 37]

$$u'=u+ra \quad (6\text{-}1)$$

3. The proof data generation part 202 checks to see whether the utilization-term time in the proof data generation control information has passed the time indicated by the clock 209 in the proof data generation device 200. If the answer is affirmative, an error code is sent back to the proof data verification device 100.
4. Subsequently, the proof data generation device 202 acquires the access ticket, t, stored in the third memory part 207 (access ticket memory unit 203) and executes calculation of the following expression (6-2) to obtain S:
[Expression 38]

$$S=tu' \quad (6\text{-}2)$$

5. Then, the proof data generation part 202 acquires the user unique identifying information, e, stored in the fourth memory part 208 (user unique identifying information memory unit 201) and executes calculation of the following expression (6-3):
[Expression 39]

$$F(p, e, a, b, L) \quad (6\text{-}3)$$

6. Next, using data generated by the exponent generation part, the proof data generation part 202 executes calculation of the following expression (6-4) to obtain S':
[Expression 40]

$$S'=F(p, e, a, b, L)u' \quad (6\text{-}4)$$

7. Then, the proof data generation part 202 acquires S' and S from the first and second computation units and executes calculation of the following expression (6-5) to obtain R.
[Expression 41]

$$R=C'-S-S' \quad (6\text{-}5)$$

8. The proof data generation device 200 sends R back to the received data memory unit 107 in the proof data verification device 100.
9. The derandomizing unit 114 in the proof data verification device 100 fetches the previously generated random number, r, from the random number memory unit 113, further acquires Y from the access ticket public key memory unit 104, and executes calculation of the following expression (6—6):
[Expression 42]

$$M'=R+rY \quad (6\text{—}6)$$

10. The verification part calculates data K' corresponding to point M'. Only when the combination of access ticket, t, with user unique identifying information, e, used in the proof data generation device 200 is correct, the data K' obtained by calculation and the verification data K coincide with each other and verification is effected correctly. For comparison between K' and verification data K, there may be adopted the same method as in Embodiment 1.

Embodiment 7
(FIGS. 3, 4 and 20)

In this embodiment, which is a modification of the configuration of Embodiment 1, a predetermined mask computation is performed for the verification data K and the data thus processed is used as authentication data, further, decryption is conducted on the proof data verification device 100 side.

In this embodiment, the method for setting an elliptic curve on a finite field, a cryptographic configuration on the elliptic curve E, how to generate access ticket, t, and seed for authentication data, u, how to utilize proof data generation control information, and the respective properties to be satisfied, are the same as in Embodiment 1.

In this embodiment, proof data is assumed to be K, and in accordance with the following expression (7-1), there is obtained point C ($c_x$, $c_y$) on E by multiplying the access ticket public key Y by an appropriate random number, z, as noted previously:
[Expression 43]

$$C(c_x, c_y)=zY \quad (7\text{-}1)$$

Further, there is calculated an exclusive OR of the proof data K and the value, $c_x$, of x coordinates of point C, and the value thus obtained is assumed to be authentication data, c.
[Expression 44]

$$c=K[+]c_x \quad (7\text{-}2)$$

where [+] stands for an exclusive OR.

The configuration of the proof data generation device 200 is shown in FIG. 3 and that of the proof data verification device 100 is shown in FIG. 4. Further, the operations of both devices 200 and 100 are shown in FIG. 20.

The following description is now provided about the operation of this embodiment.
1. The proof data verification device 100 is started upon access thereto made by a user.
2. In the authentication data memory unit 106 is stored the data, c, as authentication data.

The proof data verification device 100 stores authentication data u' (=u), as well as parameters p, a and b which are stored in the access ticket public key memory unit 104 and which define the elliptic curve E, into the first memory unit 205 in the proof data generation device 200.
3. The proof data generation part 202 checks to see whether the utilization-term time in the proof data generation control information has passed the time indicated by the clock 209 in the proof data generation device 200. If the answer is affirmative, an error code is sent back to the proof data verification device 100.
4. Then, the proof data generation part 202 acquires the access ticket, t, stored in the access ticket memory part and executes calculation of the following expression (7-3) to obtain S:
[Expression 45]

$$S=tu' \quad (7\text{-}3)$$

5. The proof data generation part 202 then acquires the user unique identifying information, e, stored in the user unique identifying information memory part and executes calculation of the following expression (7-4):
[Expression 46]

$$F(p, e, a, b, L) \quad (7\text{-}4)$$

6. Subsequently, using data generated by the exponent generation part, the proof data generation part 202 executes calculation of the following expression (7-5) to obtain S':

[Expression 47]

$$S'=F(p, e, a, b, L)u' \quad (7\text{-}5)$$

7. Next, the proof data generation part 202 acquires R' and S from the first and second computation units and executes calculation of the following expression (7-6) to obtain R:

[Expression 48]

$$R=S+S' \quad (7\text{-}6)$$

8. The proof data generation device 200 sends R back to the received data memory unit 107 in the proof data verification device 100.

9. The verification part 102 in the proof data verification device 100 acquires authentication data, c, from the authentication data memory part and calculates an exclusive OR, K', thereof with x coordinates, $v_x$, of the proof data R.

[Expression 49]

$$K'=v_x[+]c \text{(The coordinates of point R are assumed to be } (v_x, v_y)\text{)}$$

10. Only when the combination of access ticket, t, with user unique identifying information, e, used in the proof data generation device 200 is correct, the data K' obtained by calculation and the verification data K coincide with each other and verification is effected correctly.

For comparison between K' and verification data K, there may be adopted the same method as in Embodiment 1.

Embodiment 8
(FIGS. 3, 5 and 21)

In this embodiment, which is a modification of the configuration of Embodiment 7, a predetermined mask computation is executed and decryption is performed on the proof data generation device 200 side.

In this embodiment, the method for setting an elliptic curve on a finite field, a cryptographic configuration on the elliptic curve E, how to generate access ticket, t, seed for authentication data, u, and authentication data, c, how to utilize proof data generation control information, and the respective properties to be satisfied, are the same as in Embodiment 7.

The configuration of the proof data generation device 200 and that of the proof data verification device 100 both used in this embodiment are shown in FIGS. 3 and 5, respectively. Further, the operations of both devices 200 and 100 are shown in FIG. 21.

The following description is now provided about the operation of this embodiment.

1. The proof data verification device 100 is started upon access thereto made by a user.

2. The proof data verification device 100 stores authentication data u' (=u) and C' (=c), as well as parameters p, a and b which are stored in the access ticket public key memory part 104 and which define the elliptic curve E, into the first memory unit 205 in the proof data generation device 200.

3. The proof data generation part 202 checks to see whether the utilization-term time in the proof data generation control information has passed the time indicated by the clock 209 in the proof data generation device 200. If the answer is affirmative, an error code is sent back to the proof data verification device 100.

4. Subsequently, the proof data generation part 202 acquires the access ticket, t, stored in the third memory part 207 (access ticket memory unit 203) and executes calculation of the following expression (8-1) to obtain S:

[Expression 50]

$$S=tu' \quad (8\text{-}1)$$

5. The exponent generation part in the proof data generation device 200 acquires the user unique identifying information, e, stored in the fourth memory part 208 (user unique identifying information memory part 201) and executes calculation of the following expression (8-2):

[Expression 51]

$$F(p, e, a, b) \quad (8\text{-}2)$$

6. Using data generated by the exponent generation part, the second computation unit in the proof data generation device 200 executes calculation of the following expression (8-3) to obtain S':

[Expression 52]

$$S'=F(p, e, a, b)u' \quad (8\text{-}3)$$

7. The proof data generation part in the proof data generation device 200 acquires S' and S from the first and second computation units and executes calculation of the following expression (8-4) to obtain M:

[Expression 53]

$$M=S+S' \quad (8\text{-}4)$$

Next, using proof data, c, and x coordinates, $v_x$, of point M, the proof data generation part executes calculation of the following expression (8-5) to obtain R:

[Expression 54]

$$R=v_x[+]C \text{ (The coordinates of point L are assumed to be } (v_x, v_y)\text{.)} \quad (8\text{-}5)$$

8. The proof data generation device 200 sends R back to the received data memory unit 107 in the proof data verification device 100.

9. Only when the combination of access ticket, t, with user unique identifying information, e, used in the proof data generation device 200 is correct, the received R and the verification data K coincide with each other and verification is effected correctly.

For comparison between R and verification data K, there may be adopted the same method as in Embodiment 1.

Embodiment 9
(FIGS. 3, 7 and 22)

In this embodiment, which is a modification of the configuration of Embodiment 7, a Pohlig-Hellman cipher is used, a predetermined mask computation is performed, and decryption is conducted on the proof data verification device 100 side.

In this embodiment, the method for setting an elliptic curve on a finite field, a cryptographic configuration on the elliptic curve E, how to generate access ticket t, seed for authentication data, u, and authentication data, c, how to utilize proof data generation control information, and the respective properties to be satisfied, are the same as in Embodiment 7. In this embodiment, the order of point P is assumed to be q.

The configuration of the proof data generation device 200 and that of the proof data verification device 100 both used in this embodiment are shown in FIGS. 3 and 7, respectively. The operations of both devices 200 and 100 are shown in FIG. 22.

The following description is now provided about the operation of this embodiment.

1. The proof data verification device 100 is started upon access thereto made by a user.

2. Data, c, is stored as authentication data in the authentication data memory unit 106. In the proof data verification device 100, a random number, r, is generated by the random number generation unit 111 so as to become mutually prime with respect to the order q of point P which is held in the access ticket public key memory unit 104, and stores it in the random number memory unit 113.

Next, the randomizing unit 112 acquires the data, u, stored in the seed for authentication data memory unit 105 and executes calculation of the following expression (9-1):
[Expression 55]

$$u'=ru \quad (9\text{-}1)$$

The proof data verification device 100 stores the authentication data, u', thus generated, as well as parameters p, a and b which are stored in the access ticket public key memory unit 104 and which define the elliptic curve E, into the first memory unit 205 in the proof data generation device 200.

3. The proof data generation part 202 checks to see whether the utilization-term time in the proof data generation control information has passed the time indicated by the clock 209 in the proof data generation device 200. If the answer is affirmative, an error code is sent back to the proof data verification device 100.

4. Subsequently, the proof data generation part 202 acquires the access ticket, t, stored in the third memory part 207 (access ticket memory unit 203) and executes calculation of the following expression (9-2) to obtain S:
[Expression 56]

$$S=tu' \quad (9\text{-}2)$$

5. The proof data generation part 202 then acquires the user unique identifying information, e, stored in the fourth memory part 208 (user unique identifying information memory unit 201) and executes calculation of the following expression (9-3):
[Expression 57]

$$F(p, e, a, b, L) \quad (9\text{-}3)$$

6. Then, using data generated by the exponent generation part, the proof data generation part 202 executes calculation of the following expression (9-4) to obtain S':
[Expression 58]

$$S'=F(p, e, a, b, L)u' \quad (9\text{-}4)$$

7. Further, the proof data generation part 202 acquires S' and S from the first and second computation units and executes calculation of the following expression (9-5) to obtain R:
[Expression 59]

$$R=S+S' \quad (9\text{-}5)$$

8. The proof data generation device 200 sends R back to the received data memory unit 107 in the proof data verification device 100.

9. The derandomizing unit 114 in the proof data verification device 100 fetches the previously generated random number, r, from the random number memory unit 113, further fetches the order q of point P from the access ticket public key memory unit 104, and executes calculation of the following expression (9-6):
[Expression 60]

$$v=(r^{-1} \bmod q)R \quad (9\text{-}6)$$

10. The verification computation unit 108 (verification part 102) in the proof data verification device 100 fetches authentication data, c, from the authentication data memory unit 106 and calculates an exclusive OR, K', of the data, c, and x coordinates, $v_x$, of v.
[Expression 61]

$$K'=v_x[+]c \text{ (The coordinates of point v are assumed to be } (v_x, v_y).) \quad (9\text{-}7)$$

11. Only when the combination of access ticket, t, with user unique identifying information, e, used in the proof data generation device 200 is correct, the data K' obtained by calculation and the verification data K coincide with each other and verification is effected correctly.

For comparison between K' and verification data K, there may be used the same method as in Embodiment 1.

Embodiment 10
(FIGS. 3, 7 and 23)

In this embodiment, which is a modification of the configuration of Embodiment 7, a ElGamal cipher is used, a predetermined mask computation is performed, and decryption is conducted on the proof data verification device 100 side.

In this embodiment, the method for setting an elliptic curve on a finite field, a cryptographic configuration on the elliptic curve E, how to generate access ticket, t, seed for authentication data, u, and authentication data, c, how to utilize proof data generation control information, and the respective properties to be satisfied, are the same as in Embodiment 7.

In this embodiment, the configuration of the proof data generation device 200 and that of the proof data verification device 100 are shown in FIGS. 3 and 7, respectively. The operations of both devices 200 and 100 are shown in FIG. 23.

The following description is now provided about the operation of this embodiment.

1. The proof data verification device 100 is started upon access thereto made by a user.

2. Data, c, is stored as authentication data in the authentication data memory unit 106. In the proof data verification device 100, a random number, r, is generated by the random number generation unit 111 and is stored in the random number memory unit 113.

Next, the randomizing unit 112 acquires the data, u, stored in the seed for authentication data memory unit 105 and executes calculation of the following expression (10-1):
[Expression 62]

$$u'=u+rP \quad (10\text{-}1)$$

The proof data verification device 100 stores the authentication data u' thus generated, as well as parameters p, a and b which are stored in the access ticket public key memory unit 104 and which define the elliptic curve E, into the first memory unit 205 in the proof data generation device 200.

3. The proof data generation part 202 checks to see whether the utilization-term time in the proof data generation control information has passed the time indicated by the clock 209 in the proof data generation device 200. If the answer is affirmative, an error code is sent back to the proof data verification device 100.

4. Subsequently, the proof data generation part 202 acquires the access ticket, t, stored in the third memory part 207 (access ticket memory unit 203) and executes calculation of the following expression (10-2) to obtain S:

[Expression 63]

$$S=tu'  \quad (10\text{-}2)$$

5. The proof data generation part 202 then acquires the user unique identifying information, e, stored in the fourth memory part 208 (user unique identifying information memory unit 201) and executes calculation of the following expression (10-3):

[Expression 64]

$$F(p, e, a, b, L) \quad (10\text{-}3)$$

6. Next, using data generated by the exponent generation part, the proof data generation part 202 executes calculation of the following expression (10-4) to obtain S':

[Expression 65]

$$S'=F(p, e, a, b, L)u' \quad (10\text{-}4)$$

7. Then, the proof data generation part 202 acquires S' and S from the first and second computation units and executes calculation of the following expression (10-5) to obtain R:

[Expression 66]

$$R=S+S' \quad (10\text{-}5)$$

8. The proof data generation device 200 sends R back to the received data memory unit 107 in the proof data verification device 100.

9. The derandomizing unit 114 in the proof data verification device 100 fetches the previously generated random number, r, from the random number memory unit 113 and first executes calculation of the following expression (10-6):

[Expression 67]

$$v=R-rY \quad (10\text{-}6)$$

10. The proof data verification device 100 fetches authentication data, c, from the proof data memory unit 106 and calculates an exclusive OR, K', of the data c and x coordinates, $v_x$, of v.

[Expression 68]

$$K'=v_x[+]c \text{ (The coordinates of point R are assumed to be } (v_x, v_y).) \quad (10\text{-}7)$$

11. Only when the combination of access ticket, t, with user unique identifying information, e, used in the proof data generation device 200 is correct, the data K' obtained by calculation and the verification data K coincide with each other and verification is effected correctly.

For comparison between K' and verification data K, there may be adopted the same method as in Embodiment 1.

Further embodiments will be described below as variations of the proof data generation control information.

Embodiment 11
(FIGS. 24 and 25)

In this embodiment, there is shown a further example of utilization of the proof data generation control information which was used in the limitation of the utilization term in Embodiments 1 to 10. A description will be given below of the case where the proof data generation control information is utilization count limit information and where authentication and decryption of data can be done by only a predetermined number of times.

FIG. 24 shows an example of configuration of a proof data generation device 200. As to the configuration of a proof data verification device 100, there may be adopted any of the various configurations described above, with no special limitation imposed thereon. In the proof data generation device 200 in this embodiment, the clock 209 is substituted by an eleventh memory part 210 which stores, for each access ticket, how many times authentication or decryption has so far been conducted using the access ticket. The proof data generation control information used in this embodiment is count information indicating how many times the corresponding access ticket can be utilized at most. A proof data generation part controlling part in a proof data generation part 202 compares count information described in the proof data generation control information with a utilization count of the corresponding access ticket stored in the eleventh memory unit 210 and generates proof data only when the utilization count of the access ticket is below the count information described in the proof data generation control information, thereafter, increments the value of utilization count of the corresponding access ticket stored in the eleventh memory unit 210.

FIG. 25 is a flowchart showing the operation of the proof data generation part 202, whereby it is possible to implement a coupon ticket type electronic ticket. As to the contents shown in FIG. 25, no special explanation will be given because it can be seen easily from the same figure.

Embodiment 12
(FIGS. 26 and 27)

In connection with this embodiment, a description will be given below of the case where there is used total available time information as a still further example of the proof data generation control information which was used in the limitation of utilization term in Embodiments 1 to 10 and where authentication and decryption of data can be done only for a predetermined time.

FIG. 26 shows an example of configuration of a proof data generation device 200. Also in this embodiment, as to the configuration of a proof data verification device 100, there may be adopted any of the various configurations described above. As shown in FIG. 26, the proof data generation device 200 used in this embodiment is provided in the interior thereof with a twelfth memory unit 210 which stores, for each access ticket, total utilization time indicating how many times the user has received service through authentication or decryption so far by use of the access ticket, and a service time measuring part 212 which measures time every time service is received. For example, if authentication is certain to be made at both start and end of each service, the service time measuring part 212 can be implemented so as to measure the service time by calculating the difference between the time when one authentication data was prepared and the time when the other authentication data was prepared. Alternatively, it may be implemented using another communication part so as to receive signals at both start and end of service and then measure the service time in accordance with the received signals. Further, it is not always necessary for the service time measuring part 212 to be located within the proof data generation device 200. It may be located outside the device 200 if there is a method for notifying the service time safely to the proof data generation device 200 from the service time measuring part 212.

The proof data generation control information used herein is total available time information indicating how many hours at most the associated access ticket can be utilized. A proof data generation part controlling part in a proof data generation part 202 compares the total available time information described in the proof data generation control information with the total utilization time so far utilized of the corresponding access ticket which is stored in the twelfth memory part 210, and generates proof data. Thereafter, when the service is over, the value of the total available time of the corresponding access ticket stored in the twelfth memory part 210 is increased by time measured with the service time measuring part 212. Further, the authentication device may be urged to stop the service when the sum of the total access ticket utilization time and the current utilization time measured by the service time measuring part 212 has exceeded the total available time stored in the twelfth memory part 210.

FIG. 27 is a flowchart showing the operation of the proof data generation part 202, whereby it is possible to implement a time limitation type electronic ticket. Also as to the contents shown in FIG. 27, no special explanation will be given because it can be seen easily from the same figure.

Embodiment 13
(FIGS. 28 and 29)

In connection with this embodiment, a description will be given below of the case where the proof data generation control information used in this embodiment is a point or charge information necessary for one-time utilization and where authentication and decryption of data can be done by only a predetermined point or amount of money. The information in question is a still further example of the proof data generation control information which was used in the limitation of utilization term in Embodiments 1 to 10.

FIG. 28 shows an example of configuration of a proof data generation device 200. Also in this embodiment, as to the configuration of a proof data verification device 100, there may be adopted any of the various configurations described above, with no special limitation placed thereon. As shown in FIG. 28, inside the proof data generation device 200 is provided a thirteenth memory part 213 which stores a residual point number or balance information necessary for authentication or decryption. The proof data generation control information used herein is a point number or amount-of-money information necessary for one-time authentication or decryption using the corresponding access ticket. A proof data generation part controlling part in a proof data generation part 202 compares the point number or amount-of-money information necessary for one-time authentication or decryption, which is described in the proof data generation control information, with the residual point number or balance information stored in the thirteenth memory part 213 and generates proof data only when the residual point number or balance information is above the point number or amount-of-money information necessary for one-time authentication or decryption. Thereafter, the value stored in the thirteenth memory part 213 is decreased by the above point number or amount of money necessary for one-time authentication or decryption. A modification may be made so that the value stored in the thirteenth memory part 213 can be rewritten (reloading of the point number or amount of money) by another part.

FIG. 29 is a flowchart showing the operation of the proof data generation part 202, whereby it is possible to implement a prepaid type electronic ticket. Also as to the contents shown in FIG. 29, no special explanation will be made because it can be seen easily from the same figure.

Embodiment 14
(FIGS. 30 and 31)

The proof data generation control information used in this embodiment is a piece of information which determines whether a processing record (hereinafter referred to as "log") is to be outputted or not. An explanation will be given below about a method of surely recording a log whenever it is necessary to record the log in authentication or decryption. The information used in this embodiment is a still further example of the proof data generation control information which was used in the limitation of utilization term in Embodiments 1 to 10.

There is a post-paid type payment method wherein a log on service is recorded upon receipt of the service and later payment is made for the service described in the log. For implementing this method, it is necessary that the log be surely left behind at the time of offering the service.

However, if the log is left behind in all of various payment methods, there is a fear of causing disturbance of privacy. Therefore, it is necessary to adopt a method for controlling whether the log is to be left behind or not, such as a method wherein the log is left behind only when it is necessary to do so, like a post-paid service.

FIG. 30 shows an example of configuration of a proof data generation device 200. Also in this embodiment, as to the configuration of a proof data verification device 100, there may be adopted any of the various configurations described previously, with no special limitation placed thereon. As shown in FIG. 30, the proof data generation device 200 used in this embodiment is provided with a log recording part 214. The proof data generation control information used in this embodiment is a piece of information which indicates whether the log is to be recorded or not at the time of authentication or decryption. If it is described therein that the log should be recorded, a proof data generation part controlling part in a proof data generation part 202 delivers a necessary piece of information to the log recording part 214, which in turn records that information.

FIG. 31 is a flowchart showing the operation of the proof data generation part 202, whereby it is possible to implement the method wherein the log is recorded only when it is necessary to do so. Also as to the contents shown in FIG. 31, there will be made no special explanation because it can be seen easily from the same figure.

Embodiment 15
(FIGS. 32 and 33)

The proof data generation control information used in this embodiment is personal authentication information such as data associated with information which only specific person knows such as password or data associated with a personal identifying information such as voiceprint, fingerprint, iris and retina pattern information. An explanation will be given below about a method which permits authentication or decryption only when collation of those data is effected correctly. This embodiment shows a still further example of utilization of the proof data generation control information which was used in the limitation of utilization term in Embodiments 1 to 10.

FIG. 32 shows an example of configuration of the proof data generation device 200. Also in this embodiment, as the configuration of a proof data verification device 100 there may be adopted any of the various configurations described previously, with no special limitation placed thereon. As shown in FIG. 32, the proof data generation device 200 used in this embodiment is provided with a personal authentication information extracting part 214. It is optional whether the personal authentication information extracting part 214 is to be located inside the proof data generation device 200 or outside thereof. The proof data generation control information used herein represents personal authentication information of an individual capable of effecting authentication or decryption by use of the corresponding access ticket or it represents a scope capable of being covered by the personal authentication information. A proof data generation part controlling part in a proof data generation part 202 compares the personal authentication data described in the proof data generation control information or the information of the scope capable of being covered by the personal authentication information with information provided by the personal authentication information extracting part 214 and generates proof data if both are the same or within an effective range.

FIG. 33 is a flowchart showing the operation of the proof data generation part 202, whereby even without prior provision of a data base for personal authentication it is possible to effect personal authentication at the time of performing authentication or decryption. Also as to the contents shown in FIG. 33, no special explanation will be given because it can be seen easily from the same figure.

Embodiment 16
(FIGS. 34 and 35)

In connection with this embodiment, a description will be given below of the case where the proof data generation control information is a program for carrying out various processing and where a control is made on the basis of the results of the program processing as to whether or not authentication or decryption is to be conducted. This embodiment shows a still further example of utilization of the proof data generation control information which was used in the limitation of utilization term in Embodiments 1 to 10. Processing to be carried out herein may be determination based on a combination of various pieces of control information such as the above utilization term, utilization count, personal authentication and recording of log, or may be processing involving communication with an external component 215 (FIG. 34), for example, communication with an agent of a service offerer or an agent of an author of a software program or data, subsequent acquisition of permission for receiving service, and confirmation of a predetermined amount of money having been paid into an account of the service offerer or the author of software program or data.

FIG. 34 shows an example of configuration of a proof data generation device 200. Also in this embodiment, as to the configuration of a proof data verification device 100, there may be adopted any of the various configurations described above, with no special limitation imposed thereon. In this embodiment, as shown in FIG. 34, the proof data generation device 200 is provided with a second program execution part 216 which executes the program described in the proof data generation control information. A proof data generation part control part in a proof data generation part 202 functions so that the program described in the proof data generation control information is executed in the second program execution part 216, and generates proof data only when the program is terminated in a specific state or only when it is in the specific state.

FIG. 35 is a flowchart showing the operation of the proof data generation part 202, whereby it is possible to implement controls as decrypted controls of such various control methods as referred to above and whereby, through communication with another component, it is possible to implement authentication and decryption which premise a high degree of conditions and operation control. Also as to the contents shown in FIG. 35, no special explanation will be given because it can be seen easily from the same figure.

Embodiment 17
(FIGS. 3, 4 and 36)

In this embodiment, a random number is not used and decryption is performed on the proof data verification device 100 side.

Unique security characteristic information X used in this embodiment is a private key of an ElGamal cipher under modulo, p, (p is a sufficiently large prime number), and Y is a corresponding public key. That is, the following expression (17-1) is satisfied:
[Expression 69]

$$Y = a^x \bmod p \qquad (17\text{-}1)$$

where a stands for a generator of a multiplicative group of a finite field with the order, p, satisfying the following expressions (17-2) and (17-3):
[Expression 70]

$$a \neq 0 \qquad (17\text{-}2)$$

$$\min \{x > 0 | a^x = 1 \bmod p\} = p - 1 \qquad (17\text{-}3)$$

Next, for identifying each user, there is determined a user unique identifying information, e, which takes a different number for each user, and proof data generation control information which defines conditions for authenticating user's access right is assumed to be L. Access ticket, t, is generated in accordance with the following expression (17-4):
[Expression 71]

$$t = X - F(p, e, L)$$

where X stands for an access ticket private key and Y stands for an access ticket public key.

The operation of this embodiment will be described below.

In this embodiment there are used the proof data generation device 200 of the configuration shown in FIG. 3 and the proof data verification device 100 of the configuration shown in FIG. 4. Further, the operations of both devices 200 and 100 are shown in FIG. 36.

1. When the user accesses digital contents to be authenticated by the device for authenticating user's access right to resources, the proof data verification device 100 is started.

For implementing the proof data verification device 100 there may be used any of an application program which operates on the user's PC or work station, or a server program on a server connected through a network to the user's PC or work station, or such a dedicated device as an IC card reader-writer. This is the same as in Embodiment 1 and is also the case with the following embodiments.

2. The proof data verification device 100 stores authentication data u', modulo p stored in the access ticket public key memory unit 104, and generation conditions L, into the first memory unit 205 in the proof data generation device 200. Data, u, is stored as seed for authentication data in the seed for authentication data memory unit 105 and data C is stored as authentication data in the authentication data memory unit 106. This data satisfies the following characteristics.

U is a number obtained by exponentiating the foregoing a under the modulo, p, and with the random number, z, as exponent satisfying the following expression (17-5):
   [Expression 72]

$$u = a^z \bmod p \qquad (17\text{-}5)$$

When appropriate data K is used as verification data, C is the product of a number obtained by exponentiating the access ticket public key Y under the modulo, p, and with the foregoing random number, z, as exponent and the verification data K, satisfying the following expression (17-6):

[Expression 73]

$$C = Y^z K \bmod p \quad (17\text{-}6)$$

If the proof data verification device 100 is configured so as to hold only C that is the result of encryption of the verification data K, without holding the verification data K, it is possible to prevent leakage of the verification data from the proof data verification device 100.

In this embodiment, the authentication data, u', is the same as the seed for authentication data, u.

[Expression 74]

$$u' = u \quad (17\text{-}7)$$

3. The first computation unit in the proof data generation device 200 acquires the access ticket, t, stored in the access ticket memory unit and executes calculation of the following expression (17-8) under the modulo, p, stored in the received data memory unit 107 to obtain S:

[Expression 75]

$$S = u^t \bmod p \quad (17\text{-}8)$$

4. The exponent generation part in the proof data generation device 200 acquires the user unique identifying information, e, stored in the fourth memory part 208 (user unique identifying information memory part 201) and executes calculation of the following expression (17-9):

[Expression 76]

$$F(e, p, L) \quad (17\text{-}9)$$

5. Using data generated by the exponent generation part, the second computation unit in the proof data generation device 200 executes calculation of the following expression (17-10) to obtain S':

[Expression 77]

$$S' = u^{F(e,p,L)} \bmod p \quad (17\text{-}10)$$

6. The proof data generation part 202 in the proof data generation device 200 obtains S' and S from the first and second computation units and executes calculation of the following expression (17-11) to obtain R:

[Expression 78]

$$R = S \cdot S' \bmod p \quad (17\text{-}11)$$

7. The proof data generation device 200 sends R back to the received data memory unit 107 in the proof data verification device 100.

8. The verification computation unit 108 (verification part 102) in the proof data verification device 100 fetches authentication data C from the authentication data memory unit 106 and executes calculation of the following expression (17-12):

[Expression 79]

$$K' = C \cdot R^{-1} \bmod p \quad (17\text{-}12)$$

9. Only when the combination of access ticket, t, with user unique identifying information, e, used in the proof data generation device 200 is correct, the data K' obtained by calculation and the verification data K coincide with each other and verification is effected correctly.

10. The calculated K' is delivered to the execution part in the proof data verification device 100, provided the execution part executes the normal processing only when the relationship of K'=K exists.

For comparison between K' and verification data K, there may be used the same method as in Embodiment 1.

Embodiment 18

(FIGS. 3, 7 and 37)

In this embodiment, which is a modification of Embodiment 17, decryption is performed on the proof data verification 100 side.

In this embodiment, the configuration of an ElGamal public key cipher, how to generate access ticket, t, seed for authentication data, u, and authentication data C, as well as the respective properties to be satisfied, are the same as in Embodiment 17.

A description will be given below of a configuration example wherein authentication data and proof data are randomized to make their re-use impossible in the event that the data is stolen on a communication channel.

The configuration of the proof data generation device 200 and that of the proof data verification device 100 both used in this embodiment are shown in FIGS. 3 and 7, respectively. Further, the operations of both devices 200 and 100 are shown in FIG. 37.

The following description is now provided about the operation of this embodiment.

1. The proof data verification device 100 is started upon access thereto made by a user.

2. The proof data verification device 100 stores authentication data u', modulo p stored in the access ticket public key memory unit 104, and generation conditions L, into the first memory unit 205 in the proof data generation device 200.

Data, u, is stored as seed for authentication data in the seed for authentication data memory unit 105 and authentication data C is stored in the authentication data memory unit 106.

In the proof data verification device 100, a random number, r, is generated by the random number generation unit 111 so as to become mutually prime with respect to the value (p−1) obtained by subtracting one (1) from the modulo, p, stored in the access ticket public key memory unit 104, to be stored in the random number memory unit 113.

Next, the randomizing unit 112 acquires the data, u, stored in the seed for authentication data memory unit 105 and calculates authentication data, u', in accordance with the following expression (18-1):

[Expression 80]

$$u' = u^r \bmod p \quad (18\text{-}1)$$

3. The first computation unit in the proof data generation device 200 acquires the access ticket, t, stored in the third memory part 207 (access ticket memory unit 203) and executes calculation of the following expression (18-2) under the modulo, P, stored in the received data memory unit 107 to obtain S:

[Expression 81]

$$S = u^a \bmod p \quad (18\text{-}2)$$

4. The exponent generation part in the proof data generation device 200 acquires the user unique identifying information, e, stored in the fourth memory part 208 (user unique identifying information memory unit 201) and executes calculation of the following expression (18-3):

[Expression 82]

$$F(p, e, L) \quad (18\text{-}3)$$

5. Using the data generated by the exponent generation part, the second computation unit in the proof data generation device 200 executes calculation of the following expression (18-4) to obtain S':
[Expression 83]

$$S'=u'^{F(p,e,L)} \bmod p \qquad (18\text{-}4)$$

6. The proof data generation part in the proof data generation device 200 acquires S' and S from the first and second computation units and executes calculation of the following expression (18-5) to obtain R:
[Expression 84]

$$R=S'S \bmod p \qquad (18\text{-}5)$$

7. The proof data generation device 200 sends R back to the received data memory unit 107 in the proof data verification device 100.
8. The derandomizing unit 114 in the proof data verification device 100 fetches the previously generated random number, r, from the random number memory unit 113 and first executes calculation of the following expression (18-6):
[Expression 85]

$$v=R^{r^{-1} \bmod (p-1)} \bmod p \qquad (18\text{-}6)$$

Then, using v thus obtained and C stored in the authentication data memory unit 106, there is performed calculation of the following expression (18-7):
[Expression 86]

$$K'=C \cdot v^{-1} \bmod p \qquad (18\text{-}7)$$

9. Only when the combination of access ticket, t, with user unique identifying information, e, used in the proof data generation device 200 is correct, the data K' thus obtained and the verification data K coincide with each other and verification is effected correctly.

For comparison between K' and verification data K, there may be used the same method as in Embodiment 1.

Embodiment 19
(FIGS. 3, 6 and 38)

In this embodiment, which is a modification of the configuration of Embodiment 18, decryption is performed on the proof data generation device 200 side.

In this embodiment, the configuration of an ElGamal public key cipher, how to generate access ticket, t, seed for authentication data, u, and authentication data C, and the respective properties to be satisfied, are the same as in Embodiment 17.

The configuration of the proof data generation device 200 and that of the proof data verification device 100 both used in this embodiment are shown in FIGS. 3 and 6, respectively. Further, the operations of both devices 200 and 100 are shown in FIG. 38.

The following description is now provided about the operation of this embodiment.
1. The proof data verification device 100 is started upon access thereto made by a user.
2. The proof data verification device 100 stores authentication data u' and C', modulo p stored in the access ticket public key memory unit 104, and generation conditions L, into the first memory unit 205 in the proof data generation device 200.

Data, u, is stored as a seed for authentication data in the seed for authentication data memory unit 105 and authentication data C is stored in the authentication data memory unit 106.

In the proof data verification device 100, a random number, r, is generated by the random number generation unit 111 so as to become mutually prime with respect to the value (p−1) obtained by subtracting one (1) from the modulo, p, which is held in the access ticket public key memory unit 104, and stores it in the random number memory unit 113.

Subsequently, the randomizing unit 112 acquires the data, u, stored in the seed for authentication data memory unit 105 and calculates authentication data, u', in accordance with the following expression (19-1):
[Expression 87]

$$u'=u^r \bmod p \qquad (19\text{-}1)$$

Authentication data C' is generated in the following manner. The randomizing unit acquires data C from the authentication data memory unit and executes calculation of the following expression (19-2):
[Expression 88]

$$C'=C^r \bmod p \qquad (19\text{-}2)$$

3. The first computation unit in the proof data generation device 200 acquires the access ticket, t, stored in the third memory part 207 (access ticket memory unit 203) and executes calculation of the following expression (19-3) under the modulo, p, stored in the received data memory unit 107 to obtain S:
[Expression 89]

$$S=u'^t \bmod p \qquad (19\text{-}3)$$

4. The exponent generation part in the proof data generation device 200 acquires the user unique identifying information, e, stored in the fourth memory part 208 (user unique identifying information memory unit 201) and executes calculation of the following expression (19-4):
[Expression 90]

$$F(p, e, L) \qquad (19\text{-}4)$$

5. Using the data thus generated by the exponent generation part, the second computation unit in the proof data generation device 200 executes calculation of the following expression (19-5) to obtain S':
[Expression 91]

$$S'=u'^{F(p,e,L)} \bmod p \qquad (19\text{-}5)$$

6. The proof data generation part in the proof data generation device 200 acquires S' and S from the first and second computation units and executes calculation of the following expression (19-6) to obtain R:
[Expression 92]

$$R=C'(S'\ S)^{-1} \bmod p \qquad (19\text{-}6)$$

7. The proof data generation device 200 sends R back to the received data memory unit 107 in the proof data verification device 100.
8. The derandomizing unit 114 in the proof data verification device 100 fetches the previously generated random number, r, from the random number memory unit 113 and executes calculation of the following expression (19-7):
[Expression 93]

$$K'=R^{r^{-1} \bmod (p-1)} \bmod p \qquad (19\text{-}7)$$

9. Only when the combination of access ticket, t, with user unique identifying information, e, used in the proof data generation device 200 is correct, the data K' thus obtained and the proof data K coincide with each other and verification is effected correctly.

For comparison between K' and verification data K, there may be used the same method as in Embodiment 1.

Embodiment 20
(FIGS. 3, 7 and 39)

Embodiment 20 is a modification of the configuration of Embodiment 18 and its authentication method is different from that of Embodiment 18. Decryption is performed on the proof data verification device 100 side.

In this embodiment, the configuration of an ElGamal public key cipher, how to generate access ticket, t, seed for authentication data, u, and authentication data C, and the respective properties to be satisfied, are the same as in Embodiment 19.

The configuration of the proof data generation device 200 and that of the proof data verification device 100 both used in this embodiment are shown in FIGS. 3 and 7, respectively. Further, the operations of both devices 200 and 100 are shown in FIG. 39.

The following description is now provided about the operation of this embodiment.

1. The proof data verification device 100 is started upon access thereto made by a user.
2. The proof data verification device 100 stores authentication data u', modulo p stored in the access ticket public key memory unit 104, and generation conditions L, into the first memory unit 205 in the proof data generation device 200.

Data, u, is stored as seed for authentication data in the seed for authentication data memory unit 105 and authentication data C is stored in the authentication data memory unit 106.

In the proof data verification device 100, a random number, r, is generated by the random number generation unit 111 and is stored in the random number memory unit 113.

Next, the randomizing unit 112 acquires the data, u, stored in the seed for authentication data memory unit 105 and calculates authentication data, u', in accordance with the following expression (20-1):
[Expression 94]

$$u' = u \cdot a^r \bmod p \tag{20-1}$$

3. The first computation unit in the proof data generation device 200 acquires the access ticket, t, stored in the third memory part 207 (access ticket memory unit 203) and executes calculation of the following expression (20-2) under the modulo, p, stored in the received data memory unit 107 to obtain S:
[Expression 95]

$$S = u'^t \bmod p \tag{20-2}$$

4. The exponent generation part in the proof data generation device 200 acquires the user unique identifying information, e, stored in the fourth memory part 208 (user unique identifying information memory unit 201) and executes calculation of the following expression (20-3):
[Expression 96]

$$F(p, e, L) \tag{20-3}$$

5. Using data generated by the exponent generation part, the second computation unit in the proof data generation device 200 executes calculation of the following expression (20-4) to obtain S':

[Expression 97]

$$S' = u'^{F(p,e,L)} \bmod p \tag{20-4}$$

6. The proof data generation part in the proof data generation device 200 acquires S' and S from the first and second computation units and executes calculation of the following expression (20-5) to obtain R:
[Expression 98]

$$R = S' S \bmod p \tag{20-5}$$

7. The proof data generation device 200 sends R back to the received data memory unit 107 in the proof data verification device 100.
8. The derandomizing unit 114 in the proof data verification device 100 fetches the previously generated random number, r, from the random number memory unit 113 and first conducts calculation of the following expression (20-6):
[Expression 99]

$$v = Y^{-r} \cdot R \bmod p \tag{20-6}$$

Next, the derandomizing unit 114 fetches C from the authentication data memory unit 106 and executes calculation of the following expression (20-7):
[Expression 100]

$$K' = C \cdot v^{-1} \bmod p \tag{20-7}$$

9. Only when the combination of access ticket, t, with user unique identifying information, e, used in the proof data generation device 200 is correct, the data K' thus obtained and the verification data K coincide with each other and verification is effected correctly.

For comparison between K' and K, there may be used the same method as in Embodiment 1.

Embodiment 21
(FIGS. 3, 6 and 40)

This embodiment is a modification of the configurations described in Embodiments 18 and 19 and a basic authentication method adopted in this embodiment is the same as in Embodiment 19, except decryption is performed on the proof data generation device 200 side as in Embodiment 18.

In this embodiment, the configuration of an ElGamal public key cipher, how to generate access ticket, t, seed for authentication data, u, and authentication data C, and the respective properties to be satisfied, are the same as in Embodiment 19.

The configuration of the proof data generation device 200 and that of the proof data verification device 100 both used in this embodiment are shown in FIGS. 3 and 6, respectively. Further, the operations of both devices 200 and 100 are shown in FIG. 40.

The following description is now provided about the operation of this embodiment.

1. The proof data verification device 100 is started upon access thereto made by a user.
2. The proof data verification device 100 stores authentication data u' and C, modulo p stored in the access ticket public key memory unit 104, and generation conditions L, into the first memory unit 205 in the proof data generation device 200.

Data, u, is stored as seed for authentication data in the seed for authentication data memory unit 105 and authentication data C is stored in the authentication data memory unit 106.

In the proof data verification device 100, a random number, r, is generated by the random number generation unit 111 and is stored in the random number memory unit 113.

Next, the randomizing unit 112 acquires the data, u, stored in the seed for authentication data memory unit 105 and calculates authentication data, u', in accordance with the following expression (21-1):

[Expression 101]

$$u'=u \cdot a^r \bmod p \qquad (21\text{-}1)$$

3. The first computation unit in the proof data generation device 200 acquires the access ticket, t, stored in the third memory part 207 (access ticket memory unit 203) and executes calculation of the following expression (21-2) under the modulo, p, stored in the received data memory unit 107 to obtain S:

[Expression 102]

$$S=u^t \bmod p \qquad (21\text{-}2)$$

4. The exponent generation part in the proof data generation device 200 acquires the user unique identifying information, e, stored in the fourth memory part 208 (user unique identifying information memory unit 201) and executes calculation of the following expression (21-3):

[Expression 103]

$$F(p, e, L) \qquad (21\text{-}3)$$

5. Using data generated by the exponent generation part, the second computation unit in the proof data generation device 200 executes calculation of the following expression (21-4) to obtain S':

[Expression 104]

$$S'=u'^{F(p,e,L)} \bmod p \qquad (21\text{-}4)$$

6. The proof data generation part in the proof data generation device 200 acquires S' and S from the first and second computation units and executes calculation of the following expression (21-5) to obtain R:

[Expression 105]

$$R=C \cdot (S' \cdot S)^{-1} \bmod p \qquad (21\text{-}5)$$

7. The proof data generation device 200 sends R back to the received data memory unit 107 in the proof data verification device 100.

8. The derandomizing unit 114 in the proof data verification device 100 fetches the previously generated random number, r, from the random number memory unit 113, further fetches Y from the access ticket public key memory unit 104 and executes calculation of the following expression (21-6):

[Expression 106]

$$K'=Y^r \cdot R \bmod p \qquad (21\text{-}6)$$

9. Only when the combination of access ticket, t, with user unique identifying information, e, used in the proof data generation device 200 is correct, the data K' thus obtained and the verification data K coincide with each other and verification is effected correctly.

For comparison between K' and verification data K, there may be used the same method as in Embodiment 1.

According to the present invention, as set forth hereinabove, first of all, at the time of determining the legitimacy of an electronic ticket it is possible to establish flexible conditions such as the term of utilization, limitation on the number of times of utilization, as well as a combination thereof, while ensuring safety. In addition, in the event such conditions have been altered, it is possible to prevent authentication from being made correctly. Secondly, in the case where an encrypted digital information is to be decrypted conditionally, it is possible to establish conditions for the decryption at the time of decryption and utilizing the digital information. Moreover, since the conditions for the decryption are independent of the encrypted digital information itself, it is easy to allocate conditions which are different according to users. Additionally, in the event of alteration of such conditions for decryption, it is possible to prevent correct decryption of the digital information.

According to the present invention, by using as authentication characteristic information an asymmetric key cipher system which is defined on an elliptic curve on a finite field, there is attained safety equivalent to the use of an RSA public key cipher for example, even if the key length is made smaller; further, it is possible of carry out processing at a high speed.

What is claimed is:

1. A conditional authentication device which verifies the legitimacy of proof data generated for proving the authority of a user and which determines whether or not conditions added to the authority of the user are satisfied to authenticate the user's authority, said conditional authentication device including:

a first memory part which stores first authentication data;

a second memory part which stores control information for generation of said proof data;

a third memory part which stores proof support information, said proof support information being generated by performing a predetermined computation for both authentication characteristic information and said control information for generation of the proof data stored in said second memory part;

a proof data generation part, said proof data generation part comprising a proof data generation device controlling part which performs predetermined processing or condition determination in accordance with said control information for generation of the proof data, and a first computation part which generates the proof data, using at least said first authentication data, said control information for generation of the proof data and said proof support information; and a verification part which verifies whether or not the proof data generated by said proof data generation part is based on said authentication characteristic information, said proof data generation part generating legitimate proof data only when there are given said first authentication data which is legitimate, said control information for generation of the proof data and said proof support information, and said authentication characteristic information being a decryption key on an asymmetric cryptosysytem which utilizes a discrete logarithm problem on a finite group G.

2. The conditional authentication device according to claim 1, wherein said finite group G is an additive group on an elliptic curve on a finite field.

3. The conditional authentication device according to claim 1, further comprising:

a fourth memory part which stores unique identifying information of the user; and wherein said proof support information stored in said second memory part is generated by performing a predetermined computation for said control information for generation of the proof data, said authentication characteristic information and said user unique identifying information, and said proof data generation part generates the proof data, using at least said user unique identifying information, said control information for generation of the proof data, said proof support information, and said first authentication data.

4. The conditional authentication device according to claim 3, wherein said proof data generation part comprises a first computation part and a second computation part, said first computation part performing a predetermined computation for all of the authentication data stored in said first memory part, the control information for generation of the proof data stored in said third memory part, and the user unique identifying information stored in said fourth memory part, and said second computation part performing a predetermined computation for all of the result of the computation performed by said first computation part, the authentication data stored in said first memory part, and the proof support information stored in said second memory part, resulting in generation of the proof data.

5. The conditional authentication device according to claim 1, wherein said proof data generation part comprises a first computation part and a second computation part, said first computation part performing a predetermined computation for both said authentication data stored in said first memory part and said control information for generation of the proof data stored in said third memory part, and said second computation part performing a predetermined computation for both the result of the computation conducted by said first computation part and said proof support information stored in said third memory part, resulting in generation of said proof data.

6. The conditional authentication device according to claim 1, further comprising:

a fifth memory part which stores second authentication data, said second authentication data being obtained by encrypting appropriate data by use of an encryption key corresponding to said decryption key; and wherein said proof data verification part authenticates that the result of having performed a specific computation for both said proof data generated by said proof data generation part and said second authentication data stored in said fifth memory part is a correctly decrypted result of said second authentication data obtained by using a decryption key corresponding to said encryption key which is authentication characteristic information.

7. The conditional authentication device according to claim 6, wherein the unique security characteristic information is a decryption key X which is configured so as to satisfy the following conditions under an element, a, of G:

$Y=a^x$ if $G$ is a multiplicative group, $Y=Xa$ if $G$ is an additive group, the key of encryption corresponding to the key X is Y, when u is the result of having raised said a to $z^{th}$ power ($u=a^z$) if G is a multiplicative group or having multiplied said a by z ($u=za$) if G is an additive group, provided said z is a suitable random number, and when C is the result of a predetermined mask computation performed for data K, said mask computation being performed using the result of having raised said Y to $z^{th}$ power if G is a multiplicative group or having multiplied said Y by z if G is an additive group, with z being said random number, said u is stored as authentication data in said first memory part and said C is stored in said fifth memory part, and said proof data verification part verifies that said C stored in said fifth memory part, after removal of the mask based on the proof data R generated by said proof data generation part, and said K are congruent under a modulo, p.

8. The conditional authentication device according to claim 6, further comprising:

a random number generation part and a sixth memory part which stores a random number generated by said random number generation part; and wherein said first authentication data is randomized with the random number generated by said random number generation part, and said proof data verification part derandomizes the proof data generated by said proof data generation part.

9. The conditional authentication device according to claim 6, wherein, using said proof support information, t, said user unique identifying information, e, and the authentication data, u, stored in said first memory part, or a randomized data, u', of the data, u, said proof data generation part raises u or u' to $X^{th}$ power if G is a multiplicative group or multiplies u or u' by X if G is an additive group.

10. The conditional authentication device according to claim 1, comprising:

a fifth memory part which stores second authentication data, said second authentication data being obtained by encrypting appropriate data by use of an encryption key corresponding to said decryption key, wherein said proof data verification part verifies that the proof data generated by said proof data generation part is correctly decrypted data of said second authentication data obtained by decrypting said second authentication data by use of the decryption key corresponding to said encryption key which is authentication characteristic information.

11. The conditional authentication device according to claim 10, wherein the finite group G is a multiplicative group, the unique security characteristic information is a decryption key X which is configured so as to satisfy the following conditions under an element, a, of G:

$Y=a^x$ if $G$ is a multiplicative group, $Y=Xa$ if $G$ is an additive group, the key of encryption corresponding to the key X is Y, when u is the result of having raised said a to $z^{th}$ power ($u=a^z$) if G is a multiplicative group or the result of having multiplied said a by z ($u=za$) if G is an additive group, provided said z is a suitable random number, and when C is the result of a predetermined mask computation performed for data K, said mask computation being performed using the result of having raised said Y to $z^{th}$ power if G is a multiplicative group or the result of having multiplied said Y by z if G is an additive group, with z being said random number, said u is stored as authentication data in said first memory part and said C is stored in said fifth memory part, and said data verification part verifies that the proof data generated by said proof data generation part and said K are congruent under a modulo, p.

12. The conditional authentication device according to claim 10, further comprising:
  a random number generation part and a sixth memory part which stores a random number generated by said random number generation part; and
  wherein said first and second authentication data are randomized with the random number generated by said random number generation part, and
  said proof data verification part derandomizes the proof data generated by said proof data generation part.

13. The conditional authentication device according to claim 10, wherein, using said proof support information, t, said user unique identifying information, e, the authentication data, u, stored in said first memory part, and said data C, or randomized data u' and C' of the data u and C, said proof data generation part calculates unmasked data by removing from said C or C' a mask based on raising said u or u' to $X^{th}$ power if G is a multiplicative group or multiplying the u or u' by X if G is an additive group.

14. The conditional authentication device according to claim 1, wherein the proof support information, t, stored in said third memory part is data obtained by performing a predetermined computation for all of said X, information which defines the group G, and control information L.

15. The conditional authentication device according to claim 14, wherein the proof support information, t, stored in said third memory part is data obtained by subtracting from said X a collision-free function value F dependent on both information which defines the group G and control information L.

16. The conditional authentication device according to claim 15, wherein said proof data generation part comprises a first computation part and a second computation part,
  said first computation part raising said u or u' using said collision-free function value in the case of a multiplicative group or multiplying said u or u' by said collision-free function value in the case of an additive group,
  said second computation part raises said u or u' to $t^{th}$ power in the case of a multiplicative group or multiplies said u or u' by t in the case of an additive group and then calculates the product of the result of said calculation and the result of the calculation conducted by said first computation part in the case of a multiplicative group or calculates the sum of the two in the case of an additive group, to generate the proof data R.

17. The conditional authentication device according to claim 16, wherein said second computation part raises said u or u' to $t^{th}$ power in the case of a multiplicative group or multiplies said u or u' by t in the case of an additive group, then calculates the product of the result of said calculation and the result of the calculation conducted by said first computation part in the case of a multiplicative group or calculates the sum of the two in the case of an additive group, and removes from said C or C' a mask based on the result of said product or sum.

18. The conditional authentication device according to claim 16, wherein at least said second memory part and said first computation part are held within a protective part which makes it difficult to observe internal data and processing procedure from the exterior.

19. The conditional authentication device according to claim 1, wherein the proof support information, t, stored in said third memory part is data obtained by performing a predetermined computation for all of said X, encryption key Y and control information L.

20. The conditional authentication device according to claim 19, wherein the proof support information, t, stored in said third memory part is data obtained by subtracting from said X a collision-free function value F dependent on both the encryption key Y and control information L.

21. The conditional authentication device according to claim 1, wherein at least said second memory part and said proof data generation part are held within a protective part which makes it difficult to observe internal data and processing procedure from the exterior.

22. The conditional authentication device according to claim 1, further comprising:
  a proof data generation device, said proof data generation device having at least said first memory part, said second memory part, said third memory part, and said proof data generation part; and
  a proof data verification device, said proof data verification device having at least said proof data verification part, a seventh memory part that stores authentication data, and an eighth memory part that stores proof data,
  said proof data generation device and said proof data verification device communicating with each other to authenticate a user's access right to resources,
  said proof data verification device outputting the authentication data stored in said seventh memory part into said first memory part in said proof data generation device,
  said proof data generation device outputting proof data into said eighth memory part in said proof data verification device, said proof data being generated by said proof data generation part on the basis of the authentication data stored in said first memory part, and
  said proof data verification device authenticating the user's access right to resources with use of the proof data stored in said eighth memory part.

23. The conditional authentication device according to claim 1, wherein said proof data verification part is further provided with an eighth memory part that stores plaintext corresponding to the second authentication data as encrypted data and is also provided with a comparison part, said comparison part comparing the value of the proof data generated by said proof data generation part or a value obtained by computation using said proof data with the plaintext stored in said eighth memory part and determining that said proof data is legitimate only when both of said values are equal to each other.

24. The conditional authentication device according to claim 1, wherein said proof data verification part is further provided with a ninth memory part that stores encrypted data obtained by encrypting certain data by use of a cipher, said second authentication data is data obtained by encrypting a key of the cipher which has been used for encrypting said data, and said proof data verification part determines that said proof data is legitimate, provided said encrypted data can be decrypted by using the value of the proof data generated by said proof data generation part or a value obtained by computation using said proof data, as a decryption key for said encrypted data.

25. The conditional authentication device according to claim 1, wherein said proof data verification part is further provided with a redundancy verifying part that verifies the redundancy of data, and said proof data verification part determines that said proof data is legitimate, provided it is verified by said redundancy verifying part that the value of said proof data generated by said proof data generation part or the value obtained by computation using said proof data possesses specific redundancy.

26. The conditional authentication device according to claim 1, wherein said proof data verification part is further provided with a tenth memory part that stores the result of having applied a predetermined one-way function to plaintext corresponding to said second authentication data as encrypted data, a fourth computation part that executes said one-way function, and a comparison part, said fourth computation part applying the one-way function to the value of said proof data generated by said proof data generation part or to a value obtained by computation using said proof data, and said comparison part comparing the result of calculation made by said fourth computation part with the data stored in said tenth memory part and determining that said proof data is legitimate only when both said calculation result and said data are coincident with each other.

27. The conditional authentication device according to claim 1, wherein said proof data verification part is further provided with a program execution part, said second authentication data is data obtained by encrypting a program, and said proof data verification part delivers the value of said proof data generated by said proof data generation part or a value obtained by performing a specific computation using said proof data, as apart or all of the program, to said program execution part, whereby the program execution part performs a correct operation only when the proof data generation part has correctly decrypted said second authentication data which is the encrypted data, that is, only when the encrypted program has been decrypted correctly.

28. The conditional authentication device according to claim 1, wherein said proof data verification part is further provided with a program execution part, a program memory part, and a program decryption part, said program memory part holding a program of which a part or all has been encrypted, said second authentication data is data obtained by encrypting a decryption key which is for decrypting said encrypted program, said proof data verification part delivers said proof data generated by said proof data generation part to said program decryption part, which in turn decrypts a part or all of the program stored in said program memory part, using as a decryption key the value of the proof data generated by said proof data generation part or a value resulting from computation using said proof data, and said program execution part executes the decrypted program correctly, whereby the program execution part performs a correct operation only when said second authentication data has been decrypted correctly, that is, only when the decryption key has been decrypted correctly for decrypting the encrypted program.

29. The conditional authentication device according to claim 1, further comprising a clock for indicating time, and wherein said control information for generation of said proof data is a valid term permitting authentication, and the proof data is generated only when the time at which authentication is to be conducted lies within said valid term.

30. The conditional authentication device according to claim 1, further comprising an eleventh memory part that stores the number of times of authentication so far conducted, said control information for generation of said proof data is an effective range of the number of times of authentication, and said proof data is generated only when the value of said eleventh memory part is within said effective range.

31. The conditional authentication device according to claim 1, further comprising:

a clock for indicating time;

a fifth computation part which calculates time during which the user has received service from both the time at which the service was started in accordance with the result of authentication and the time at which the service was ended; and a twelfth memory part that stores a total value of time during which the user has so far received the service, and wherein said control information for generation of said proof data is an effective range of a value of total service receiving time, and the proof data is generated only when the value of said twelfth memory part is within said effective range.

32. The conditional authentication device according to claim 1, further comprising:

a thirteenth memory part that stores an amount of money or score which is calculated from, for example, service-received time calculated from the number of times and result of authentication so far conducted, wherein said control information for generation of said proof data is an effective range of the value of amount of money or score, and the proof data is generated only when the value of said thirteenth memory part is within said effective range.

33. The conditional authentication device according to claim 1, having:

a function of outputting to the exterior a history on the result of authentication or on service received as a result of authentication, wherein said control information for generation of said proof data is a flag indicating whether the history is to be outputted or not, and when it is indicated that the history is to be outputted, the history is outputted to generate said proof data.

34. The conditional authentication device according to claim 1, further comprising:

a personal characteristic information extracting part that extracts characteristic information for identifying an individual such as a fingerprint, a voiceprint, an iris pattern, a retina pattern, or a password, wherein said control information for generation of said proof data is said characteristic information for identifying an individual or is a value related to said characteristic information, and the proof data is generated only when there exists a certain relation between the characteristic information extracted by said personal characteristic information extracting part and the control information for generation of the proof data.

35. The conditional authentication device according to claim 1, further comprising:

a second program execution part for execution of a program, wherein said control information for generation of said proof data is the program executed by said second program execution part, and the proof data is generated in the case where the execution of said program results in creation of a specific state or is terminated in a specific state.

36. A conditional authentication method of authenticating the authority of a user by verifying the legitimacy of proof data generated for proving the authority of the user and by determining whether or not conditions added to the authority of the user are satisfied, said method comprising the steps of:

inputting authentication data;

inputting control information which is for generation of said proof data;

inputting proof support information which is generated by performing a predetermined computation beforehand for the control information for generation of said proof data and for authentication characteristic information;

determining whether or not the control information for generation of said proof data satisfies specific conditions;

calculating the proof data from said input in the case where the control information for generation of said proof data satisfies the specific conditions; and verifying that said proof data is based on the authentication characteristic information, wherein said authentication characteristic information is a decryption key in an asymmetric cryptosysytem utilizing a discrete logarithm problem on a finite group G.

37. An authenticating computer program product for use in a computer to authenticate the authority of a user which authentication is effected by verifying the legitimacy of proof data generated for proving the authority of the user and by determining whether or not conditions added to the authority of the user are satisfied, said authenticating computer program product being used for causing said computer to execute the steps of:

inputting authentication data;

inputting control information which is used for generation of said proof data;

inputting proof support information which is generated by performing a predetermined computation beforehand for the control information for generation of said proof data and for authentication characteristic information;

determining whether or not the control information for generation of the proof data satisfies specific conditions;

calculating said proof data from said input in the case where the control information for generation of said proof data satisfies the specific conditions; and verifying that said proof data is generated based on the authentication characteristic information, wherein said authentication characteristic information is a decryption key in an asymmetric cryptosysytem utilizing a discrete logarithm problem on a finite group G.

38. An access control device which authenticates the user's access right to predetermined information processing resources by verifying the legitimacy of proof data generated by the user relative to authentication data, said access control device comprising:

a first memory part that stores said authentication data;

a second memory part that stores control information for generation of the proof data;

a third memory part that stores proof support information, said proof support information being obtained by performing a predetermined computation from the control information for generation of the proof data and from authentication characteristic information;

a proof data generation part that generates the proof data from the control information for generation of the proof data and from the authentication characteristic information only when the control information for generation of the proof data satisfies specific conditions;

a verification part that verifies said proof data; and an access control part that permits the user to make access to the information processing resources in the case where the result of said verification is correct, said authentication characteristic information being a decryption key in an asymmetric cryptosysytem utilizing a discrete logarithm problem on a finite group G.

39. A program execution control device which authenticates the authority to execute a program by verifying the legitimacy of proof data generated by a user relative to authentication data, said program execution control device comprising:

a first memory part that stores said authentication data;

a second memory part that stores control information for generation of said proof data;

a third memory part that stores proof support information, said proof support information being obtained by performing a predetermined computation from the control information for generation of the proof data and from authentication characteristic information;

a proof data generation part that generates the proof data from the control information for generation of the proof data and from the authentication characteristic information only when the control information for generation of the proof data satisfies specific conditions;

a verification part that verifies said proof data; and a control part that performs execution of the program in the case where the result of said verification is correct, said authentication characteristic information being a decryption key in an asymmetric cryptosysytem utilizing a discrete logarithm problem on a finite group G.

* * * * *